(12) United States Patent
Sullivan et al.

(10) Patent No.: US 9,737,764 B2
(45) Date of Patent: Aug. 22, 2017

(54) MULTI-LAYER CORE GOLF BALL

(71) Applicant: Acushnet Company, Fairhaven, MA (US)

(72) Inventors: Michael J. Sullivan, Old Lyme, CT (US); Brian Comeau, Berkley, MA (US); Douglas S. Goguen, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 16 days.

(21) Appl. No.: 14/870,468

(22) Filed: Sep. 30, 2015

(65) Prior Publication Data

US 2016/0016048 A1    Jan. 21, 2016

Related U.S. Application Data

(63) Continuation-in-part of application No. 13/958,854, filed on Aug. 5, 2013, and a continuation-in-part of
(Continued)

(51) Int. Cl.
*A63B 37/06*    (2006.01)
*A63B 37/00*    (2006.01)
(Continued)

(52) U.S. Cl.
CPC ...... *A63B 37/0062* (2013.01); *A63B 37/0039* (2013.01); *A63B 37/0043* (2013.01);
(Continued)

(58) Field of Classification Search
CPC .................. A63B 37/0045; A63B 37/0064
(Continued)

(56) References Cited

U.S. PATENT DOCUMENTS

| 4,104,216 A | 8/1978 | Clampitt |
| 4,650,193 A | 3/1987 | Molitor et al. |

(Continued)

FOREIGN PATENT DOCUMENTS

| WO | WO0023519 | 4/2000 |
| WO | WO0129129 | 4/2001 |

*Primary Examiner* — Raeann Gorden
(74) *Attorney, Agent, or Firm* — Margaret C. Barker

(57) ABSTRACT

Golf ball incorporating core consisting of: a solid inner core layer consisting of a peroxide cured polybutadiene rubber composition and having a diameter of 1.25 inches or less and a center Shore C hardness ($H_{center}$) of 50 or less; and an outer core layer consisting of a thermoplastic composition Tc as defined herein and having a thickness of 0.400 inches or greater and an outer surface Shore C hardness ($H_{outer\ surface}$) of 70 or greater, wherein $H_{outer\ surface} > H_{center}$, and $H_{outer\ surface} - H_{center} \geq 40$. The peroxide cured polybutadiene rubber composition may comprise a reaction product of polybutadiene and a sufficient amount of peroxide to form the solid inner layer having the center Shore C hardness ($H_{center}$) of 50 or less. In one embodiment, 100 phr polybutadiene and from about 0.05 phr to about 3.0 phr of peroxide are mixed with at least one of 5 phr or less of a metal oxide; 5 phr or less of a metal coagent; or 5 phr or less of a metal carbonate. Alternatively, the solid inner core layer has a diameter of 1.10 inches or less or less than 1.0 inches.

17 Claims, 4 Drawing Sheets

Related U.S. Application Data application No. 14/707,028, filed on May 8, 2015, which is a continuation-in-part of application No. 14/571,610, filed on Dec. 16, 2014, which is a continuation-in-part of application No. 14/248,618, filed on Apr. 9, 2014, and a continuation-in-part of application No. 14/248,487, filed on Apr. 9, 2014, and a continuation-in-part of application No. 14/460,416, filed on Aug. 15, 2014, now Pat. No. 9,526,948, said application No. 14/248,618 is a continuation-in-part of application No. 14/248,487, which is a continuation-in-part of application No. 13/958,854, and a continuation-in-part of application No. 14/035,074, filed on Sep. 24, 2013, now Pat. No. 9,132,318, said application No. 14/460,416 is a continuation-in-part of application No. 14/145,578, filed on Dec. 31, 2013.

(51) Int. Cl.
C08L 9/00 (2006.01)
C08L 23/08 (2006.01)

(52) U.S. Cl.
CPC ...... *A63B 37/0045* (2013.01); *A63B 37/0064* (2013.01); *A63B 37/0076* (2013.01); *A63B 37/0092* (2013.01); *A63B 37/0083* (2013.01); *A63B 2037/0079* (2013.01); *C08L 9/00* (2013.01); *C08L 23/0876* (2013.01)

(58) Field of Classification Search
USPC .................................................. 473/373, 374
See application file for complete search history.

(56) References Cited

U.S. PATENT DOCUMENTS

| | | | |
|---|---|---|---|
| 4,732,944 A | 3/1988 | Smith, Jr. |
| 5,273,286 A | 12/1993 | Sun |
| 5,274,041 A | 12/1993 | Yamada |
| 5,306,760 A | 4/1994 | Sullivan |
| 5,312,857 A | 5/1994 | Sullivan |
| 5,334,673 A | 8/1994 | Wu |
| 5,356,941 A | 10/1994 | Sullivan et al. |
| 5,482,285 A | 1/1996 | Yabuki et al. |
| 5,484,870 A | 1/1996 | Wu |
| 5,688,191 A | 11/1997 | Cavallaro et al. |
| 5,733,206 A | 3/1998 | Nesbitt et al. |
| 5,743,816 A | 4/1998 | Ohsumi et al. |
| 5,772,531 A | 6/1998 | Ohsumi et al. |
| 5,776,012 A | 7/1998 | Moriyama et al. |
| 5,783,293 A | 7/1998 | Lammi |
| 5,789,475 A | 8/1998 | Chen |
| 5,803,831 A | 9/1998 | Sullivan et al. |
| 5,810,678 A | 9/1998 | Cavallaro et al. |
| 5,816,937 A | 10/1998 | Shimosaka et al. |
| 5,885,172 A | 3/1999 | Hebert et al. |
| 5,891,973 A | 4/1999 | Sullivan et al. |
| 5,902,855 A | 5/1999 | Sullivan |
| 5,947,842 A | 9/1999 | Cavallaro |
| 5,952,415 A | 9/1999 | Hwang |
| 5,973,046 A | 10/1999 | Chen et al. |
| 6,068,561 A | 5/2000 | Renard et al. |
| 6,071,201 A | 6/2000 | Maruko |
| 6,083,119 A | 7/2000 | Sullivan et al. |
| 6,100,321 A | 8/2000 | Chen |
| 6,113,831 A | 9/2000 | Nesbitt et al. |
| 6,117,025 A | 9/2000 | Sullivan |
| 6,132,324 A | 10/2000 | Hebert et al. |
| 6,152,834 A | 11/2000 | Sullivan |
| 6,162,135 A | 12/2000 | Bulpett et al. |
| 6,180,040 B1 | 1/2001 | Ladd et al. |
| 6,210,293 B1 | 4/2001 | Sullivan |
| 6,213,895 B1 | 4/2001 | Sullivan et al. |
| 6,254,495 B1 | 7/2001 | Nakemura et al. |
| 6,284,840 B1 | 9/2001 | Rajagopalan et al. |
| 6,291,592 B1 | 9/2001 | Bulpett et al. |
| 6,299,550 B1 | 10/2001 | Molitor et al. |
| 6,306,049 B1 | 10/2001 | Rajagopalan |
| 6,309,314 B1 | 10/2001 | Sullivan et al. |
| 6,315,680 B1 | 11/2001 | Dalton et al. |
| 6,329,458 B1 | 12/2001 | Takesue et al. |
| 6,339,119 B1 | 1/2002 | Ladd et al. |
| 6,350,793 B1 | 2/2002 | Kennedy et al. |
| 6,355,715 B1 | 3/2002 | Ladd et al. |
| 6,416,425 B1 | 7/2002 | Maruko et al. |
| 6,419,595 B1 | 7/2002 | Maruko et al. |
| 6,425,833 B1 | 7/2002 | Sullivan et al. |
| 6,431,998 B1 | 8/2002 | Nakamura et al. |
| 6,461,251 B1 | 10/2002 | Yamagishi et al. |
| 6,475,417 B2 | 11/2002 | Nesbitt et al. |
| 6,506,851 B2 | 1/2003 | Wu |
| 6,527,652 B1 | 3/2003 | Maruko et al. |
| 6,537,158 B2 | 3/2003 | Watanabe |
| 6,562,906 B2 | 5/2003 | Chen |
| 6,565,454 B2 | 5/2003 | Halko |
| 6,565,455 B2 | 5/2003 | Hayashi et al. |
| 6,565,456 B2 | 5/2003 | Hayashi et al. |
| 6,583,229 B2 | 6/2003 | Mano et al. |
| 6,592,470 B2 | 7/2003 | Watanabe et al. |
| 6,605,009 B1 | 8/2003 | Nakamura et al. |
| 6,616,549 B2 | 9/2003 | Dalton et al. |
| 6,624,221 B2 | 9/2003 | Takesue et al. |
| 6,632,147 B2 | 10/2003 | Cavallaro et al. |
| 6,635,716 B2 | 10/2003 | Voorheis et al. |
| 6,653,382 B1 | 11/2003 | Statz et al. |
| 6,656,059 B2 | 12/2003 | Umezawa et al. |
| 6,688,991 B2 | 2/2004 | Sullivan et al. |
| 6,695,718 B2 | 2/2004 | Nesbitt |
| 6,702,694 B1 | 3/2004 | Watanabe |
| 6,723,008 B2 | 4/2004 | Higuchi et al. |
| 6,746,345 B2 | 6/2004 | Higuchi et al. |
| 6,756,436 B2 | 6/2004 | Rajagopalan et al. |
| 6,783,468 B2 | 8/2004 | Sullivan et al. |
| 6,815,480 B2 | 11/2004 | Statz et al. |
| 6,835,794 B2 | 12/2004 | Wu et al. |
| 6,837,805 B2 | 1/2005 | Binette et al. |
| 6,838,501 B2 | 1/2005 | Takesue et al. |
| 6,849,006 B2 | 2/2005 | Cavallaro et al. |
| 6,855,070 B2 | 2/2005 | Hogge et al. |
| 6,894,097 B2 | 5/2005 | Takesue et al. |
| 6,932,720 B2 | 8/2005 | Hogge et al. |
| 6,939,907 B2 | 9/2005 | Rajagopalan et al. |
| 7,004,854 B2 | 2/2006 | Hogge et al. |
| 7,090,798 B2 | 8/2006 | Hebert et al. |
| 7,118,496 B2 | 10/2006 | Matroni et al. |
| 7,125,345 B2 | 10/2006 | Sullivan et al. |
| 7,147,578 B2 | 12/2006 | Nesbitt et al. |
| 7,182,702 B2 | 2/2007 | Hogge et al. |
| 7,198,576 B2 | 4/2007 | Sullivan et al. |
| 7,230,045 B2 | 6/2007 | Rajagopalan et al. |
| 7,259,191 B2 | 8/2007 | Sullivan et al. |
| 7,279,529 B2 | 10/2007 | Hogge et al. |
| 7,312,267 B2 | 12/2007 | Kennedy, III et al. |
| 7,365,128 B2 | 4/2008 | Sullivan |
| 7,410,429 B1 | 8/2008 | Bulpett et al. |
| 7,452,291 B2 | 11/2008 | Sullivan et al. |
| 7,458,905 B2 | 12/2008 | Comeau et al. |
| 7,612,134 B2 | 11/2009 | Kennedy, III et al. |
| 7,612,135 B2 | 11/2009 | Kennedy, III et al. |
| 7,652,086 B2 | 1/2010 | Sullivan et al. |
| 7,722,482 B2 | 5/2010 | Sullivan et al. |
| 8,007,375 B2 | 8/2011 | Sullivan et al. |
| 8,007,376 B2 | 8/2011 | Sullivan et al. |
| 8,044,136 B2 | 10/2011 | De Garavilla |
| 8,152,654 B2 | 4/2012 | Rajagopalan et al. |
| 8,182,368 B2 | 5/2012 | Kamino et al. |
| 8,202,925 B2 | 6/2012 | De Garavilla |
| 8,410,220 B2 | 4/2013 | Chen |
| 8,465,381 B2 | 6/2013 | Rajagopalan et al. |
| 2001/0009310 A1 | 7/2001 | Hebert et al. |
| 2003/0013549 A1 | 1/2003 | Rajagopalan et al. |
| 2003/0190976 A1 | 10/2003 | Binette et al. |
| 2004/0082407 A1 | 4/2004 | Sullivan et al. |

(56) References Cited

U.S. PATENT DOCUMENTS

| | | |
|---|---|---|
| 2004/0209705 A1 | 10/2004 | Rajagopalan et al. |
| 2006/0073914 A1 | 4/2006 | Sullivan et al. |
| 2006/0122011 A1 | 6/2006 | Hogge et al. |
| 2006/0264269 A1 | 11/2006 | Rajagopalan et al. |
| 2006/0293464 A1 | 12/2006 | Rajagopalan et al. |
| 2007/0155542 A1 | 7/2007 | Sullivan et al. |
| 2008/0220902 A1 | 9/2008 | Sullivan et al. |
| 2008/0220903 A1 | 9/2008 | Sullivan et al. |
| 2008/0227568 A1 | 9/2008 | Sullivan et al. |
| 2008/0242448 A1 | 10/2008 | Sullivan et al. |
| 2008/0261723 A1 | 10/2008 | Sullivan et al. |
| 2009/0023515 A1 | 1/2009 | Tarao |
| 2009/0124414 A1 | 5/2009 | Sullivan et al. |
| 2009/0124415 A1 | 5/2009 | Sullivan et al. |
| 2009/0124416 A1 | 5/2009 | Sullivan et al. |
| 2012/0184396 A1 | 7/2012 | Sullivan et al. |
| 2013/0260919 A1 | 10/2013 | Kennedy, III et al. |
| 2015/0099596 A1 | 4/2015 | Sullivan et al. |

MULTI-LAYER CORE GOLF BALL

CROSS REFERENCE TO RELATED APPLICATIONS

This application is a continuation-in-part of U.S. patent application Ser. No. 13/958,854, filed Aug. 5, 2013. This application is also a continuation-in-part of U.S. patent application Ser. No. 14/707,028, filed May 8, 2015, which is a continuation-in-part of U.S. patent application Ser. No. 14/571,610, filed Dec. 16, 2014, which is a continuation-in-part of the following: co-pending U.S. patent application Ser. No. 14/248,618, filed Apr. 9, 2014 (the '618 application"); co-pending U.S. patent application Ser. No. 14/248,487, filed Apr. 9, 2014 (the '487 application"); and co-pending U.S. patent application Ser. No. 14/460,416, filed Aug. 15, 2014 (the '416 application"). The '618 application is a continuation-in-part of U.S. patent application Ser. No. 14/248,487, filed Apr. 9, 2014, which is a continuation-in-part of U.S. patent application Ser. No. 13/958,854, filed Aug. 5, 2013, and also a continuation-in-part of U.S. patent application Ser. No. 14/035,074, filed Sep. 24, 2013. The '416 application is a continuation-in-part of U.S. patent application Ser. No. 14/145,578 filed Dec. 31, 2013. Finally, this application is a continuation-in-part of U.S. patent application Ser. No. 14/532,141, filed Nov. 4, 2014. The entire disclosure of each of these related applications is hereby incorporated herein by reference in its entirety.

FIELD OF THE INVENTION

The present invention relates to multi-layer golf balls having a very high positive gradient core, including a very soft, low compression inner core layer formed from an unfoamed composition.

BACKGROUND OF THE INVENTION

U.S. Pat. No. 8,182,368 to Kamino et al. discloses a golf ball wherein the difference between the JIS-C hardness H4 of the core at its surface and the JIS-C hardness H3 of the core outer layer at its innermost portion is equal to or greater than 10.

U.S. Pat. No. 8,007,376 to Sullivan et al. discloses a golf ball having an inner core layer with a negative hardness gradient and an outer core layer with a positive hardness gradient.

U.S. Pat. No. 7,410,429 to Bulpett et al. discloses a golf ball wherein the hardness of the inner core outer surface is the same as or lower than the hardness of the geometric center and the hardness of the outer core layer outer surface is greater than the hardness of the inner surface.

U.S. Pat. No. 6,695,718 to Nesbitt discloses a golf ball including a center core component preferably formed from a sulfur-cured polybutadiene and a core layer component preferably formed from a peroxide-cured polybutadiene and a metal salt of a fatty acid.

Despite these, and additional disclosures of golf balls having various hardness gradient properties, there remains a need for a very high positive gradient core, including a very soft, low compression inner core layer formed from an unfoamed composition. Such core would provide good durability while also contributing to spin reduction.

SUMMARY OF THE INVENTION

A golf ball of the invention produces a desired spin profile of reduced spin off the driver meanwhile maintaining moderate spin off wedges and irons. In one embodiment, the invention is directed to a golf ball comprising a core and a cover. The core consists of a solid inner core layer and an outer core layer. The inner core layer consists of a peroxide cured polybutadiene rubber composition and has a diameter of 1.25 inches or less and a center Shore C hardness ($H_{center}$) of 50 or less. The outer core layer consists of a thermoplastic composition Tc and has a thickness of 0.400 inches or greater and an outer surface Shore C hardness ($H_{outer\ surface}$) of 70 or greater, wherein $H_{outer\ surface} > H_{center}$, and $H_{outer\ surface} - H_{center} \geq 40$.

The peroxide cured polybutadiene rubber composition may comprise a reaction product of polybutadiene and a sufficient amount of peroxide to form the solid inner layer having the center Shore C hardness ($H_{center}$) of 50 or less. In one embodiment, 100 phr polybutadiene and from about 0.05 phr to about 3.0 phr of peroxide are mixed with at least one of 5 phr or less of a metal oxide; 5 phr or less of a metal coagent; or 5 phr or less of a metal carbonate. In a particular embodiment, the polybutadiene and peroxide are mixed with at least one filler, antioxidant, processing agent, light stabilizer, colorant, adhesion promotor, or combinations thereof.

In one embodiment, $H_{outer\ surface} - H_{center} > 45$. In another embodiment, $H_{outer\ surface} - H_{center} > 50$. In yet another embodiment, $H_{outer\ surface} - H_{center} > 55$. In still another embodiment, $H_{outer\ surface} - H_{center} > 60$. In an alternative embodiment, the inner core layer has an inner core interface Shore C hardness $H_{inner\ core\ interface}$ such that $-5 \leq H_{inner\ core\ interface} - H_{center} \leq 5$. In another embodiment, the outer core layer has an outer core interface Shore C hardness $H_{outer\ core\ interface}$ such that $H_{outer\ core\ interface} - H_{inner\ core\ interface} \leq H_{outer\ surface} - H_{center}$. The outer core layer may alternatively have an outer core interface Shore C hardness $H_{outer\ core\ interface}$ such that $H_{outer\ core\ interface} - H_{inner\ core\ interface} > H_{outer\ surface} - H_{center}$. In a specific embodiment, the solid inner core layer has a center Shore C hardness ($H_{center}$) of 40 or less, the outer core layer has an outer surface Shore C hardness ($H_{outer\ surface}$) of 85 or greater, and $H_{outer\ surface} > H_{center}$, and $H_{outer\ surface} - H_{center} \geq 45$.

As is shown in FIG. 1, a series of 2 mm hardness measurements can be made on a cross section of the core beginning at the geometric center and extending radially toward the outer core outer surface. In this regard, the inner core interface Shore C hardness $H_{inner\ core\ interface}$ is extrapolated by following the curve produced by these 2 mm measurements in FIG. 1 from the geometric center to the interface. Accordingly, for the core of FIG. 1, all inner core Shore C hardness points on the curve, including at the interface, are less than 50. In turn, the outer core interface Shore C hardness $H_{outer\ core\ interface}$ is extrapolated by following the same curve of FIG. 1 from within the outer core layer inward toward the interface. Accordingly, for the core of FIG. 1, all outer core layer Shore C hardness points on the curve, including at the interface, are greater than 70.

Composition Tc May be at Least One of the Following:

(1) a highly neutralized polymer composition comprising: an acid copolymer of ethylene and an α,β-unsaturated carboxylic acid, optionally including a softening monomer selected from the group consisting of alkyl acrylates and methacrylates; a non-acid polymer selected from the group consisting of polyolefins, polyamides, polyesters, polyethers, polyurethanes, metallocene-catalyzed polymers, single-site catalyst polymerized polymers, ethylene propylene rubber, ethylene propylene diene rubber, styrenic block copolymer rubbers, alkyl acrylate rubbers, and functionalized derivatives thereof; an organic acid or salt thereof; and a cation source present in an amount sufficient to neutralize greater than 80% of all acid groups present in the composition.

(2) a plasticized thermoplastic composition comprising: a) an acid copolymer of ethylene and an $\alpha,\beta$-unsaturated carboxylic acid, optionally including a softening monomer selected from the group consisting of alkyl acrylates; methacrylates; fatty acids; and fatty acid salts; b) a plasticizer; and c) a cation source present in an amount sufficient to neutralize from about 0 to about 100% of all acid groups present in the composition.

In this regard, the plasticized thermoplastic composition further comprises a non-acid polymer selected from the group consisting of polyolefins, polyamides, polyesters, polyethers, polyurethanes, metallocene-catalyzed polymers, single-site catalyst polymerized polymers, ethylene propylene rubber, ethylene propylene diene rubber, styrenic block copolymer rubbers, alkyl acrylate rubbers, and functionalized derivatives thereof.

In one embodiment, the acid copolymer of ethylene and an $\alpha,\beta$-unsaturated carboxylic acid does not include a softening monomer, and wherein the acid is selected from acrylic acid and methacrylic acid and is present in the acid copolymer in an amount of from about 15 to about 30 weight %, based on the total weight of the acid copolymer.

In one embodiment, the alkyl acrylate rubber is selected from ethylene-alkyl acrylates and ethylene-alkyl methacrylates and is present in an amount of greater than 50 wt. %, based on the combined weight of the acid copolymer and the non-acid polymer.

The non-acid polymer may be ethylene-n-butyl acrylate, wherein the n-butyl-acrylate is present in an amount of 20 wt. % or greater, based on the total weight of the non-acid polymer composition.

(3) a transparent or plasticized polyamide composition. The transparent or plasticized polyamide composition may comprise at least one of a polyether block amide, an amorphous polyamide and a microcrystalline polyamide.

(4) a plasticized non-acid polymer composition. In this regard, the plasticized non-acid polymer composition may be formed from at least one non-acid polymer composition and at least one plasticizer. The non-acid polymer composition may comprise at least one of polyolefins, polyamides, polyesters, polyethers, polyurethanes, metallocene-catalyzed polymers, single-site catalyst polymerized polymers, ethylene propylene rubber, ethylene propylene diene rubber, styrenic block copolymer rubbers, alkyl acrylate rubbers, and functionalized derivatives thereof. The alkyl acrylate rubber may be selected from ethylene-alkyl acrylates and ethylene-alkyl methacrylates. The non-acid polymer composition may contain ethylene-n-butyl acrylate, wherein the n-butyl-acrylate is present in an amount of 20 wt. % or greater, based on the total weight of the non-acid polymer composition.

(5) a polyester-based thermoplastic elastomer composition comprising: i) about 40 to about 99% by weight polyester thermoplastic elastomer; and ii) about 1 to about 60% by weight of a plasticizer. The polyester thermoplastic elastomer may be a polyester-polyether block copolymer. The polyester-polyether block copolymer may have a flex modulus of less than 50,000 psi. The polyester-based thermoplastic elastomer composition may further comprise an acid copolymer of ethylene and an $\alpha,\beta$-unsaturated carboxylic acid, optionally including a softening monomer selected from the group consisting of alkyl acrylates and methacrylates; and a cation source present in an amount sufficient to neutralize from about 0 to about 100% of all acid groups present in the composition.

The acid copolymer of ethylene may contain acid groups and greater than 70% of the acid groups are neutralized. The acid copolymer of ethylene may contain acid groups and 90% or greater of the acid groups are neutralized.

In one embodiment, the plasticizer is a fatty acid ester. The plasticizer may be an alkyl oleate selected from the group consisting of methyl oleate, ethyl oleate, propyl oleate, butyl oleate, and octyl oleate, and mixtures thereof. The polyester-based composition may comprise about 10 to about 30% by weight plasticizer.

A golf ball of the invention may also comprise layers disposed between the core and the cover such as an intermediate layer comprising at least one of ionomers; highly neutralized ionomers; non-ionomeric acid polymers; polyurethanes, polyureas, and polyurethane-polyurea hybrids; polyester-based thermoplastic elastomers; polyamides, copolymers of ionomer and polyamide, polyamide-ethers, and polyamide-esters; ethylene-based homopolymers and copolymers; propylene-based homopolymers and copolymers; triblock copolymers based on styrene and ethylene/butylene; derivatives thereof that are compatibilized with at least one grafted or copolymerized functional group; and combinations thereof.

Alternatively, an intermediate core layer may be formed from at least one of natural rubber, polybutadiene, polyisoprene, ethylene propylene rubber (EPR), ethylene-propylene-diene rubber (EPDM), styrene-butadiene rubber, butyl rubber, halobutyl rubber, polyurethane, polyurea, acrylonitrile butadiene rubber, polychloroprene, alkyl acrylate rubber, chlorinated isoprene rubber, acrylonitrile chlorinated isoprene rubber, polyalkenamer, phenol formaldehyde, melamine formaldehyde, polyepoxide, polysiloxane, polyester, alkyd, polyisocyanurate, polycyanurate, polyacrylate, and combinations thereof.

In one embodiment, the diameter of the solid inner core layer is 1.10 inches or less. In yet another embodiment, the diameter of the solid inner core layer is less than 1.0 inch.

In a different embodiment, the present invention is directed to a golf ball comprising a core and a cover. The core consists of an inner core layer, one or more optional intermediate core layers, and an outer core layer. The inner core layer is a solid layer formed from an unfoamed composition, and has a diameter of 1.10 inches or less and a center Shore C hardness of 40 or less. The outer core layer has a thickness of 0.200 inches or greater and an outer surface Shore C hardness of 80 or greater. The outer surface hardness of the outer core layer is at least 40 Shore C points greater than the center hardness of the inner core layer.

In another embodiment, the present invention is directed to a golf ball comprising a core and a cover. The core consists of an inner core layer, one or more optional intermediate core layers, and an outer core layer. The inner core layer is a solid layer formed from an unfoamed composition, and has a diameter of 1.10 inches or less and a center Shore C hardness of 30 or less. The outer core layer has a thickness of 0.200 inches or greater and an outer surface Shore C hardness of 80 or greater. The outer surface hardness of the outer core layer is at least 50 Shore C points greater than the center hardness of the inner core layer.

BRIEF DESCRIPTION OF THE DRAWINGS

The accompanying drawings form a part of the specification and are to be read in conjunction therewith. The illustrated embodiments, however, are merely examples and are not intended to be limiting.

DETAILED DESCRIPTION

Figure 1:
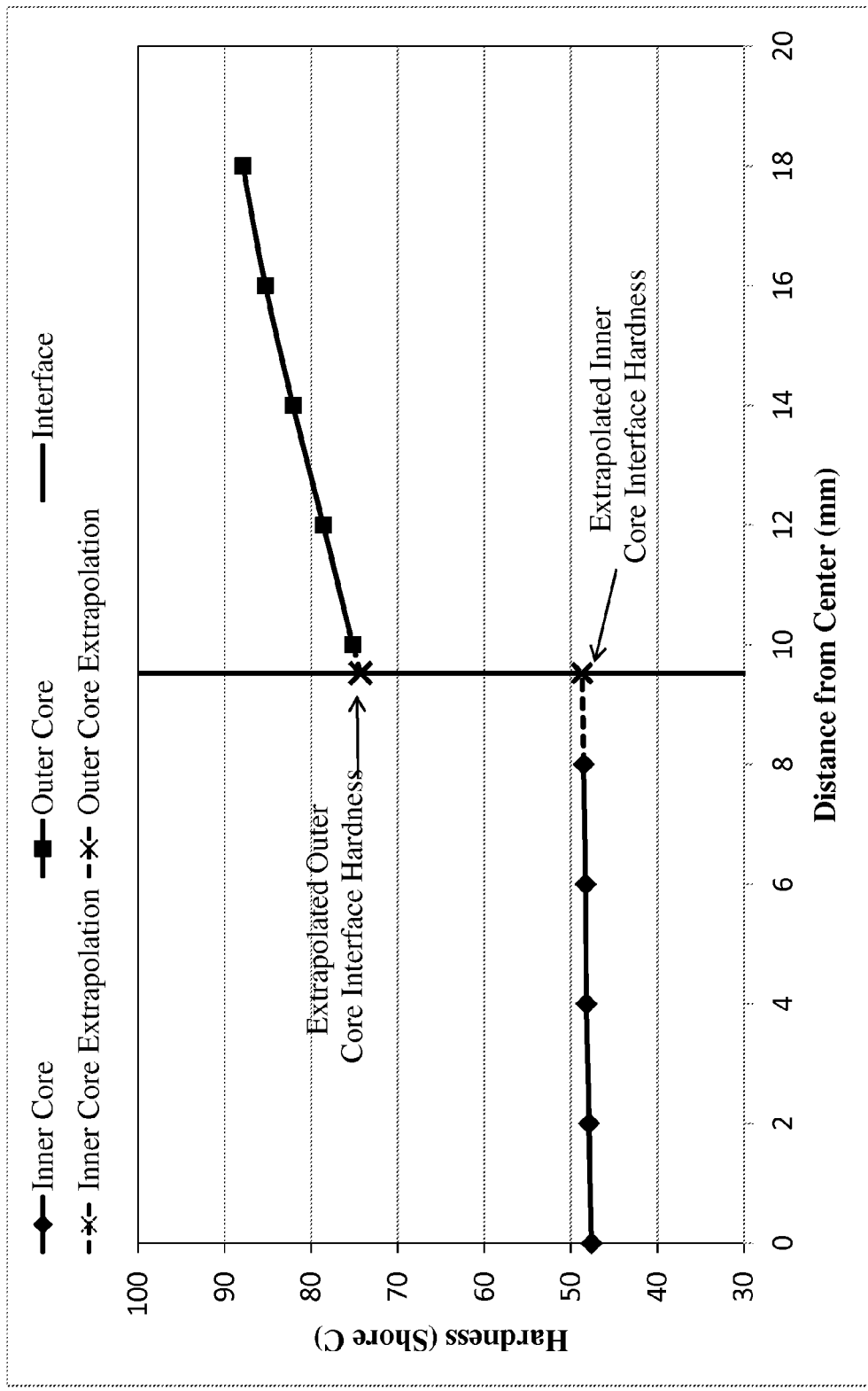
FIG. 1 is a graph depicting core hardness as a function of distance from the center and further depicting extrapolated interfaces for the inner and outer core layers according to one embodiment of a golf ball of the invention.

A golf ball having a very high positive hardness gradient core is disclosed. The core comprises an inner core layer, an outer core layer, and optionally one or more intermediate core layers. The inner core layer has a very low center Shore C hardness ($H_{center}$) of 40 or less, or less than 40, or 35 or less, or less than 35, or 30 or less, or less than 30, or 25 or less or less than 25, or 20 or less, or less than 20, or 15 or less, or less than 15, or 13 or less, or less than 13, or a Shore C hardness within a range having a lower limit of 5 or 10 and an upper limit of 15 or 25 or 30 or 35 or 40. The outer core layer has a high outer surface Shore C hardness ($H_{outer\ surface}$) of 70 or greater, or greater than 70, or 75 or greater, or greater than 75, 80 or greater, or greater than 80, or 85 or greater, or greater than 85, or 87 or greater, or greater than 87, or 89 or greater, or greater than 89, or 90 or greater, or greater than 90, or 91 or greater, or greater than 91, or 92 or greater, or greater than 92, or a Shore C hardness within a range having a lower limit of 80 or 85 or 87 or 89 and an upper limit of 90 or 91 or 92 or 95. The resulting multilayer core has an overall very high positive hardness gradient wherein $H_{outer\ surface}-H_{center}>50$, or $H_{outer\ surface}-H_{center}\geq 50$, or $H_{outer\ surface}-H_{center}>55$, or $H_{outer\ surface}-H_{center}\geq 55$, or $H_{outer\ surface}-H_{center}>60$, or $H_{outer\ surface}-H_{center}\geq 60$, or $H_{outer\ surface}-H_{center}>65$, or $H_{outer\ surface}-H_{center}\geq 65$, or $H_{outer\ surface}-H_{center}>70$, or $H_{outer\ surface}-H_{center}\geq 70$, or $H_{outer\ surface}-H_{center}>75$, or $H_{outer\ surface}-H_{center}\geq 75$, or $H_{outer\ surface}-H_{center}>80$.

The inner core layer has a diameter of 1.10 inches or less, or less than 1.10 inches, or 1.00 inches or less, or less than 1.00 inches, or 0.90 inches or less, or less than 0.90 inches, or 0.80 inches or less, or less than 0.80 inches, or 0.75 inches or less, or less than 0.75 inches, or a diameter within a range having a lower limit of 0.10 or 0.15 or 0.20 or 0.25 or 0.30 or 0.35 or 0.40 or 0.45 or 0.50 or 0.55 inches and an upper limit of 0.60 or 0.65 or 0.70 or 0.75 or 0.80 or 0.85 or 0.90 or 0.95 or 1.00 or 1.05 or 1.10 inches. The outer core layer has a thickness of 0.10 inches or greater, or greater than 0.10 inches, or 0.20 inches or greater, or greater than 0.20 inches, or 0.30 inches or greater, or greater than 0.30 inches, or 0.35 inches or greater, or greater than 0.35 inches, or 0.40 inches or greater, or greater than 0.40 inches, or 0.45 inches or greater, or greater than 0.45 inches, or a thickness within a range having a lower limit of 0.005 or 0.010 or 0.015 or 0.020 or 0.025 or 0.030 or 0.035 or 0.040 or 0.045 or 0.050 or 0.055 or 0.060 or 0.065 or 0.070 or 0.075 or 0.080 or 0.090 or 0.100 or 0.200 or 0.250 inches and an upper limit of 0.300 or 0.350 or 0.400 or 0.450 or 0.500 inches. Optional intermediate core layers are disposed between the inner core layer and outer core layer and have an individual layer thickness within a range having a lower limit of 0.005 or 0.010 or 0.015 or 0.020 or 0.025 or 0.030 or 0.035 or 0.040 or 0.045 inches and an upper limit of 0.050 or 0.055 or 0.060 or 0.065 or 0.070 or 0.075 or 0.080 or 0.090 or 0.100 or 0.150 or 0.200 or 0.250 or inches. The multilayer core has an overall diameter of 1.00 inch or greater, or 1.20 inches or greater, or 1.25 inches or greater, or 1.30 inches or greater, or 1.35 inches or greater, or 1.40 inches or greater, or 1.45 inches or greater, or 1.50 inches or greater, or 1.51 inches or greater, or 1.53 inches or greater, or 1.55 inches or greater, or an overall diameter within a range having a lower limit of 0.50 or 0.70 or 0.75 or 0.80 or 0.85 or 0.90 or 0.95 or 1.00 or 1.10 or 1.15 or 1.20 or 1.25 or 1.30 or 1.35 or 1.40 or 1.45 or 1.50 or 1.51 or 1.53 or 1.55 and an upper limit of 1.55 or 1.60 or 1.61 or 1.62 or 1.63 or 1.64 inches.

The inner core layer has a negative hardness gradient wherein the interface Shore C hardness of the inner core layer is less than the center Shore C hardness, or a zero hardness gradient wherein the interface Shore C hardness of the inner core layer is within 1 Shore C unit of the center Shore C hardness, or positive hardness gradient wherein the interface Shore C hardness of the inner core layer is greater than the center Shore C hardness. The interface hardness of the inner core layer is defined herein as the hardness at a distance of 1 mm inward from the outer surface of the inner core layer. In a particular embodiment, the inner core layer has a center Shore C hardness ($H_{center}$) within a range having a lower limit of 1 or 5 or 10 and an upper limit of 15 or 25 or 30 or 35 or 40 and an interface Shore C hardness ($H_{inner\ core\ interface}$) within a range having a lower limit of 5 or 10 or 15 and an upper limit of 15 or 20 or 25 or 30 or 35 or 40 or 50, and has an overall zero hardness gradient, or a positive hardness gradient wherein $1<H_{inner\ core\ interface}-H_{center}<45$, or $1<H_{inner\ core\ interface}-H_{center}<15$, or $1<H_{inner\ core\ interface}-H_{center}<5$.

In a particular embodiment, the inner core layer has a compression of 40 or less, or 30 or less, or 25 or less, or less than 25, or 20 or less, or less than 20, or 15 or less, or less than 15, or 10 or less, or less than 10, or 5 or less, or less than 5, or 0 or less, or less than 0, and the core has an overall compression of 60 or greater, or 65 or greater, or 70 or greater, or 80 or greater, or greater than 80, or 85 or greater, or greater than 85, or 90 or greater, or an overall compression within a range having a lower limit of 60 or 65 or 70 or 80 or 85 and an upper limit of 90 or 95 or 100 or 110.

Inner Core Layer

The solid inner core layer is formed from an unfoamed composition selected from thermoset and thermoplastic compositions that can be formulated to provide a very soft, low compression center. Rubber compositions suitable for forming the inner core layer include a base rubber selected from natural rubber, polybutadiene, polyisoprene, ethylene propylene rubber (EPR), ethylene-propylene-diene rubber (EPDM), styrene-butadiene rubber, butyl rubber, halobutyl rubber, polyurethane, polyurea, acrylonitrile butadiene rubber, polychloroprene, alkyl acrylate rubber, chlorinated isoprene rubber, acrylonitrile chlorinated isoprene rubber, polyalkenamer, phenol formaldehyde, melamine formaldehyde, polyepoxide, polysiloxane, polyester, alkyd, polyisocyanurate, polycyanurate, polyacrylate, and combinations of two or more thereof. Diene rubbers are preferred, particularly polybutadiene, styrene-butadiene, acrylonitrile butadiene, and mixtures of polybutadiene with other elastomers wherein the amount of polybutadiene present is at least 40 wt % based on the total polymeric weight of the mixture.

Non-limiting examples of suitable commercially available rubbers are Buna CB high-cis neodymium-catalyzed polybutadiene rubbers, such as Buna CB 23, Buna CB24, and Buna CB high-cis cobalt-catalyzed polybutadiene rubbers, such as Buna CB 1203, 1220 and 1221, commercially available from Lanxess Corporation; SE BR-1220, commercially available from The Dow Chemical Company; Europrene® NEOCIS® BR 40 and BR 60, commercially available from Polimeri Europa®; UBEPOL-BR® rubbers, commercially available from UBE Industries, Inc.; BR 01, commercially available from Japan Synthetic Rubber Co., Ltd.; Neodene high-cis neodymium-catalyzed polybutadiene rubbers, such as Neodene BR 40, commercially available from Karbochem; TP-301 transpolyisoprene, commercially available from Kuraray Co., Ltd.; Vestenamer® polyoctenamer, commercially available from Evonik Industries; Butyl 065 and Butyl 288 butyl rubbers, commercially available from ExxonMobil Chemical Company; Butyl 301 and Butyl 101-3, commercially available from Lanxess Corporation; Bromobutyl 2224 and Chlorobutyl 1066 halobutyl rubbers, commercially available from ExxonMobil Chemical Company; Bromobutyl X2 and Chlorobutyl 1240 halobutyl rubbers, commercially available from Lanxess Corporation; BromoButyl 2255 butyl rubber, commercially available from Japan Synthetic Rubber Co., Ltd.; Vistalon® 404 and Vistalon® 706 ethylene propylene rubbers, commercially available from ExxonMobil Chemical Company; Dutral CO 058 ethylene propylene rubber, commercially available from Polimeri Europa; Nordel® IP NDR 5565 and Nordel® IP 3670 ethylene-propylene-diene rubbers, commercially available from The Dow Chemical Company; EPT1045 and EPT1045 ethylene-propylene-diene rubbers, commercially available from Mitsui Corporation; Buna SE 1721 TE styrene-butadiene rubbers, commercially available from Lanxess Corporation; Afpol 1500 and Afpol 552 styrene-butadiene rubbers, commercially available from Karbochem; Nipol® DN407 and Nipol® 1041L acrylonitrile butadiene rubbers, commercially available from Zeon Chemicals, L.P.; Neoprene GRT and Neoprene AD30 polychloroprene rubbers; Vamac® ethylene acrylic elastomers, commercially available from E. I. du Pont de Nemours and Company; Hytemp® AR12 and AR214 alkyl acrylate rubbers, commercially available from Zeon Chemicals, L.P.; Hypalon® chlorosulfonated polyethylene rubbers, commercially available from E. I. du Pont de Nemours and Company; and Goodyear Budene® 1207 polybutadiene, commercially available from Goodyear Chemical.

The rubber is crosslinked using, for example, a peroxide or sulfur cure system, C—C initiators, high energy radiation sources capable of generating free radicals, or a combination thereof. In a particular embodiment, the rubber is crosslinked using a peroxide initiator and optionally a coagent. Suitable peroxide initiators include, but are not limited to, organic peroxides, such as dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; lauryl peroxide; benzoyl peroxide; and combinations thereof. Examples of suitable commercially available peroxides include, but are not limited to Perkadox® BC dicumyl peroxide, commercially available from Akzo Nobel, and Varox® peroxides, such as Varox® ANS benzoyl peroxide and Varox® 231 1,1-di(t-butylperoxy)3,3,5-trimethylcyclohexane, commercially available from RT Vanderbilt Company, Inc.

Coagents are commonly used with peroxides to increase the state of cure. Suitable coagents include, but are not limited to, metal salts of unsaturated carboxylic acids; unsaturated vinyl compounds and polyfunctional monomers (e.g., trimethylolpropane trimethacrylate); maleimides (e.g., phenylene bismaleimide); and combinations thereof. Particular examples of suitable metal salts of unsaturated carboxylic acids include, but are not limited to, one or more metal salts of acrylates, diacrylates, methacrylates, and dimethacrylates, wherein the metal is selected from magnesium, calcium, zinc, aluminum, lithium, nickel, and sodium. In a particular embodiment, the coagent is selected from zinc salts of acrylates, diacrylates, methacrylates, dimethacrylates, and mixtures thereof. In another particular embodiment, the coagent is zinc diacrylate.

The amount of peroxide initiator and coagent can be varied to achieve the desired hardness. For example, in one embodiment, the inner core layer composition is a peroxide-cured rubber comprising from 0.25 to 1.50 phr of a peroxide initiator and is free of coagent, substantially free of coagent (i.e., <1 phr coagent), or includes a low level of coagent (e.g., 10 phr or less, or less than 10 phr, or 5 phr or less, or less than 5 phr, or 1 phr or less, or less than 1 phr. In another particular embodiment, the rubber is crosslinked using sulfur and/or an accelerator. Suitable accelerators include, but are not limited to, guanidines (e.g., diphenyl guanidine, triphenyl guanidine, and di-ortho-tolyl guanidine); thiazoles (e.g., mercaptobenzothiazole, dibenzothiazyldisulfide, sodium salt of mercaptobenzothiazole, zinc salt of mercaptobenzothiazole, and 2,4-dinitrophenyl mercaptobenzothiazole); sulfenamides (e.g., N-cyclohexylbenzothiazylsulfenamide, N-oxydiethylbenzothiazylsulfenamide, N-t-butylbenzothiazylsulfenamide, and N,N'-dicyclohexylbenzothiazylsulfenamide); thiuram sulfides (e.g., tetramethyl thiuram disulfide, tetraethyl thiuram disulfide, tetrabutylthiuram disulfide, tetramethyl thiuram monosulfide, dipentamethylene thiuram tetrasulfate, 4-morpholinyl-2-benzothiazole disulfide, and dipentamethylenethiuram hexasulfide); dithiocarbamates (e.g., piperidine pentamethylene dithiocarbamate, zinc diethyl dithiocarbamate, sodium diethyl dithiocarbamate, zinc ethyl phenyl dithiocarbamate, and bismuth dimethyldithiocarbamate); thioureas (e.g., ethylene thiourea, N,N'-diethylthiourea, and N,N'-diphenylthiourea); xanthates (e.g., zinc isopropyl xanthate, sodium isopropyl xanthate, and zinc butyl xanthate); dithiophosphates; and aldehyde amines (e.g., hexamethylene tetramine and ethylidene aniline).

The crosslinking system optionally includes one or more activators selected from metal oxides (e.g., zinc oxide and magnesium oxide), and fatty acids and salts of fatty acids (e.g., stearic acid, zinc stearate, oleic acid, and dibutyl ammonium oleate). The rubber composition optionally includes a scorch retarder to prevent scorching of the rubber during processing before vulcanization. Suitable scorch retarders include, but are not limited to, salicylic acid, benzoic acid, acetylsalicylic acid, phthalic anhydride, sodium acetate, and N-cyclohexylthiophthalimide.

The rubber composition optionally includes one or more antioxidants to inhibit or prevent the oxidative degradation of the base rubber. Some antioxidants also act as free radical scavengers; thus, when antioxidants are included in the composition, the amount of initiator agent used may be as high as or higher than the amounts disclosed herein. Suitable antioxidants include, but are not limited to, hydroquinoline antioxidants, phenolic antioxidants, and amine antioxidants. The rubber composition optionally includes from 0.05 phr to 10.0 phr of a soft and fast agent selected from organosulfur and metal-containing organosulfur compounds; organic sulfur compounds, including mono, di, and polysulfides, thiol, and mercapto compounds; inorganic sulfide compounds; blends of an organosulfur compound and an inorganic sulfide compound; Group VIA compounds; substituted and unsubstituted aromatic organic compounds that do not contain sulfur or metal; aromatic organometallic compounds; hydroquinones; benzoquinones; quinhydrones; catechols; resorcinols; and combinations thereof. In a particular embodiment, the soft and fast agent is selected from zinc pentachlorothiophenol, pentachlorothiophenol, ditolyl disulfide, diphenyl disulfide, dixylyl disulfide, 2-nitroresorcinol, and combinations thereof.

The rubber composition optionally contains one or more fillers. Exemplary fillers include precipitated hydrated silica, clay, talc, asbestos, glass fibers, aramid fibers, mica, calcium metasilicate, zinc sulfate, barium sulfate, zinc sulfide, lithopone, silicates, silicon carbide, diatomaceous earth, carbonates (e.g., calcium carbonate, zinc carbonate, barium carbonate, and magnesium carbonate), metals (e.g., titanium, tungsten, aluminum, bismuth, nickel, molybdenum, iron, lead, copper, boron, cobalt, beryllium, zinc, and tin), metal alloys (e.g., steel, brass, bronze, boron carbide whiskers, and tungsten carbide whiskers), oxides (e.g., zinc oxide, tin oxide, iron oxide, calcium oxide, aluminum oxide, titanium dioxide, magnesium oxide, and zirconium oxide), particulate carbonaceous materials (e.g., graphite, carbon black, cotton flock, natural bitumen, cellulose flock, and leather fiber), microballoons (e.g., glass and ceramic), fly ash, core material that is ground and recycled, nanofillers and combinations thereof.

The rubber composition may also contain one or more additives selected from processing aids, such as transpolyisoprene (e.g., TP-301 transpolyisoprene, commercially available from Kuraray Co., Ltd.), transbutadiene rubber, and polyalkenamer rubber; processing oils; plasticizers; coloring agents; fluorescent agents; chemical blowing and foaming agents; defoaming agents; stabilizers; softening agents; impact modifiers; free radical scavengers; antiozonants (e.g., p-phenylenediames); and the like. The amount of additive(s) typically present in the rubber composition is typically within a range having a lower limit of 0 parts or 5 parts by weight per 100 parts of the base polymer, and an upper limit of 10 parts or 20 parts or 50 parts or 100 parts or 150 parts by weight per 100 parts of the base polymer.

In a particular embodiment, the inner core layer composition is a rubber composition consisting essentially of polybutadiene, from 0.25 to 1.50 phr of a peroxide, and optionally one or more of: coagent, metal oxide, metal carbonate, filler(s), additive(s), and processing aids. In a particular aspect of this embodiment, the inner core layer has a coefficient of restitution ("COR") at 125 ft/s of 0.700 or less, or 0.650 or less, or 0.600 or less, or 0.550 or less, and the core has an overall COR of 0.795 or greater, or 0.800 or greater, or 0.810 or greater, or 0.815 or greater, or 0.820 or greater. In another particular aspect of this embodiment, the trans content of the rubber inner core layer composition is 2% or less, or less than 2%, at the center and 2% or less, or less than 2%, at the surface of the inner core layer.

Suitable types and amounts of rubber, initiator agent, coagent, filler, and additives are more fully described in, for example, U.S. Pat. Nos. 6,566,483, 6,695,718, 6,939,907, 7,041,721 and 7,138,460, the entire disclosures of which are hereby incorporated herein by reference. Particularly suitable diene rubber compositions are further disclosed, for example, in U.S. Patent Application Publication No. 2007/0093318, the entire disclosure of which is hereby incorporated herein by reference.

Outer Core Layer

Tc (1) Highly Neutralized Polymer Compositions

Suitable HNP compositions comprise an HNP and optionally melt flow modifier(s), additive(s), and/or filler(s). For purposes of the present disclosure, "HNP" refers to an acid polymer after at least 70%, preferably at least 80%, more preferably at least 90%, more preferably at least 95%, and even more preferably 100%, of the acid groups present are neutralized. It is understood that the HNP may be a blend of two or more HNPs. Preferred acid polymers are copolymers of an α-olefin and a $C_3$-$C_8$ α,β-ethylenically unsaturated carboxylic acid, optionally including a softening monomer. The α-olefin is preferably selected from ethylene and propylene. The acid is preferably selected from (meth)acrylic acid, ethacrylic acid, maleic acid, crotonic acid, fumaric acid, and itaconic acid. (Meth)acrylic acid is particularly preferred. The optional softening monomer is preferably selected from alkyl(meth)acrylate, wherein the alkyl groups have from 1 to 8 carbon atoms. Preferred acid polymers include, but are not limited to, those wherein the α-olefin is ethylene, the acid is (meth)acrylic acid, and the optional softening monomer is selected from (meth)acrylate, n-butyl (meth)acrylate, isobutyl(meth)acrylate, methyl(meth)acrylate, and ethyl(meth)acrylate. Particularly preferred acid polymers include, but are not limited to, ethylene/(meth) acrylic acid/n-butyl acrylate, ethylene/(meth)acrylic acid/ methyl acrylate, and ethylene/(meth)acrylic acid/ethyl acrylate. Suitable acid polymers for forming the HNP also include acid polymers that are already partially neutralized. Examples of suitable partially neutralized acid polymers include, but are not limited to, Surlyn® ionomers, commercially available from E. I. du Pont de Nemours and Company; AClyn® ionomers, commercially available from Honeywell International Inc.; and Iotek® ionomers, commercially available from Exxon Mobil Chemical Company. Also suitable are DuPont® HPF 1000 and DuPont® HPF 2000, ionomeric materials commercially available from E. I. du Pont de Nemours and Company. In some embodiments, very low modulus ionomer- ("VLMI-") type ethylene-acid polymers are particularly suitable for forming the HNP, such as Surlyn® 6320, Surlyn® 8120, Surlyn® 8320, and Surlyn® 9320, commercially available from E. I. du Pont de Nemours and Company.

The α-olefin is typically present in the acid polymer in an amount of 15 wt % or greater, or 25 wt % or greater, or 40 wt % or greater, or 60 wt % or greater, based on the total weight of the acid polymer. The acid is typically present in the acid polymer in an amount within a range having a lower limit of 1 or 2 or 4 or 6 or 8 or 10 or 12 or 15 or 16 or 20 wt % and an upper limit of 20 or 25 or 26 or 30 or 35 or 40 wt %, based on the total weight of the acid polymer. The optional softening monomer is typically present in the acid polymer in an amount within a range having a lower limit of 0 or 1 or 3 or 5 or 11 or 15 or 20 wt % and an upper limit of 23 or 25 or 30 or 35 or 50 wt %, based on the total weight of the acid polymer.

Additional suitable acid polymers are more fully described, for example, in U.S. Pat. Nos. 5,691,418, 6,562, 906, 6,653,382, 6,777,472, 6,762,246, 6,815,480, and 6,953, 820 and U.S. Patent Application Publication Nos. 2005/

0148725, 2005/0049367, 2005/0020741, 2004/0220343, and 2003/0130434, the entire disclosures of which are hereby incorporated herein by reference.

The HNP is formed by reacting the acid polymer with a sufficient amount of cation source, optionally in the presence of a high molecular weight organic acid or salt thereof, such that at least 70%, preferably at least 80%, more preferably at least 90%, more preferably at least 95%, and even more preferably 100%, of all acid groups present are neutralized. In a particular embodiment, the cation source is present in an amount sufficient to neutralize, theoretically, greater than 100%, or 105% or greater, or 110% or greater, or 115% or greater, or 120% or greater, or 125% or greater, or 200% or greater, or 250% or greater of all acid groups present in the composition. The acid polymer can be reacted with the optional high molecular weight organic acid or salt thereof and the cation source simultaneously, or the acid polymer can be reacted with the optional high molecular weight organic acid or salt thereof prior to the addition of the cation source.

Suitable cation sources include metal ions and compounds of alkali metals, alkaline earth metals, and transition metals; metal ions and compounds of rare earth elements; silicone, silane, and silicate derivatives and complex ligands; and combinations thereof. Preferred cation sources are metal ions and compounds of magnesium, sodium, potassium, cesium, calcium, barium, manganese, copper, zinc, tin, lithium, and rare earth metals. The acid polymer may be at least partially neutralized prior to contacting the acid polymer with the cation source to form the HNP. Methods of preparing ionomers, and the acid polymers on which ionomers are based, are disclosed, for example, in U.S. Pat. Nos. 3,264,272, and 4,351,931, and U.S. Patent Application Publication No. 2002/0013413.

Suitable high molecular weight organic acids are aliphatic organic acids, aromatic organic acids, saturated monofunctional organic acids, unsaturated monofunctional organic acids, multi-unsaturated monofunctional organic acids, and dimerized derivatives thereof. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, dimerized derivatives thereof, and combinations thereof. Salts of high molecular weight organic acids comprise the salts, particularly the barium, lithium, sodium, zinc, bismuth, chromium, cobalt, copper, potassium, stontium, titanium, tungsten, magnesium, and calcium salts, of aliphatic organic acids, aromatic organic acids, saturated monofunctional organic acids, unsaturated monofunctional organic acids, multi-unsaturated monofunctional organic acids, dimerized derivatives thereof, and combinations thereof. Suitable organic acids and salts thereof are more fully described, for example, in U.S. Pat. No. 6,756,436, the entire disclosure of which is hereby incorporated herein by reference. In a particular embodiment, the HNP composition comprises an organic acid salt in an amount of 20 phr or greater, or 25 phr or greater, or 30 phr or greater, or 35 phr or greater, or 40 phr or greater.

HNP compositions of the present invention optionally contain one or more melt flow modifiers. The amount of melt flow modifier in the composition is readily determined such that the melt flow index of the composition is at least 0.1 g/10 min, preferably from 0.5 g/10 min to 10.0 g/10 min, and more preferably from 1.0 g/10 min to 6.0 g/10 min, as measured using ASTM D-1238, condition E, at 190° C., using a 2160 gram weight.

Suitable melt flow modifiers include, but are not limited to, the high molecular weight organic acids and salts thereof disclosed above, polyamides, polyesters, polyacrylates, polyurethanes, polyethers, polyureas, polyhydric alcohols, and combinations thereof. Also suitable are the non-fatty acid melt flow modifiers disclosed in U.S. Pat. Nos. 7,365, 128 and 7,402,629, the entire disclosures of which are hereby incorporated herein by reference.

HNP compositions of the present invention optionally include additive(s) and/or filler(s) in an amount within a range having a lower limit of 0 or 5 or 10 wt %, and an upper limit of 15 or 20 or 25 or 30 or 50 wt %, based on the total weight of the composition. Suitable additives and fillers include, but are not limited to, chemical blowing and foaming agents, optical brighteners, coloring agents, fluorescent agents, whitening agents, UV absorbers, light stabilizers, defoaming agents, processing aids, mica, talc, nano-fillers, antioxidants, stabilizers, softening agents, fragrance components, plasticizers, impact modifiers, $TiO_2$, acid copolymer wax, surfactants, and fillers, such as zinc oxide, tin oxide, barium sulfate, zinc sulfate, calcium oxide, calcium carbonate, zinc carbonate, barium carbonate, clay, tungsten, tungsten carbide, silica, lead silicate, regrind (recycled material), and mixtures thereof. Suitable additives are more fully disclosed, for example, in U.S. Patent Application Publication No. 2003/0225197, the entire disclosure of which is hereby incorporated herein by reference.

In some embodiments, the HNP composition is a "moisture resistant" HNP composition, i.e., having a moisture vapor transmission rate ("MVTR") of 8 g-mil/100 $in^2$/day or less (i.e., 3.2 g-mm/$m^2$·day or less), or 5 g-mil/100 $in^2$/day or less (i.e., 2.0 g-mm/$m^2$·day or less), or 3 g-mil/100 $in^2$/day or less (i.e., 1.2 g-mm/$m^2$·day or less), or 2 g-mil/100 $in^2$/day or less (i.e., 0.8 g-mm/$m^2$·day or less), or 1 g-mil/100 $in^2$/day or less (i.e., 0.4 g-mm/$m^2$·day or less), or less than 1 g-mil/100 $in^2$/day (i.e., less than 0.4 g-mm/$m^2$·day). Suitable moisture resistant HNP compositions are disclosed, for example, in U.S. Patent Application Publication Nos. 2005/ 0267240, 2006/0106175, and 2006/0293464, the entire disclosures of which are hereby incorporated herein by reference.

HNP compositions of the present invention are not limited by any particular method or any particular equipment for making the compositions. In a preferred embodiment, the composition is prepared by the following process. The acid polymer(s), optional melt flow modifier(s), and optional additive(s)/filler(s) are simultaneously or individually fed into a melt extruder, such as a single or twin screw extruder. A suitable amount of cation source is then added such that at least 70%, or at least 80%, or at least 90%, or at least 95%, or at least 100%, of all acid groups present are neutralized. Optionally, the cation source is added in an amount sufficient to neutralize, theoretically, 105% or greater, or 110% or greater, or 115% or greater, or 120% or greater, or 125% or greater, or 200% or greater, or 250% or greater of all acid groups present in the composition. The acid polymer may be at least partially neutralized prior to the above process. The components are intensively mixed prior to being extruded as a strand from the die-head.

The HNP composition optionally comprises at least one additional polymer component selected from partially neutralized ionomers as disclosed, for example, in U.S. Patent Application Publication No. 2006/0128904, the entire disclosure of which is hereby incorporated herein by reference; bimodal ionomers, such as those disclosed in U.S. Patent Application Publication No. 2004/0220343 and U.S. Pat. Nos. 6,562,906, 6,762,246, 7,273,903, 8,193,283, 8,410, 219, and 8,410,220, the entire disclosures of which are hereby incorporated herein by reference, and particularly Surlyn® AD 1043, 1092, and 1022 ionomer resins, commercially available from E. I. du Pont de Nemours and Company; ionomers modified with rosins, such as those disclosed in U.S. Patent Application Publication No. 2005/0020741, the entire disclosure of which is hereby incorporated by reference; soft and resilient ethylene copolymers, such as those disclosed U.S. Patent Application Publication No. 2003/0114565, the entire disclosure of which is hereby incorporated herein by reference; polyolefins, such as linear, branched, or cyclic, $C_2$-$C_{40}$ olefins, particularly polymers comprising ethylene or propylene copolymerized with one or more $C_2$-$C_{40}$ olefins, $C_3$-$C_{20}$ α-olefins, or $C_3$-$C_{10}$ α-olefins; polyamides; polyesters; polyethers; polycarbonates; polysulfones; polyacetals; polylactones; acrylonitrile-butadiene-styrene resins; polyphenylene oxide; polyphenylene sulfide; styrene-acrylonitrile resins; styrene maleic anhydride; polyimides; aromatic polyketones; ionomers and ionomeric precursors, acid copolymers, and conventional HNPs, such as those disclosed in U.S. Pat. Nos. 6,756,436, 6,894,098, and 6,953,820, the entire disclosures of which are hereby incorporated herein by reference; polyurethanes; grafted and non-grafted metallocene-catalyzed polymers, such as single-site catalyst polymerized polymers, high crystalline acid polymers, cationic ionomers, and combinations thereof; natural and synthetic rubbers, including, but not limited to, ethylene propylene rubber ("EPR"), ethylene propylene diene rubber ("EPDM"), styrenic block copolymer rubbers (such as SI, SIS, SB, SBS, SIBS, and the like, where "S" is styrene, "I" is isobutylene, and "B" is butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber (such as ethylene-alkyl acrylates and ethylene-alkyl methacrylates, and, more specifically, ethylene-ethyl acrylate, ethylene-methyl acrylate, and ethylene-butyl acrylate), chlorinated isoprene rubber, acrylonitrile chlorinated isoprene rubber, and polybutadiene rubber (cis and trans). Additional suitable blend polymers include those described in U.S. Pat. No. 5,981,658, for example at column 14, lines 30 to 56, the entire disclosure of which is hereby incorporated herein by reference. The blend may be produced by post-reactor blending, by connecting reactors in series to make reactor blends, or by using more than one catalyst in the same reactor to produce multiple species of polymer. The polymers may be mixed prior to being put into an extruder, or they may be mixed in an extruder. In a particular embodiment, the HNP composition comprises an acid copolymer and an additional polymer component, wherein the additional polymer component is a non-acid polymer present in an amount of greater than 50 wt %, or an amount within a range having a lower limit of 50 or 55 or 60 or 65 or 70 and an upper limit of 80 or 85 or 90, based on the combined weight of the acid copolymer and the non-acid polymer. In another particular embodiment, the HNP composition comprises an acid copolymer and an additional polymer component, wherein the additional polymer component is a non-acid polymer present in an amount of less than 50 wt %, or an amount within a range having a lower limit of 10 or 15 or 20 or 25 or 30 and an upper limit of 40 or 45 or 50, based on the combined weight of the acid copolymer and the non-acid polymer.

HNP compositions of the present invention, in the neat (i.e., unfilled) form, preferably have a specific gravity of from 0.95 g/cc to 0.99 g/cc. Any suitable filler, flake, fiber, particle, or the like, of an organic or inorganic material may be added to the HNP composition to increase or decrease the specific gravity, particularly to adjust the weight distribution within the golf ball, as further disclosed in U.S. Pat. Nos. 6,494,795, 6,547,677, 6,743,123, 7,074,137, and 6,688,991, the entire disclosures of which are hereby incorporated herein by reference.

In a particular embodiment, the HNP composition is selected from the relatively soft HNP compositions disclosed in U.S. Pat. No. 7,468,006, the entire disclosure of which is hereby incorporated herein by reference, and the low modulus HNP compositions disclosed in U.S. Pat. No. 7,207,903, the entire disclosure of which is hereby incorporated herein by reference. In a particular aspect of this embodiment, a sphere formed from the HNP composition has a compression of 80 or less, or 70 or less, or 65 or less, or 60 or less, or 50 or less, or 40 or less, or 30 or less, or 20 or less. In another particular aspect of this embodiment, the HNP composition has a material hardness within a range having a lower limit of 40 or 50 or 55 Shore C and an upper limit of 70 or 80 or 87 Shore C, or a material hardness of 55 Shore D or less, or a material hardness within a range having a lower limit of 10 or 20 or 30 or 37 or 39 or 40 or 45 Shore D and an upper limit of 48 or 50 or 52 or 55 or 60 or 80 Shore D. In yet another particular aspect of this embodiment, the HNP composition comprises an HNP having a modulus within a range having a lower limit of 1,000 or 5,000 or 10,000 psi and an upper limit of 17,000 or 25,000 or 28,000 or 30,000 or 35,000 or 45,000 or 50,000 or 55,000 psi, as measured using a standard flex bar according to ASTM D790-B.

In another particular embodiment, the HNP composition is selected from the relatively hard HNP compositions disclosed in U.S. Pat. No. 7,468,006, the entire disclosure of which is hereby incorporated herein by reference, and the high modulus HNP compositions disclosed in U.S. Pat. No. 7,207,903, the entire disclosure of which is hereby incorporated herein by reference. In a particular aspect of this embodiment, a sphere formed from the HNP composition has a compression of 70 or greater, or 80 or greater, or a compression within a range having a lower limit of 70 or 80 or 90 or 100 and an upper limit of 110 or 130 or 140. In another particular aspect of this embodiment, the HNP composition has a material hardness of 35 Shore D or greater, or 45 Shore D or greater, or a material hardness within a range having a lower limit of 45 or 50 or 55 or 57 or 58 or 60 or 65 or 70 or 75 Shore D and an upper limit of 75 or 80 or 85 or 90 or 95 Shore D. In yet another particular aspect of this embodiment, the HNP composition comprises an HNP having a modulus within a range having a lower limit of 25,000 or 27,000 or 30,000 or 40,000 or 45,000 or 50,000 or 55,000 or 60,000 psi and an upper limit of 72,000 or 75,000 or 100,000 or 150,000 psi, as measured using a standard flex bar according to ASTM D790-B.

Suitable HNP compositions are further disclosed, for example, in U.S. Pat. Nos. 6,653,382, 6,756,436, 6,777,472, 6,815,480, 6,894,098, 6,919,393, 6,953,820, 6,994,638, 7,375,151, the entire disclosures of which are hereby incorporated herein by reference.

In a particular embodiment, the HNP composition is formed by blending an acid polymer, a non-acid polymer, a cation source, and a fatty acid or metal salt thereof. For purposes of the present invention, maleic anhydride modified polymers are defined herein as a non-acid polymer despite having anhydride groups that can ring-open to the acid form during processing of the polymer to form the HNP compositions herein. The maleic anhydride groups are grafted onto a polymer, are present at relatively very low levels, and are not part of the polymer backbone, as is the case with the acid polymers, which are exclusively E/X and E/X/Y copolymers of ethylene and an acid, particularly methacrylic acid and acrylic acid.

In a particular aspect of this embodiment, the acid polymer is selected from ethylene-acrylic acid and ethylene-methacrylic acid copolymers, optionally containing a softening monomer selected from n-butyl acrylate and iso-butyl acrylate. The acid polymer preferably has an acid content with a range having a lower limit of 2 or 10 or 15 or 16 mol % and an upper limit of 20 or 25 or 26 or 30 mol %. Examples of particularly suitable commercially available acid polymers include, but are not limited to, those given in TABLE I below.

TABLE I

| Acid Polymer | Acid (wt %) | Softening Monomer (wt %) | Melt Index (2.16 kg, 190° C., g/10 min) |
|---|---|---|---|
| Nucrel ® 9-1 | methacrylic acid (9.0) | n-butyl acrylate (23.5) | 25 |
| Nucrel ® 599 | methacrylic acid (10.0) | none | 450 |
| Nucrel ® 960 | methyacrylic acid (15.0) | none | 60 |
| Nucrel ® 0407 | methacrylic acid (4.0) | none | 7.5 |
| Nucrel ® 0609 | methacrylic acid (6.0) | none | 9 |
| Nucrel ® 1214 | methacrylic acid (12.0) | none | 13.5 |
| Nucrel ® 2906 | methacrylic acid (19.0) | none | 60 |
| Nucrel ® 2940 | methacrylic acid (19.0) | none | 395 |
| Nucrel ® 30707 | acrylic acid (7.0) | none | 7 |
| Nucrel ® 31001 | acrylic acid (9.5) | none | 1.3 |
| Nucrel ® AE | methacrylic acid (2.0) | isobutyl acrylate (6.0) | 11 |
| Nucrel ® 2806 | acrylic acid (18.0) | none | 60 |
| Nucrel ® 0403 | methacrylic acid (4.0) | none | 3 |
| Nucrel ® 925 | methacrylic acid (15.0) | none | 25 |
| Escor ® AT-310 | acrylic acid (6.5) | methyl acrylate (6.5) | 6 |
| Escor ® AT-325 | acrylic acid (6.0) | methyl acrylate (20.0) | 20 |
| Escor ® AT-320 | acrylic acid (6.0) | methyl acrylate (18.0) | 5 |
| Escor ® 5070 | acrylic acid (9.0) | none | 30 |
| Escor ® 5100 | acrylic acid (11.0) | none | 8.5 |
| Escor ® 5200 | acrylic acid (15.0) | none | 38 |
| A-C ® 5120 | acrylic acid (15) | none | not reported |
| A-C ® 540 | acrylic acid (5) | none | not reported |
| A-C ® 580 | acrylic acid (10) | none | not reported |
| Primacor ® 3150 | acrylic acid (6.5) | none | 5.8 |
| Primacor ® 3330 | acrylic acid (3.0) | none | 11 |
| Primacor ® 5985 | acrylic acid (20.5) | none | 240 |
| Primacor ® 5986 | acrylic acid (20.5) | none | 300 |
| Primacor ® 5980I | acrylic acid (20.5) | none | 300 |
| Primacor ® 5990I | acrylic acid (20.0) | none | 1300 |
| XUS 60751.17 | acrylic acid (19.8) | none | 600 |
| XUS 60753.02L | acrylic acid (17.0) | none | 60 |

Nucrel ® acid polymers are commercially available from E. I. du Pont de Nemours and Company.
Escor ® acid polymers are commercially available from ExxonMobil Chemical Company.
A-C ® acid polymers are commercially available from Honeywell International Inc.
Primacor ® acid polymers and XUS acid polymers are commercially available from The Dow Chemical Company.

In another particular aspect of this embodiment, the non-acid polymer is an elastomeric polymer. Suitable elastomeric polymers include, but are not limited to: ethylene-alkyl acrylate polymers, particularly polyethylene-butyl acrylate, polyethylene-methyl acrylate, and polyethylene-ethyl acrylate; metallocene-catalyzed polymers; ethylene-butyl acrylate-carbon monoxide polymers and ethylene-vinyl acetate-carbon monoxide polymers; polyethylene-vinyl acetates; ethylene-alkyl acrylate polymers containing a cure site monomer; ethylene-propylene rubbers and ethylene-propylene-diene monomer rubbers; olefinic ethylene elastomers, particularly ethylene-octene polymers, ethylene-butene polymers, ethylene-propylene polymers, and ethylene-hexene polymers; styrenic block copolymers; polyester elastomers; polyamide elastomers; polyolefin rubbers, particularly polybutadiene, polyisoprene, and styrene-butadiene rubber; and thermoplastic polyurethanes.

Examples of particularly suitable commercially available non-acid polymers include, but are not limited to, Lotader® ethylene-alkyl acrylate polymers and Lotryl® ethylene-alkyl acrylate polymers, and particularly Lotader® 4210, 4603, 4700, 4720, 6200, 8200, and AX8900 commercially available from Arkema Corporation; Elvaloy® AC ethylene-alkyl acrylate polymers, and particularly AC 1224, AC 1335, AC 2116, AC3117, AC3427, and AC34035, commercially available from E. I. du Pont de Nemours and Company; Fusabond® elastomeric polymers, such as ethylene vinyl acetates, polyethylenes, metallocene-catalyzed polyethylenes, ethylene propylene rubbers, and polypropylenes, and particularly Fusabond® N525, C190, C250, A560, N416, N493, N614, P614, M603, E100, E158, E226, E265, E528, and E589, commercially available from E. I. du Pont de Nemours and Company; Honeywell A-C polyethylenes and ethylene maleic anhydride copolymers, and particularly A-C 5180, A-C 575, A-C 573, A-C 655, and A-C 395, commercially available from Honeywell; Nordel® IP rubber, Elite® polyethylenes, Engage® elastomers, and Amplify® functional polymers, and particularly Amplify® GR 207, GR 208, GR 209, GR 213, GR 216, GR 320, GR 380, and EA 100, commercially available from The Dow Chemical Company; Enable® metallocene polyethylenes, Exact® plastomers, Vistamaxx® propylene-based elastomers, and Vistalon® EPDM rubber, commercially available from ExxonMobil Chemical Company; Starflex® metallocene linear low density polyethylene, commercially available from LyondellBasell; Elvaloy® HP4051, HP441, HP661 and HP662 ethylene-butyl acrylate-carbon monoxide polymers and Elvaloy® 741, 742 and 4924 ethylene-vinyl acetate-carbon monoxide polymers, commercially available from E. I. du Pont de Nemours and Company; Evatane® ethylene-vinyl acetate polymers having a vinyl acetate content of from 18 to 42%, commercially available from Arkema Corporation; Elvax® ethylene-vinyl acetate polymers having a vinyl acetate content of from 7.5 to 40%, commercially available from E. I. du Pont de Nemours and Company; Vamac® G terpolymer of ethylene, methylacrylate and a cure site monomer, commercially available from E. I. du Pont de Nemours and Company; Vistalon® EPDM rubbers, commercially available from ExxonMobil Chemical Company; Kraton® styrenic block copolymers, and particularly Kraton® FG1901GT, FG1924GT, and RP6670GT, commercially available from Kraton Performance Polymers Inc.; Septon® styrenic block copolymers, commercially available from Kuraray Co., Ltd.; Hytrel® polyester elastomers, and particularly Hytrel® 3078, 4069, and 556, commercially available from E. I. du Pont de Nemours and Company; Riteflex® polyester elastomers, commercially available from Celanese Corporation; Pebax® thermoplastic polyether block amides, and particularly Pebax® 2533, 3533, 4033, and 5533, commercially available from Arkema Inc.; Affinity® and Affinity® GA elastomers, Versify® ethylene-propylene copolymer elastomers, and Infuse® olefin block copolymers, commercially available from The Dow Chemical Company; Exxelor® polymer resins, and particularly Exxelor® PE 1040, PO 1015, PO 1020, VA 1202, VA 1801, VA 1803, and VA 1840, commercially available from ExxonMobil Chemical Company; and Royaltuf® EPDM, and particularly Royaltuf498 maleic anhydride modified polyolefin based on an amorphous EPDM and Royaltuf®485 maleic anhydride modified polyolefin based on an semi-crystalline EPDM, commercially available from Chemtura Corporation.

Additional examples of particularly suitable commercially available elastomeric polymers include, but are not limited to, those given in TABLE II below.

TABLE II

Non-Acid Elastomeric Polymers and Properties.

|  | % Ester | % Maleic Anhydride | Melt Index (2.16 kg, 190° C., g/10 min) |
|---|---|---|---|
| Polyethylene Butyl Acrylates |  |  |  |
| Lotader ® 3210 | 6 | 3.1 | 5 |
| Lotader ® 4210 | 6.5 | 3.6 | 9 |
| Lotader ® 3410 | 17 | 3.1 | 5 |
| Lotryl ® 17BA04 | 16-19 | 0 | 3.5-4.5 |
| Lotryl ® 35BA320 | 33-37 | 0 | 260-390 |
| Elvaloy ® AC 3117 | 17 | 0 | 1.5 |
| Elvaloy ® AC 3427 | 27 | 0 | 4 |
| Elvaloy ® AC 34035 | 35 | 0 | 40 |
| Polyethylene Methyl Acrylates |  |  |  |
| Lotader ® 4503 | 19 | 0.3 | 8 |
| Lotader ® 4603 | 26 | 0.3 | 8 |
| Lotader ® AX 8900 | 26 | 8% GMA | 6 |
| Lotryl ® 24MA02 | 23-26 | 0 | 1-3 |
| Elvaloy ® AC 12024S | 24 | 0 | 20 |
| Elvaloy ® AC 1330 | 30 | 0 | 3 |
| Elvaloy ® AC 1335 | 35 | 0 | 3 |
| Elvaloy ® AC 1224 | 24 | 0 | 2 |
| Polyethylene Ethyl Acrylates |  |  |  |
| Lotader ® 6200 | 6.5 | 2.8 | 40 |
| Lotader ® 8200 | 6.5 | 2.8 | 200 |
| Lotader ® LX 4110 | 5 | 3.0 | 5 |
| Lotader ® HX 8290 | 17 | 2.8 | 70 |
| Lotader ® 5500 | 20 | 2.8 | 20 |
| Lotader ® 4700 | 29 | 1.3 | 7 |

TABLE II-continued

Non-Acid Elastomeric Polymers and Properties.

|  | % Ester | % Maleic Anhydride | Melt Index (2.16 kg, 190° C., g/10 min) |
|---|---|---|---|
| Lotader ® 4720 | 29 | 0.3 | 7 |
| Elvaloy ® AC 2116 | 16 | 0 | 1 |

The acid polymer and non-acid polymer are combined and reacted with a cation source, such that at least 80% of all acid groups present are neutralized. The present invention is not meant to be limited by a particular order for combining and reacting the acid polymer, non-acid polymer and cation source. In a particular embodiment, the fatty acid or metal salt thereof is used in an amount such that the fatty acid or metal salt thereof is present in the HNP composition in an amount of from 10 wt % to 60 wt %, or within a range having a lower limit of 10 or 20 or 30 or 40 wt % and an upper limit of 40 or 50 or 60 wt %, based on the total weight of the HNP composition. Suitable cation sources and fatty acids and metal salts thereof are further disclosed above.

In another particular aspect of this embodiment, the acid polymer is an ethylene-acrylic acid polymer having an acid content of 19 wt % or greater, the non-acid polymer is a metallocene-catalyzed ethylene-butene copolymer, optionally modified with maleic anhydride, the cation source is magnesium, and the fatty acid or metal salt thereof is magnesium oleate present in the composition in an amount of 20 to 50 wt %, based on the total weight of the composition.

The following commercially available materials may be used for example: A-C® 5120 ethylene acrylic acid copolymer with an acrylic acid content of 15%, A-C® 5180 ethylene acrylic acid copolymer with an acrylic acid content of 20%, A-C® 395 high density oxidized polyethylene homopolymer, and A-C® 575 ethylene maleic anhydride copolymer, commercially available from Honeywell; CB23 high-cis neodymium-catalyzed polybutadiene rubber, commercially available from Lanxess Corporation; CA1700 Soya fatty acid, CA1726 linoleic acid, and CA1725 conjugated linoleic acid, commercially available from Chemical Associates; Century® 1107 highly purified isostearic acid mixture of branched and straight-chain C18 fatty acid, commercially available from Arizona Chemical; Clarix® 011370-01 ethylene acrylic acid copolymer with an acrylic acid content of 13% and Clarix® 011536-01 ethylene acrylic acid copolymer with an acrylic acid content of 15%, commercially available from A. Schulman Inc.; Elvaloy® AC 1224 ethylene-methyl acrylate copolymer with a methyl acrylate content of 24 wt %, Elvaloy® AC 1335 ethylene-methyl acrylate copolymer with a methyl acrylate content of 35 wt %, Elvaloy® AC 2116 ethylene-ethyl acrylate copolymer with an ethyl acrylate content of 16 wt %, Elvaloy® AC 3427 ethylene-butyl acrylate copolymer having a butyl acrylate content of 27 wt %, and Elvaloy® AC 34035 ethylene-butyl acrylate copolymer having a butyl acrylate content of 35 wt %, commercially available from E. I. du Pont de Nemours and Company; Escor® AT-320 ethylene acid terpolymer, commercially available from ExxonMobil Chemical Company; Exxelor® VA 1803 amorphous ethylene copolymer functionalized with maleic anhydride, commercially available from ExxonMobil Chemical Company; Fusabond® N525 metallocene-catalyzed polyethylene, Fusabond® N416 chemically modified ethylene elastomer, Fusabond® C190 anhydride modified ethylene vinyl acetate copolymer, and Fusabond® P614 functionalized polypropylene, commercially available from E. I. du Pont de Nemours and Company; Hytrel® 3078 very low modulus thermoplastic polyester elastomer, commercially available from E. I. du Pont de Nemours and Company; Kraton® FG 1901 GT linear triblock copolymer based on styrene and ethylene/butylene with a polystyrene content of 30% and Kraton® FG1924GT linear triblock copolymer based on styrene and ethylene/butylene with a polystyrene content of 13%, commercially available from Kraton Performance Polymers Inc.; Lotader® 4603, 4700 and 4720, random copolymers of ethylene, acrylic ester and maleic anhydride, commercially available from Arkema Corporation; Nordel® IP 4770 high molecular weight semi-crystalline EPDM rubber, commercially available from The Dow Chemical Company; Nucrel® 9-1, Nucrel® 599, Nucrel® 960, Nucrel® 0407, Nucrel® 0609, Nucrel® 1214, Nucrel® 2906, Nucrel® 2940, Nucrel® 30707, Nucrel® 31001, and Nucrel® AE acid copolymers, commercially available from E. I. du Pont de Nemours and Company; Primacor® 3150, 3330, 59801, and 59901 acid copolymers, commercially available from The Dow Chemical Company; Royaltuf® 498 maleic anhydride modified polyolefin based on an amorphous EPDM, commercially available from Chemtura Corporation; Sylfat® FA2 tall oil fatty acid, commercially available from Arizona Chemical; Vamac® G terpolymer of ethylene, methylacrylate and a cure site monomer, commercially available from E. I. du Pont de Nemours and Company; and XUS 60758.08L ethylene acrylic acid copolymer with an acrylic acid content of 13.5%, commercially available from The Dow Chemical Company.

Various compositions were melt blended using components as given in TABLE III below. The compositions were neutralized by adding a cation source in an amount sufficient to neutralize, theoretically, 110% of the acid groups present in components 1 and 3, except for example 72, in which the cation source was added in an amount sufficient to neutralize 75% of the acid groups. Magnesium hydroxide was used as the cation source, except for example 68, in which magnesium hydroxide and sodium hydroxide were used in an equivalent ratio of 4:1. In addition to components 1-3 and the cation source, example 71 contains ethyl oleate plasticizer.

The relative amounts of component 1 and component 2 used are indicated in TABLE III below, and are reported in wt %, based on the combined weight of components 1 and 2. The relative amounts of component 3 used are indicated in TABLE III below, and are reported in wt %, based on the total weight of the composition

TABLE III

| Example | Component 1 | wt % | Component 2 | wt % | Component 3 | wt % |
|---|---|---|---|---|---|---|
| 1 | Primacor 5980I | 78 | Lotader 4603 | 22 | magnesium oleate | 41.6 |
| 2 | Primacor 5980I | 84 | Elvaloy AC 1335 | 16 | magnesium oleate | 41.6 |
| 3 | Primacor 5980I | 78 | Elvaloy AC 3427 | 22 | magnesium oleate | 41.6 |
| 4 | Primacor 5980I | 78 | Elvaloy AC 1335 | 22 | magnesium oleate | 41.6 |
| 5 | Primacor 5980I | 78 | Elvaloy AC 1224 | 22 | magnesium oleate | 41.6 |
| 6 | Primacor 5980I | 78 | Lotader 4720 | 22 | magnesium oleate | 41.6 |
| 7 | Primacor 5980I | 85 | Vamac G | 15 | magnesium oleate | 41.6 |
| 8 | Primacor 5980I | 90 | Vamac G | 10 | magnesium oleate | 41.6 |
| 8.1 | Primacor 5990I | 90 | Fusabond 614 | 10 | magnesium oleate | 41.6 |
| 9 | Primacor 5980I | 78 | Vamac G | 22 | magnesium oleate | 41.6 |
| 10 | Primacor 5980I | 75 | Lotader 4720 | 25 | magnesium oleate | 41.6 |
| 11 | Primacor 5980I | 55 | Elvaloy AC 3427 | 45 | magnesium oleate | 41.6 |
| 12 | Primacor 5980I | 55 | Elvaloy AC 1335 | 45 | magnesium oleate | 41.6 |
| 12.1 | Primacor 5980I | 55 | Elvaloy AC 34035 | 45 | magnesium oleate | 41.6 |
| 13 | Primacor 5980I | 55 | Elvaloy AC 2116 | 45 | magnesium oleate | 41.6 |
| 14 | Primacor 5980I | 78 | Elvaloy AC 34035 | 22 | magnesium oleate | 41.6 |
| 14.1 | Primacor 5990I | 80 | Elvaloy AC 34035 | 20 | magnesium oleate | 41.6 |
| 15 | Primacor 5980I | 34 | Elvaloy AC 34035 | 66 | magnesium oleate | 41.6 |
| 16 | Primacor 5980I | 58 | Vamac G | 42 | magnesium oleate | 41.6 |
| 17 | Primacor 5990I | 80 | Fusabond 416 | 20 | magnesium oleate | 41.6 |
| 18 | Primacor 5980I | 100 | — | — | magnesium oleate | 41.6 |
| 19 | Primacor 5980I | 78 | Fusabond 416 | 22 | magnesium oleate | 41.6 |
| 20 | Primacor 5990I | 100 | — | — | magnesium oleate | 41.6 |
| 21 | Primacor 5990I | 20 | Fusabond 416 | 80 | magnesium oleate | 41.6 |
| 21.1 | Primacor 5990I | 20 | Fusabond 416 | 80 | magnesium oleate | 31.2 |
| 21.2 | Primacor 5990I | 20 | Fusabond 416 | 80 | magnesium oleate | 20.8 |
| 22 | Clarix 011370 | 30.7 | Fusabond 416 | 69.3 | magnesium oleate | 41.6 |
| 23 | Primacor 5990I | 20 | Royaltuf 498 | 80 | magnesium oleate | 41.6 |
| 24 | Primacor 5990I | 80 | Royaltuf 498 | 20 | magnesium oleate | 41.6 |
| 25 | Primacor 5990I | 80 | Kraton FG1924GT | 20 | magnesium oleate | 41.6 |
| 26 | Primacor 5990I | 20 | Kraton FG1924GT | 80 | magnesium oleate | 41.6 |
| 27 | Nucrel 30707 | 57 | Fusabond 416 | 43 | magnesium oleate | 41.6 |
| 28 | Primacor 5990I | 80 | Hytrel 3078 | 20 | magnesium oleate | 41.6 |
| 29 | Primacor 5990I | 20 | Hytrel 3078 | 80 | magnesium oleate | 41.6 |
| 30 | Primacor 5980I | 26.8 | Elvaloy AC 34035 | 73.2 | magnesium oleate | 41.6 |
| 31 | Primacor 5980I | 26.8 | Lotader 4603 | 73.2 | magnesium oleate | 41.6 |
| 32 | Primacor 5980I | 26.8 | Elvaloy AC 2116 | 73.2 | magnesium oleate | 41.6 |
| 33 | Escor AT-320<br>Primacor 5980I | 30<br>18 | Elvaloy AC 34035 | 52 | magnesium oleate | 41.6 |
| 34 | Nucrel 30707 | 78.5 | Elvaloy AC 34035 | 21.5 | magnesium oleate | 41.6 |
| 35 | Nucrel 30707 | 78.5 | Fusabond 416 | 21.5 | magnesium oleate | 41.6 |
| 36 | Primacor 5980I | 26.8 | Fusabond 416 | 73.2 | magnesium oleate | 41.6 |
| 37 | Primacor 5980I | 19.5 | Fusabond N525 | 80.5 | magnesium oleate | 41.6 |
| 38 | Clarix 011536-01 | 26.5 | Fusabond N525 | 73.5 | magnesium oleate | 41.6 |
| 39 | Clarix 011370-01 | 31 | Fusabond N525 | 69 | magnesium oleate | 41.6 |
| 39.1 | XUS 60758.08L | 29.5 | Fusabond N525 | 70.5 | magnesium oleate | 41.6 |
| 40 | Nucrel 31001 | 42.5 | Fusabond N525 | 57.5 | magnesium oleate | 41.6 |

TABLE III-continued

| Example | Component 1 | wt % | Component 2 | wt % | Component 3 | wt % |
|---|---|---|---|---|---|---|
| 41 | Nucrel 30707 | 57.5 | Fusabond N525 | 42.5 | magnesium oleate | 41.6 |
| 42 | Escor AT-320 | 66.5 | Fusabond N525 | 33.5 | magnesium oleate | 41.6 |
| 43 | Nucrel 2906/2940 | 21 | Fusabond N525 | 79 | magnesium oleate | 41.6 |
| 44 | Nucrel 960 | 26.5 | Fusabond N525 | 73.5 | magnesium oleate | 41.6 |
| 45 | Nucrel 1214 | 33 | Fusabond N525 | 67 | magnesium oleate | 41.6 |
| 46 | Nucrel 599 | 40 | Fusabond N525 | 60 | magnesium oleate | 41.6 |
| 47 | Nucrel 9-1 | 44.5 | Fusabond N525 | 55.5 | magnesium oleate | 41.6 |
| 48 | Nucrel 0609 | 67 | Fusabond N525 | 33 | magnesium oleate | 41.6 |
| 49 | Nucrel 0407 | 100 | — | — | magnesium oleate | 41.6 |
| 50 | Primacor 5980I | 90 | Fusabond N525 | 10 | magnesium oleate | 41.6 |
| 51 | Primacor 5980I | 80 | Fusabond N525 | 20 | magnesium oleate | 41.6 |
| 52 | Primacor 5980I | 70 | Fusabond N525 | 30 | magnesium oleate | 41.6 |
| 53 | Primacor 5980I | 60 | Fusabond N525 | 40 | magnesium oleate | 41.6 |
| 54 | Primacor 5980I | 50 | Fusabond N525 | 50 | magnesium oleate | 41.6 |
| 55 | Primacor 5980I | 40 | Fusabond N525 | 60 | magnesium oleate | 41.6 |
| 56 | Primacor 5980I | 30 | Fusabond N525 | 70 | magnesium oleate | 41.6 |
| 57 | Primacor 5980I | 20 | Fusabond N525 | 80 | magnesium oleate | 41.6 |
| 58 | Primacor 5980I | 10 | Fusabond N525 | 90 | magnesium oleate | 41.6 |
| 59 | — | — | Fusabond N525 | 100 | magnesium oleate | 41.6 |
| 60 | Nucrel 0609<br>Nucrel 0407 | 40<br>40 | Fusabond N525 | 20 | | |
| 61 | Nucrel AE | 100 | — | — | magnesium oleate | 41.6 |
| 62 | Primacor 5980I | 30 | Fusabond N525 | 70 | CA1700 soya fatty acid magnesium salt | 41.6 |
| 63 | Primacor 5980I | 30 | Fusabond N525 | 70 | CA1726 linoleic acid magnesium salt | 41.6 |
| 64 | Primacor 5980I | 30 | Fusabond N525 | 70 | CA1725 conjugated linoleic acid magnesium salt | 41.6 |
| 65 | Primacor 5980I | 30 | Fusabond N525 | 70 | Century 1107 isostearic acid magnesium salt | 41.6 |
| 66 | A-C 5120 | 73.3 | Lotader 4700 | 26.7 | oleic acid magnesium salt | 41.6 |
| 67 | A-C 5120 | 73.3 | Elvaloy 34035 | 26.7 | oleic acid magnesium salt | 41.6 |
| 68 | Primacor 5980I | 78.3 | Lotader 4700 | 21.7 | oleic acid magnesium salt and sodium salt | 41.6 |
| 69 | Primacor 5980I<br>A-C 5180 | 47<br>40 | Elvaloy AC34035 | 13 | — | — |
| 70 | Primacor 5980I | 30 | Fusabond N525 | 70 | Sylfat FA2 magnesium salt | 41.6 |
| 71 | Primacor 5980I | 30 | Fusabond N525 | 70 | oleic acid magnesium salt<br>ethyl oleate | 31.2<br>10 |
| 72 | Primacor 5980I | 80 | Fusabond N525 | 20 | sebacic acid magnesium salt | 41.6 |
| 73 | Primacor 5980I<br>A-C 5180 | 60<br>40 | — | — | — | — |
| 74 | Primacor 5980I<br>A-C 575 | 78.3<br>21.7 | — | — | oleic acid magnesium salt | 41.6 |
| 75 | Primacor 5980I | 78.3 | Exxelor VA 1803 | 21.7 | oleic acid magnesium salt | 41.6 |
| 76 | Primacor 5980I | 78.3 | A-C 395 | 21.7 | oleic acid magnesium salt | 41.6 |
| 77 | Primacor 5980I | 78.3 | Fusabond C190 | 21.7 | oleic acid magnesium salt | 41.6 |
| 78 | Primacor 5980I | 30 | Kraton FG 1901 | 70 | oleic acid magnesium salt | 41.6 |
| 79 | Primacor 5980I | 30 | Royaltuf 498 | 70 | oleic acid magnesium salt | 41.6 |
| 80 | A-C 5120 | 40 | Fusabond N525 | 60 | oleic acid magnesium salt | 41.6 |
| 81 | Primacor 5980I | 30 | Fusabond N525 | 70 | erucic acid magnesium salt | 41.6 |
| 82 | Primacor 5980I | 30 | CB23 | 70 | oleic acid magnesium salt | 41.6 |
| 83 | Primacor 5980I | 30 | Nordel IP 4770 | 70 | oleic acid magnesium salt | 41.6 |
| 84 | Primacor 5980I<br>A-C 5180 | 48<br>32 | Fusabond N525 | 20 | oleic acid magnesium salt | 41.6 |
| 85 | Nucrel 2806 | 22.2 | Fusabond N525 | 77.8 | oleic acid magnesium salt | 41.6 |
| 86 | Primacor 3330 | 61.5 | Fusabond N525 | 38.5 | oleic acid magnesium salt | 41.6 |
| 87 | Primacor 3330<br>Primacor 3150 | 45.5<br>34.5 | Fusabond N525 | 20 | oleic acid magnesium salt | 41.6 |

TABLE III-continued

| Example | Component 1 | wt % | Component 2 | wt % | Component 3 | wt % |
|---|---|---|---|---|---|---|
| 88 | Primacor 3330 | 28.5 | — | — | oleic acid magnesium salt | 41.6 |
|  | Primacor 3150 | 71.5 |  |  |  |  |
| 89 | Primacor 3150 | 67 | Fusabond N525 | 33 | oleic acid magnesium salt | 41.6 |
| 90 | Primacor 5980I | 55 | Elvaloy AC 34035 | 45 | oleic acid magnesium salt | 31.2 |
|  |  |  |  |  | ethyl oleate | 10 |

Solid spheres of each composition were injection molded, and the solid sphere COR, compression, Shore D hardness, and Shore C hardness of the resulting spheres were measured after two weeks. The results are reported in TABLE IV below. The surface hardness of a sphere is obtained from the average of a number of measurements taken from opposing hemispheres, taking care to avoid making measurements on the parting line of the sphere or on surface defects, such as holes or protrusions. Hardness measurements are made pursuant to ASTM D-2240 "Indentation Hardness of Rubber and Plastic by Means of a Durometer." Because of the curved surface, care must be taken to insure that the sphere is centered under the durometer indentor before a surface hardness reading is obtained. A calibrated, digital durometer, capable of reading to 0.1 hardness units is used for all hardness measurements and is set to record the maximum hardness reading obtained for each measurement. The digital durometer must be attached to, and its foot made parallel to, the base of an automatic stand. The weight on the durometer and attack rate conform to ASTM D-2240.

TABLE IV

| Ex. | Solid Sphere COR | Solid Sphere Compression | Solid Sphere Shore D | Solid Sphere Shore C |
|---|---|---|---|---|
| 1 | 0.845 | 120 | 59.6 | 89.2 |
| 2 | * | * | * | * |
| 3 | 0.871 | 117 | 57.7 | 88.6 |
| 4 | 0.867 | 122 | 63.7 | 90.6 |
| 5 | 0.866 | 119 | 62.8 | 89.9 |
| 6 | * | * | * | * |
| 7 | * | * | * | * |
| 8 | * | * | * | * |
| 8.1 | 0.869 | 127 | 65.3 | 92.9 |
| 9 | * | * | * | * |
| 10 | * | * | * | * |
| 11 | * | * | * | * |
| 12 | 0.856 | 101 | 55.7 | 82.4 |
| 12.1 | 0.857 | 105 | 53.2 | 81.3 |
| 13 | * | * | * | * |
| 14 | 0.873 | 122 | 64.0 | 91.1 |
| 14.1 | * | * | * | * |
| 15 | * | * | * | * |
| 16 | * | * | * | * |
| 17 | 0.878 | 117 | 60.1 | 89.4 |
| 18 | 0.853 | 135 | 67.6 | 94.9 |
| 19 | * | * | * | * |
| 20 | 0.857 | 131 | 66.2 | 94.4 |
| 21 | 0.752 | 26 | 34.8 | 57.1 |
| 21.1 | 0.729 | 9 | 34.3 | 56.3 |
| 21.2 | 0.720 | 2 | 33.8 | 55.2 |
| 22-29 | * | * | * | * |
| 30 | ** | 66 | 42.7 | 65.5 |
| 31 | 0.730 | 67 | 45.6 | 68.8 |
| 32 | ** | 100 | 52.4 | 78.2 |
| 33 | 0.760 | 64 | 43.6 | 64.5 |
| 34 | 0.814 | 91 | 52.8 | 80.4 |
| 35-50 | * | * | * | * |
| 51 | 0.873 | 121 | 61.5 | 90.2 |
| 52 | 0.870 | 116 | 60.4 | 88.2 |
| 53 | 0.865 | 107 | 57.7 | 84.4 |
| 54 | 0.853 | 97 | 53.9 | 80.2 |
| 55 | 0.837 | 82 | 50.1 | 75.5 |
| 56 | 0.818 | 66 | 45.6 | 70.7 |
| 57 | 0.787 | 45 | 41.3 | 64.7 |
| 58 | 0.768 | 26 | 35.9 | 57.3 |
| 59-90 | * | * | * | * |

* not measured
** sphere broke during measurement

When numerical lower limits and numerical upper limits are set forth herein, it is contemplated that any combination of these values may be used. All patents, publications, test procedures, and other references cited herein, including priority documents, are fully incorporated by reference to the extent such disclosure is not inconsistent with this invention and for all jurisdictions in which such incorporation is permitted.

Tc (2) Plasticized Thermoplastic Compositions

In general, the thermoplastic composition used to form the outer core layer of golf balls of the invention may comprise: a) an acid copolymer of ethylene and an $\alpha,\beta$-unsaturated carboxylic acid, optionally including a softening monomer selected from the group consisting of alkyl acrylates and methacrylates; and b) a plasticizer. A cation source may be present in an amount sufficient to neutralize from about 0% to about 100% of all acid groups present in the composition. In one preferred embodiment, the cation source is present in an amount sufficient to neutralize greater than 20% of all acid groups present in the composition. In one embodiment, the thermoplastic composition comprises a fatty acid salt.

The composition may comprise a highly-neutralized polymer (HNP); partially-neutralized acid polymer; or lowly-neutralized or non-neutralized acid polymer, and blends thereof as described further below. For example, Tc(1) highly-neutralized polymers, discussed above, are suitable.

The thermoplastic composition may further comprise a non-acid polymer and optional additives and fillers. Suitable non-acid polymers include, for example, polyolefins, polyamides, polyesters, polyethers, polyurethanes, metallocene-catalyzed polymers, single-site catalyst polymerized polymers, ethylene propylene rubber, ethylene propylene diene rubber, styrenic block copolymer rubbers, alkyl acrylate rubbers, and functionalized derivatives thereof. Various plasticizers may be used in the compositions of the inner core. For example, the thermoplastic composition may comprise a fatty acid ester, particularly an alkyl oleate, and more particularly ethyl oleate. The thermoplastic composition may comprise about 3 to about 50% by weight plasticizer, more preferably about 8 to about 42%, and even more preferably about 10 to about 30%, plasticizer based on weight of composition.

The plasticized HNP compositions of the present invention optionally contain one or more melt-flow modifiers. The amount of melt-flow modifier in the composition is readily determined such that the melt-flow index of the composition is at least 0.1 g/10 min, preferably from 0.5 g/10 min to 10.0 g/10 min, and more preferably from 1.0 g/10 min to 6.0 g/10 min, as measured using ASTM D-1238, condition E, at 190° C., using a 2160 gram weight.

It is not required that a conventional melt-flow modifier be added to the plasticized HNP composition of this invention. Such melt-flow modifiers are optional. If a melt-flow modifier is added, it may be selected from the group of traditional melt-flow modifiers including, but not limited to, the high molecular weight organic acids and salts thereof disclosed above, polyamides, polyesters, polyacrylates, polyurethanes, polyethers, polyureas, polyhydric alcohols, and combinations thereof. Also suitable are the non-fatty acid melt-flow modifiers disclosed in U.S. Pat. Nos. 7,365,128 and 7,402,629, the entire disclosures of which are hereby incorporated herein by reference. However, as discussed above, certain plasticizers are added to the composition of this invention, and it is recognized that such plasticizers may modify the melt-flow of the composition in some instances.

Suitable ionomeric compositions comprise one or more acid polymers, each of which is partially- or fully-neutralized, and optionally additives, fillers, and/or melt-flow modifiers. Suitable acid polymers are salts of homopolymers and copolymers of $\alpha,\beta$-ethylenically unsaturated mono- or dicarboxylic acids, and combinations thereof, optionally including a softening monomer, and preferably having an acid content (prior to neutralization) of from 1 wt % to 30 wt %, more preferably from 5 wt % to 20 wt %. The acid polymer is preferably neutralized to 70% or higher, including up to 100%, with a suitable cation source, such as metal cations and salts thereof, organic amine compounds, ammonium, and combinations thereof. Preferred cation sources are metal cations and salts thereof, wherein the metal is preferably lithium, sodium, potassium, magnesium, calcium, barium, lead, tin, zinc, aluminum, manganese, nickel, chromium, copper, or a combination thereof.

Suitable additives and fillers include, for example, blowing and foaming agents, optical brighteners, coloring agents, fluorescent agents, whitening agents, UV absorbers, light stabilizers, defoaming agents, processing aids, mica, talc, nanofillers, antioxidants, stabilizers, softening agents, fragrance components, impact modifiers, acid copolymer wax, surfactants; inorganic fillers, such as zinc oxide, titanium dioxide, tin oxide, calcium oxide, magnesium oxide, barium sulfate, zinc sulfate, calcium carbonate, zinc carbonate, barium carbonate, mica, talc, clay, silica, lead silicate, and the like; high specific gravity metal powder fillers, such as tungsten powder, molybdenum powder, and the like; regrind, i.e., core material that is ground and recycled; and nano-fillers. Suitable melt-flow modifiers include, for example, fatty acids and salts thereof, polyamides, polyesters, polyacrylates, polyurethanes, polyethers, polyureas, polyhydric alcohols, and combinations thereof.

Suitable ionomeric compositions include blends of highly neutralized polymers (i.e., neutralized to 70% or higher) with partially neutralized ionomers as disclosed, for example, in U.S. Patent Application Publication No. 2006/0128904, the entire disclosure of which is hereby incorporated herein by reference. Suitable ionomeric compositions also include blends of one or more partially- or fully-neutralized polymers with additional thermoplastic and thermoset materials, including, but not limited to, non-ionomeric acid copolymers, engineering thermoplastics, fatty acid/salt-based highly neutralized polymers, polybutadienes, polyurethanes, polyureas, polyesters, polycarbonate/polyester blends, thermoplastic elastomers, maleic anhydride-grafted metallocene-catalyzed polymers, and other conventional polymeric materials.

Suitable ionomeric compositions are further disclosed, for example, in U.S. Pat. Nos. 6,653,382, 6,756,436, 6,777,472, 6,894,098, 6,919,393, and 6,953,820, the entire disclosures of which are hereby incorporated herein by reference.

Examples of commercially available thermoplastics suitable for forming core layers of golf balls disclosed herein include, but are not limited to, Pebax® thermoplastic polyether block amides, commercially available from Arkema Inc.; Surlyn® ionomer resins, Hytrel® thermoplastic polyester elastomers, and ionomeric materials sold under the trade names DuPont® HPF 1000 and HPF 2000, HPF AD 1035, HPF AD 1035 Soft, HPF AD 1040, all of which are commercially available from E. I. du Pont de Nemours and Company; Iotek® ionomers, commercially available from ExxonMobil Chemical Company; Amplify® IO ionomers of ethylene acrylic acid copolymers, commercially available from The Dow Chemical Company; Clarix® ionomer resins, commercially available from A. Schulman Inc.; Elastollan® polyurethane-based thermoplastic elastomers, commercially available from BASF; and Xylex® polycarbonate/polyester blends, commercially available from SABIC Innovative Plastics.

The thermoplastic compositions, which are described further below as being suitable for making cover layers, are also suitable for forming the core and cover layers of the golf balls herein, once the compositions are plasticized per this invention.

In a particular embodiment, the plasticized thermoplastic core or cover composition comprises a material selected from the group consisting of partially- and fully-neutralized ionomers optionally blended with a maleic anhydride-grafted non-ionomeric polymer, polyesters, polyamides, polyethers, and blends of two or more thereof and plasticizer.

In another particular embodiment, the plasticized thermoplastic core or cover composition is a blend of two or more ionomers and plasticizer. In a particular aspect of this embodiment, the thermoplastic composition is a 50 wt %/50 wt % blend of two different partially-neutralized ethylene/methacrylic acid polymers. In another particular embodiment, the plasticized thermoplastic core or cover composition is a blend of one or more ionomers and a maleic anhydride-grafted non-ionomeric polymer and plasticizer. In a particular aspect of this embodiment, the non-ionomeric polymer is a metallocene-catalyzed polymer. In another particular aspect of this embodiment, the ionomer is a partially-neutralized ethylene/methacrylic acid polymer and the non-ionomeric polymer is a maleic anhydride-grafted metallocene-catalyzed polymer. In another particular aspect of this embodiment, the ionomer is a partially-neutralized ethylene/methacrylic acid polymer and the non-ionomeric polymer is a maleic anhydride-grafted metallocene-catalyzed polyethylene.

The plasticized thermoplastic core layer is optionally treated or admixed with a thermoset diene composition to reduce or prevent flow upon overmolding. Optional treatments may also include the addition of peroxide to the material prior to molding, or a post-molding treatment with, for example, a crosslinking solution, electron beam, gamma radiation, isocyanate or amine solution treatment, or the like. Such treatments may prevent the intermediate layer from melting and flowing or "leaking" out at the mold equator, as the thermoset outer core layer is molded thereon at a temperature necessary to crosslink the outer core layer, which is typically from 280° F. to 360° F. for a period of about 5 to 30 minutes.

Suitable thermoplastic core compositions, which are plasticized in accordance with the present invention, are further disclosed, for example, in U.S. Pat. Nos. 5,919,100, 6,872,774 and 7,074,137, the entire disclosures of which are hereby incorporated herein by reference.

As discussed above, in one preferred embodiment, at least 70% of the acid groups in the acid copolymer are neutralized, and these materials are referred to as HNP materials herein. However, it is understood that other acid copolymer compositions may be used in accordance with the present invention. For example, acid copolymer compositions having acid groups that are neutralized from about 20% to about less than 70% may be used, and these materials may be referred to as partially-neutralized ionomers. For example, the partially-neutralized ionomers may have a neutralization level of about 30% to about 65%, and more particularly about 35% to 60%.

Preferred ionomers are salts of O/X- and O/X/Y-type acid copolymers, wherein O is an α-olefin, X is a $C_3$-$C_8$ α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth)acrylate and alkyl(meth)acrylates wherein the alkyl groups have from 1 to 8 carbon atoms, including, but not limited to, n-butyl(meth)acrylate, isobutyl(meth)acrylate, methyl(meth)acrylate, and ethyl (meth)acrylate.

Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid monoester, ethylene/maleic acid, ethylene/maleic acid mono-ester, ethylene/(meth)acrylic acid/n-butyl(meth)acrylate, ethylene/(meth)acrylic acid/iso-butyl(meth)acrylate, ethylene/(meth)acrylic acid/methyl(meth)acrylate, ethylene/(meth)acrylic acid/ethyl(meth)acrylate terpolymers, and the like. The term, "copolymer," as used herein, includes polymers having two types of monomers, those having three types of monomers, and those having more than three types of monomers. Preferred α,β-ethylenically unsaturated mono- or dicarboxylic acids are (meth)acrylic acid, ethacrylic acid, maleic acid, crotonic acid, fumaric acid, itaconic acid. (Meth)acrylic acid is most preferred. As used herein, "(meth)acrylic acid" means methacrylic acid and/or acrylic acid. Likewise, "(meth)acrylate" means methacrylate and/or acrylate.

The O/X or O/X/Y-type copolymer is at least partially neutralized with a cation source. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals.

Also, as discussed above, it is recognized that the cation source is optional, and non-neutralized or lowly-neutralized compositions may be used. For example, acid copolymers having 0% to less than 20% neutralization levels may be used. Acid copolymer compositions containing plasticizers and having zero percent of the acid groups neutralized may be used per this invention. Also, acid copolymer ionomer compositions containing plasticizers, wherein 1 to 19% of the acid groups are neutralized, may be used. Particularly, acid copolymers having about about 3% to about 18% and more particularly about 6% to about 15% neutralization levels may be used in accordance with this invention.

It is also recognized that acid copolymer blends may be prepared including, but not limited to, acid copolymer compositions formed from: i) blends of two or more partially-neutralized ionomers; ii) blends of two or more highly-neutralized ionomers; iii) blends of two or more non-neutralized acid copolymers and/or lowly-neutralized ionomers; iv) blends of one or more highly-neutralized ionomers with one or more partially-neutralized ionomers, and/or lowly-neutralized ionomers, and/or non-neutralized acid copolymers; v) blends of partially-neutralized ionomers with one or more highly-neutralized ionomers, and/or lowly-neutralized ionomers, and/or non-neutralized acid copolymers.

As discussed above, the ethylene acid copolymer compositions of this invention contain a plasticizer. Adding the plasticizers helps to reduce the glass transition temperature (Tg) of the composition. The glass transition in a polymer is a temperature range below which a polymer is relatively brittle and above which it is rubber-like. In addition to lowering the Tg, the plasticizer may also reduce the tan δ in the temperature range above the Tg. The Tg of a polymer is measured by a Differential Scanning calorimeter or a Dynamic Mechanical Analyzer (DMA) and the DMA is used to measure tan δ. The plasticizer may also reduce the hardness and compression of the composition when compared to its non-plasticized condition. The effects of adding a plasticizer to the ethylene acid copolymer composition on Tg, flex modulus, hardness, and other physical properties are discussed further below.

The ethylene acid copolymer compositions may contain one or more plasticizers. The plasticizers that may be used in the ethylene acid copolymer compositions of this invention include, for example, N-butylbenzenesulfonamide (BBSA); N-ethylbenzenesulfonamide (EBSA); N-propyl-benzenesulfonamide (PBSA); N-butyl-N-dodecylbenzenesulfonamide (BDBSA); N,N-dimethylbenzenesulfonamide (DMBSA); p-methylbenzenesulfonamide; o,p-toluene sulfonamide; p-toluene sulfonamide; 2-ethylhexyl-4-hydroxybenzoate; hexadecyl-4-hydroxybenzoate; 1-butyl-4-hydroxybenzoate; dioctyl phthalate; diisodecyl phthalate; di-(2-ethylhexyl) adipate; and tri-(2-ethylhexyl)phosphate.

In one preferred version, the plasticizer is selected from the group of polytetramethylene ether glycol (available from BASF under the tradename, PolyTHF™ 250); propylene carbonate (available from Huntsman Corp., under the tradename, Jeffsol™ PC); and/or dipropyleneglycol dibenzoate (available from Eastman Chemical under the tradename, Benzoflex™ 284). Mixtures of these plasticizers also may be used.

Other suitable plasticizer compounds include benzene mono-, di-, and tricarboxylic acid esters. Phthalates such as Bis(2-ethylhexyl) phthalate (DEHP), Diisononyl phthalate (DINP), Di-n-butyl phthalate (DnBP, DBP), Butyl benzyl phthalate (BBP), Diisodecyl phthalate (DIDP), Dioctyl phthalate (DnOP), Diisooctyl phthalate (DIOP), Diethyl phthalate (DEP), Diisobutyl phthalate (DIBP), and Di-n-hexyl phthalate are suitable. Iso- and terephthalates such as Dioctyl terephthalate and Dinonyl isophthalate may be used. Also appropriate are trimellitates such as Trimethyl trimellitate (TMTM), Tri-(2-ethylhexyl)trimellitate (TOTM), Tri-(n-octyl,n-decyl)trimellitate, Tri-(heptyl,nonyl)trimellitate, Tri-n-octyl trimellitate; as well as benzoates, including: 2-ethylhexyl-4-hydroxy benzoate, n-octyl benzoate, methyl benzoate, and ethyl benzoate.

Also suitable are alkyl diacid esters commonly based on C4-C12 alkyl dicarboxylic acids such as adipic, sebacic, azelaic, and maleic acids such as: Bis(2-ethylhexyl)adipate (DEHA), Dimethyl adipate (DMAD), Monomethyl adipate (MMAD), Dioctyl adipate (DOA), Dibutyl sebacate (DBS), Dibutyl maleate (DBM), Diisobutyl maleate (DIBM), Dioctyl sebacate (DOS). Also, esters based on glycols, polyglycols and polyhydric alcohols such as poly(ethylene glycol) mono- and di-esters, cyclohexanedimethanol esters, sorbitol derivatives; and triethylene glycol dihexanoate, diethylene glycol di-2-ethylhexanoate, tetraethylene glycol diheptanoate, and ethylene glycol dioleate may be used.

Fatty acids, fatty acid salts, fatty acid amides, and fatty acid esters also may be used in the compositions of this invention. Compounds such as stearic, oleic, ricinoleic, behenic, myristic, linoleic, palmitic, and lauric acid esters, salts, and mono- and bis-amides can be used. Ethyl oleate, butyl stearate, methyl acetylricinoleate, zinc oleate, ethylene bis-oleamide, and stearyl erucamide are suitable. Suitable fatty acid salts include, for example, metal stearates, erucates, laurates, oleates, palmitates, pelargonates, and the like. For example, fatty acid salts such as zinc stearate, calcium stearate, magnesium stearate, barium stearate, and the like can be used. Fatty alcohols and acetylated fatty alcohols are also suitable, as are carbonate esters such as propylene carbonate and ethylene carbonate. In a particularly preferred version, the fatty acid ester, ethyl oleate is used as the plasticizer.

Glycerol-based esters such as soy-bean, tung, or linseed oils or their epoxidized derivatives can also be used as plasticizers in the present invention, as can polymeric polyester plasticizers formed from the esterification reaction of diacids and diglycols as well as from the ring-opening polymerization reaction of caprolactones with diacids or diglycols. Citrate esters and acetylated citrate esters are also suitable. Glycerol mono-, di-, and tri-oleates may be used per this invention, and in one preferred embodiment, glycerol trioleate is used as the plasticizer.

Dicarboxylic acid molecules containing both a carboxylic acid ester and a carboxylic acid salt can perform suitably as plasticizers. The magnesium salt of mono-methyl adipate and the zinc salt of mono-octyl glutarate are two such examples for this invention. Tri- and tetra-carboxylic acid esters and salts can also be used.

Also envisioned as suitable plasticizers are organophosphate and organosulfur compounds such as tricresyl phosphate (TCP), tributyl phosphate(TBP), alkyl sulfonic acid phenyl esters (ASE); and sulfonamides such as N-ethyl toluene sulfonamide, N-(2-hydroxypropyl)benzene sulfonamide, N-(n-butyl)benzene sulfonamide. Furthermore, thioester and thioether variants of the plasticizer compounds mentioned above are suitable.

Non-ester plasticizers such as alcohols, polyhydric alcohols, glycols, polyglycols, and polyethers also are suitable materials for plasticization. Materials such as polytetramethylene ether glycol, poly(ethylene glycol), and poly(propylene glycol), oleyl alchohol, and cetyl alcohol can be used. Hydrocarbon compounds, both saturated and unsaturated, linear or cyclic can be used such as mineral oils, microcrystalline waxes, or low-molecular weight polybutadiene. Halogenated hydrocarbon compounds can also be used.

Other examples of plasticizers that may be used in the ethylene acid copolymer composition of this invention include butylbenzenesulphonamide (BBSA), ethylhexyl para-hydroxybenzoate (EHPB) and decylhexyl para-hydroxybenzoate (DHPB), as disclosed in Montanari et al., U.S. Pat. No. 6,376,037, the disclosure of which is hereby incorporated by reference.

Esters and alkylamides such as phthalic acid esters including dimethyl phthalate, diethyl phthalate, dibutyl phthalate, diheptyl phthalate, di-2-ethylhexyl phthalate, di-n-octyl phthalate, diisodecyl phthalate, ditridecyl phthalate, dicyclohexyl phthalate, butylbenzyl phthalate, diisononyl phthalate, ethylphthalylethyl glycolate, butylphthalylbutyl glycolate, diundecyl phthalate, di-2-ethylhexyl tetrahydrophthalate as disclosed in Isobe et al., U.S. Pat. No. 6,538,099, the disclosure of which is hereby incorporated by reference, also may be used.

Jacques et al., U.S. Pat. No. 7,045,185, the disclosure of which is hereby incorporated by reference, discloses sulphonamides such as N-butylbenzenesulphonamide, ethyltoluene-suiphonamide, N-cyclohexyltoluenesulphonamide, 2-ethylhexyl-para-hydroxybenzoate, 2-decylhexyl-para-hydroxybenzoate, oligoethyleneoxytetrahydrofurfuryl alcohol, or oligoethyleneoxy malonate; esters of hydroxybenzoic acid; esters or ethers of tetrahydrofurfuryl alcohol, and esters of citric acid or hydroxymalonic acid; and these plasticizers also may be used.

Sulfonamides also may be used in the present invention, and these materials are described in Fish, Jr. et al., U.S. Pat. No. 7,297,737, the disclosure of which is hereby incorporated by reference. Examples of such sulfonamides include N-alkyl benzenesulfonamides and toluenesufonamides, particularly N-butylbenzenesulfonamide, N-(2-hydroxypropyl) benzenesulfonamide, N-ethyl-o-toluenesulfonamide, N-ethyl-p-toluenesulfonamide, o-toluenesulfonamide, p-toluenesulfonamide. Such sulfonamide plasticizers also are described in Hochstetter et al., US Patent Application Publication 2010/0183837, the disclosure of which is hereby incorporated by reference.

As noted above, the fatty acid esters are particularly preferred plasticizers in the present invention. It has been found that the fatty acid esters perform well as plasticizers in the ethylene acid copolymer composition. The fatty acid esters have several advantageous properties. For example, the fatty acid esters are compatible with the ethylene acid copolymers and they tend to blend uniformly and completely with the acid copolymer. Also, the fatty acid esters tend to improve the resiliency and/or compression of the composition as discussed further below. The ethylene acid copolymer/plasticizer compositions may contain other ingredients that do not materially affect the basic and novel characteristics of the composition. For example, mineral fillers may be added as discussed above. In one particular version, the composition consists essentially of ethylene acid copolymer and plasticizer, particularly a fatty acid ester. In another particular version, the composition consists essentially of ethylene acid copolymer, cation source sufficient to neutralize at least 20% of the acid groups present in the composition, and plasticizer, particularly a fatty acid ester.

One method of preparing the fatty acid ester involves reacting the fatty acid or mixture of fatty acids with a corresponding alcohol. The alcohol can be any alcohol including, but not limited to, linear, branched, and cyclic alcohols. The fatty acid ester is commonly a methyl, ethyl, n-propyl, or butyl ester of a carboxylic acid that contains from 4 to 30 carbon atoms. In the present invention, ethyl esters and particularly ethyl oleate are preferred fatty acid esters because of their properties. The carboxylic acid may be saturated or unsaturated. Examples of suitable saturated carboxylic acids, that is, carboxylic acids in which the carbon atoms of the alkyl chain are connected by single bonds, include but are not limited to butyric acid (chain length of $C_4$ and molecular weight of 88.1); capric acid ($C_{10}$ and MW of 172.3); lauric acid ($C_{12}$ and MW of 200.3); myristic acid ($C_{14}$ and MW of 228.4); palmitic acid ($C_{16}$ and MW of 256.4); stearic acid ($C_{18}$ and MW of 284.5); and behenic acid ($C_{22}$ and MW of 340.6). Examples of suitable unsaturated carboxylic acids, that is, a carboxylic acid in which there is one or more double bonds between the carbon atoms in the alkyl chain, include but are not limited to oleic acid (chain length and unsaturation C18:1; and MW of 282.5); linoleic acid (C18:2 and MW of 280.5; linolenic acid (C18:3 and MW of 278.4); and erucic acid (C22:1 and MW of 338.6).

It is believed that the plasticizer should be added in a sufficient amount to the ethylene acid copolymer composition so there is a substantial change in the stiffness and/or hardness of the ethylene acid copolymer. Thus, although the concentration of plasticizer may be as little as 1% by weight to form some ethylene acid copolymer compositions per this invention, it is preferred that the concentration be relatively greater. For example, it is preferred that the concentration of the plasticizer be at least 3 weight percent (wt. %). More particularly, it is preferred that the plasticizer be present in an amount within a range having a lower limit of 1% or 3% or 5% or 7% or 8% or 10% or 12% or 15% or 18% and an upper limit of 20% or 22% or 25% or 30% or 35% or 40% or 42% or 50% or 55% or 60% or 66% or 71% or 75% or 80%. In one preferred embodiment, the concentration of plasticizer falls within the range of about 7% to about 75%, preferably about 9% to about 55%, and more preferably about 15% to about 50%.

It is believed that adding the plasticizer to the ethylene acid copolymer helps make the composition softer and more rubbery. Adding the plasticizers to the composition helps decrease the stiffness of the composition. That is, the plasticizer helps lower the flex modulus of the composition. The flex modulus refers to the ratio of stress to strain within the elastic limit (when measured in the flexural mode) and is similar to tensile modulus. This property is used to indicate the bending stiffness of a material. The flexural modulus, which is a modulus of elasticity, is determined by calculating the slope of the linear portion of the stress-strain curve during the bending test. If the slope of the stress-strain curve is relatively steep, the material has a relatively high flexural modulus meaning the material resists deformation. The material is more rigid. If the slope is relatively flat, the material has a relatively low flexural modulus meaning the material is more easily deformed. The material is more flexible. The flex modulus can be determined in accordance with ASTM D790 standard among other testing procedures. Thus, in one embodiment, the first ethylene acid copolymer (containing ethylene acid copolymer only) composition has a first flex modulus value and the second ethylene acid copolymer (containing ethylene acid copolymer and plasticizer) composition has a second flex modulus value, wherein the second flex modulus value is at least 1% less; or at least 2% less; or at least 4% less; or at least 8% less; or at least 10% less than the first modulus value.

Plasticized thermoplastic compositions of the present invention are not limited by any particular method or any particular equipment for making the compositions. In a preferred embodiment, the composition is prepared by the following process. The acid copolymer(s), plasticizer, optional melt-flow modifier(s), and optional additive(s)/filler(s) are simultaneously or individually fed into a melt extruder, such as a single or twin screw extruder. If the acid polymer is to be neutralized, a suitable amount of cation source is then added to achieve the desired level of neutralization neutralized. The acid polymer may be partially or fully neutralized prior to the above process. The components are intensively mixed prior to being extruded as a strand from the die-head. Additional methods for incorporating plasticizer into the thermoplastic compositions herein are disclosed in co-pending U.S. patent application Ser. No. 13/929,841, as well as in U.S. Pat. Nos. 8,523,708 and 8,523,709, which are fully incorporated by reference herein.

More particularly, in one embodiment, the ethylene acid copolymer/plasticizer composition has a flex modulus lower limit of about 500 (or less), 1,000, 1,600, 2,000, 4,200, 7,500, 9,000, 10,000 or 20,000 or 40,000 or 50,000 or 60,000 or 70,000 or 80,000 or 90,000 or 100,000; and a flex modulus upper limit of about 110,000 or 120,000 or 130,000 psi or 140,000 or 160,000 or 180,000 or 200,000 or 300,000 or greater. In general, the properties of flex modulus and hardness are related, whereby flex modulus measures the material's resistance to bending, and hardness measures the material's resistance to indentation. In general, as the flex modulus of the material increases, the hardness of the material also increases. As discussed above, adding the plasticizer to the ethylene acid copolymer helps reduce the flex modulus of the composition and it also helps reduce hardness to a certain degree. Thus, in one embodiment, the ethylene acid copolymer/plasticizer composition is relatively soft and having a hardness of no greater than 40 Shore D or no greater than 55 Shore C. For example, the Shore D hardness may be within a range having a lower limit of 5 or 8 or 10 or 12 or 14 and an upper limit of 28 or 30 or 32 or 34 or 35 or 38 or 40 Shore D. The Shore C hardness may be within the range having a lower limit of 10 or 13 or 15 or 17 or 19 and an upper limit of 44 or 46 or 48 or 50 or 53 or 55 Shore C. In other embodiments, the ethylene acid copolymer/plasticizer composition is moderately soft having a hardness of no greater than about 60 Shore D or no greater than 75 Shore C. For example, the Shore D hardness may be within a range having a lower limit of 25, 28, 20, 32, 35, 36, 38, or 40, and an upper limit of 42, 45, 48, 50, 54, 56, or 60. The Shore C hardness may be within the range of having a lower limit of 30, 33, 35, 37, 39, 41, or 43, and an upper limit of 62, 64, 66, 68, 71, 73 or 75 Shore C. In yet other embodiments, the ethylene acid copolymer/plasticizer composition is moderately hard having a hardness no greater than 95 Shore D or no greater than 99C. For example, the Shore D hardness may be within the range having a lower limit of about 42, 44, 47, 51, 53, or 58 and an upper limit of about 60, 65, 72, 77, 80, 84, 91, or 95 Shore D. The Shore C hardness may be within the range having a lower limit of 57, 59, 62, 66, or 72 and an upper limit of about 75, 78, 84, 87, 90, 93, 95, 97, or 99 Shore C.

It also is believed that adding the plasticizer to the ethylene acid copolymer composition helps reduce the glass transition temperature (Tg) of the composition in many instances. Thus, in one embodiment, the first ethylene acid copolymer (containing ethylene acid copolymer only) composition has a first Tg value and the second ethylene acid copolymer (containing ethylene acid copolymer and plasticizer) composition has a second Tg value, wherein the second Tg value is at least 1 degree (1°) less; or at least 2° less; or at least 4° less; or at least 8°; or at least 10° less than the first Tg value. In other embodiments, the first Tg value and the second Tg value are approximately the same.

In addition, introducing the specific plasticizers of this invention into the ethylene acid copolymer composition generally helps to reduce the compression and/or increase the COR of the composition (when molded into a solid sphere and tested) versus a non-plasticized composition (when molded into a solid sphere and tested.) Plasticized ethylene acid copolymer compositions typically show compression values lower, or at most equal to, non-plasticized compositions while the plasticized compositions display COR values that may be higher, or at the least equal to, non-plasticized compositions. This effect is surprising, because in many conventional compositions, the compression of the composition increases as the COR increases. In some instances plasticization of the composition might produce a slight reduction in the COR while at the same time reducing the compression to a greater extent, thereby providing an overall improvement to the compression/COR relationship over the non-plasticized composition. In this regard, TABLES V through VII below provide such comparisons for HPF, Surlyn and Nucrel compositions, respectively.

TABLE V

HPF Compositions

| Example | Solid Sphere COR | Solid Sphere Compression | Solid Sphere Shore D Hardness | Solid Sphere Shore C Hardness |
|---|---|---|---|---|
| HPF AD1035 | 0.822 | 63 | 41.7 | 70.0 |
| HPF AD1035 Soft | 0.782 | 35 | 35.6 | 59.6 |
| HPF 2000 | 0.856 | 91 | 46.1 | 76.5 |
| HPF 2000 with 10% EO | 0.839 | 68 | 37.9 | 68.8 |
| HPF 2000 with 20% EO | 0.810 | 32 | 30.2 | 53.0 |
| HPF 2000 with 30% EO | 0.768 | −12 | 22.7 | 39.4 |

HPF AD1035 is an acid copolymer ionomer resin, available from the DuPont Company; HPF AD1035 Soft is an acid copolymer ionomer resin, available from the DuPont Company; HPF 2000 is an acid copolymer ionomer resin, available from the DuPont Company; and EO is ethyl oleate (plasticizer).

TABLE VI

Surlyn 9320 Compositions

| Example | Solid Sphere COR | Solid Sphere Compression | Solid Sphere Shore D Hardness | Solid Sphere Shore C Hardness |
|---|---|---|---|---|
| Surlyn 9320 | 0.559 | 40 | 37.2 | 62.1 |
| Surlyn 9320 with 10% EO | 0.620 | 6 | 26.3 | 45.8 |
| Surlyn 9320 with 20% EO | 0.618 | −31 | 24.9 | 38.4 |
| Surlyn 9320 with 30% EO | 0.595 | −79 | 18.7 | 28.0 |

Surlyn 9320 is based on a copolymer of ethylene with 23.5% n-butyl acrylate and about 9% methacrylic acid that is about 41% neutralized with a zinc cation source, available from the DuPont Company.

TABLE VII

Nucrel 9-1 Compositions

| Example | Solid Sphere COR | Solid Sphere Compression | Solid Sphere Shore D Hardness | Solid Sphere Shore C Hardness |
|---|---|---|---|---|
| Nucrel 9-1 | 0.449 | −37 | 23.2 | 40.3 |
| Nucrel 9-1 with 10% EO | 0.501 | −67 | 19.1 | 26.3 |

Nucrel 9-1 is a copolymer of ethylene with 23.5% n-butyl acrylate, and about 9% methacrylic acid that is non-neutralized, available from the DuPont Company.

Tc (3) Transparent or Plasticized Polyamide Compositions

The transparent polyamide by itself, may comprise a homopolymer, copolymers including block copolymer, or a blend or alloy thereof. In one preferred embodiment, the composition further comprises an acid anhydride-modified polyolefin and/or plasticizer as discussed below. The term, "polymer" refers to, but is not limited to, oligomers, homopolymers, copolymers, terpolymers, and the like. The polymers may have various structures including, but not limited to, regular, irregular, alternating, periodic, random, block, graft, linear, branched, isotactic, syndiotactic, atactic, and the like. Polyamide polymers include, but are not limited to, polyamide copolymers (copolyamides) having two types of monomers, copolymers having three types of monomers, and copolymers having more than three types of monomers. Blends and alloys of polyamides also may be made in accordance with this invention as described further below.

In general, transparent polyamides are classified as having a microcrystalline structure or amorphous structure. Both microcrystalline and amorphous transparent polyamides may be used in the present invention. It should be understood that while a transparent polyamide is preferably included in the composition, the final composition may have a transparent, translucent, or opaque optical nature. That is, the final composition may contain various additives including fillers, coloring agents, dyes, pigments, and the like that effect the optical nature of the composition. By the term, "translucent," as used herein, it is meant having a light transmission of greater than 1 percent per the test procedures, ASTM D1003, using an Illuminate C light source. Alternatively, the polyamide composition has a transparency of at least about 50%, and more preferably within a range having a lower limit of about 50% or 55% or 60% or 65% or 70% and an upper limit of about 75% or 80% or 85% or 90% or 95% or greater as measured by ISO 13468-1,2 using a 2 mm thick sample measured at a wavelength of 560 nm.

Examples of commercially available transparent polyamide polymers that are suitable for use in an outer core layer of a golf ball of the invention include the following: copolyamides such as Platamid® 8020; semi-aromatic transparent polyamides such as Rilsan® Clear G170; transparent polyamides such as Rilsan® G120 Rnew; Rilsan®G830 Rnew and G830 L Rnew; Rilsan® G850; Rilsan® Clear G350 and G350L; Rilsan® G300 HI; and transparent polyamides that are partly based on bio-based raw materials such as Rilsan® Clear G830, all of which are available from Arkema, Inc. (King of Prussia, Pa.), may be used. Other suitable examples include Ultramid® polyamides, available from BASF; and Zytel and Dartek nylon resins, available from DuPont. EMS-Chemie AG (Domat/EMS, Switzerland) supplies different grades of transparent polyamides under the Grilamid mark, including; Grilamid® TR 30, TR55, TR90, XE 3997, XE 4028 grades, and these polyamides may be used per this invention. Grivory® G and GTR transparent polyamides also are available from EMS-Chemie AG and may be used in the compositions of this invention.

Other suitable polyamides include for example Trogamid® and Vestamid® grades available from DeGussa AG (Marl, Germany); Kopa® grades available from Kolon; Dureathan® grades available from Lanxess AG (Cologne, Germany); Arlen® grades available from Mitsui (Japan); transparent amorphous nylons such as Ashlene® D870 and D870L available from Ashley Polymers (Brooklyn, N.Y.); Radici Radilon® CST copolyamides (Italy); Shakespeare Isocor® CN30XT and CN30BT nylon 610 resins (Shakespeare Engineered Nylons owned by Jarden Applied Materials, Columbia, S.C.), Toyobo Glamide® T-714E nylons (Japan); and TP Composites Elastoblend® PA12 CL nylons (Aston, Pa.). Transparent polyamides including, but not limited to, polyether-amide, polyester-amide, polyether-ester-amide block copolymers, are particularly suitable for use in the invention herein, and more particularly, the transparent polyamide copolymers, Rilsan Clear G300 HI, Pebax Clear 300, and Pebax Clear 400 available from Arkema, Inc. (King of Prussia, Pa.) are particularly effective.

Meanwhile, examples of suitable transparent homopolyamides and copolyamides, which are amorphous or exhibit a slight crystallinity, are described in U.S. Pat. App. Publ. No. 2010/0140846; U.S. Pat. No. 6,376,037 to Montanari et al.; and U.S. Pat. No. 8,399,557 to Montanari et al., the entire disclosures of which are hereby incorporated herein by reference. Also, suitable amorphous transparent or translucent polyamides that may be formed from the condensation of diamines with dicarboxylic acids or lactams; and blends or alloys of two or more different polyamides, are described in U.S. Pat. App. Publ. No. 2012/0223453, the entire disclosure of which is hereby incorporated herein by reference.

Additionally, suitable polyamide copolymers such as a copolymers containing polyether blocks and polyamide blocks are described in U.S. Pat. App. Publ. No. 2013/0202831 ("831 Publ."), the entire disclosure of which is hereby incorporated herein by reference. The polyamide copolymers described in the '831 Publ. have the following properties: are resistant to a high-velocity impact of at least 76.2 m/s (250 ft/s) according to the EN 166 standard; have a Charpy notched impact strength of at least 90 kJ/m² according to the ISO 179 leU standard; preferably also have a chemical resistance such that it is capable of deforming, in flexion, by immersion in a solvent according to the ISO 22088-3 standard by at least 3% without breaking; are light, having a density of less than 1.05 g/cm³ measured according to the ISO 1183 D standard; and are flexible and have an elastic modulus of less than 1000 MPa, preferably of less than 800 MPa, measured according to the ISO 527-2:93-1BA standard.

Suitable transparent polyamides are further described in U.S. Pat. No. 6,528,560 to Bühler; U.S. Pat. No. 6,831,136 to Torre et al.; U.S. Pat. No. 6,943,231 to Bühler; U.S. Pat. No. 8,309,643 to Thullen et al.; U.S. Pat. No. 8,507,598 to Bühler; and U.S. Pat. App. Publ. No. 2010/0203275, the entire disclosures of which are hereby incorporated herein by reference.

In general, polyamides refer to high molecular weight polymers in which amide linkages (—CONH—) occur along the length of the molecular chain (*Hawley's Condensed Chemical Dictionary*, 13$^{th}$ Ed.). Suitable polyamides for use in the compositions of this invention may be obtained, for example, by: (1) polycondensation of (a) a dicarboxylic acid, such as oxalic acid, adipic acid, sebacic acid, terephthalic acid, isophthalic acid or 1,4-cyclohexanedicarboxylic acid, with (b) a diamine, such as ethylenediamine, tetramethylenediamine, pentamethylenediamine, hexamethylenediamine, or decamethylenediamine, 1,4-cyclohexyldiamine or m-xylylenediamine; (2) a ring-opening polymerization of cyclic lactam, such as ϵ-caprolactam or ω-laurolactam; (3) polycondensation of an aminocarboxylic acid, such as 6-aminocaproic acid, 9-aminononanoic acid, 11-aminoundecanoic acid or 12-aminododecanoic acid; or (4) copolymerization of a cyclic lactam with a dicarboxylic acid and a diamine. Specific examples of suitable polyamides include, but are not limited to, nylon 6, nylon 6,6; nylon 6,10; nylon 11, and nylon 12. Aliphatic and aromatic polyamides and blends thereof may be prepared in accordance with this invention.

In general, polyamide homopolymers and copolymers are suitable for use in this invention. The specific monomers, reaction conditions, and other factors will be selected based on the desired polyamide polymer to be produced. There are two common methods for producing polyamide homopolymers. In a first method, a compound containing one organic acid-type end group and one amine end group is formed into a cyclic monomer. The polyamide is then formed from the monomer by a ring-opening polymerization. These polyamides are commonly designated as nylon 6, nylon 11, nylon 12, and the like, where the number indicates the number of carbon atoms making up the ring in the monomer. For example, nylon 6 is a homopolymer of caprolactam, that is, polycaprolactam. The second method involves the condensation polymerization of a dibasic acid and a diamine. In general, this reaction takes place as follows:

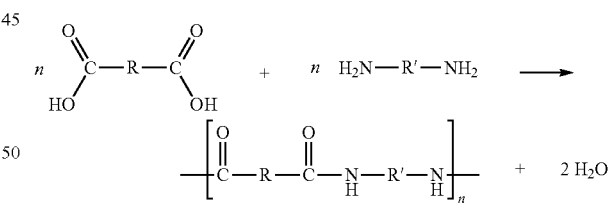

Conventional polyamides are commonly designated as nylon 4,6; nylon 6,6; nylon 6,9; nylon 6,10; nylon 6,12; and the like, where the first number indicates the number of carbon atoms connecting the two amine groups in the diamine and the second number indicates the number of carbon atoms connecting the two acid groups in the dibasic acid, including those in the acid groups. For example, nylon 6,6 is the reaction product of hexamethylenediamine and adipic acid.

Other suitable polyamides include nylon 4, nylon 7, nylon 13, nylon 12,12; nylon 13,13; and mixtures/blends thereof with suitable polyamides. Still other polyamides include nylon 6/66; and nylon 6/69 and mixtures/blends thereof with suitable polyamides. Polyamide compositions having mechanical properties that do not significantly change after the composition has been exposed to moisture are particularly effective.

As noted above, transparent polyamides are particularly suitable for use in the invention herein. Such transparent polyamides include transparent polyamide copolymers (co-polyamides). For example, polyether-amide and polyester-amide block copolymers may be used. Such polyamide copolymers are described, for example, in the above-mentioned U.S. Pat. App. Publ. No. 2010/0140846 and U.S. Pat. Nos. 6,376,037 and 8,399,557, the entire disclosures of which are hereby incorporated herein by reference. It should be understood that the term, "polyamide" as used in the present invention, is meant to include copolymers with polyamide blocks and polyether blocks, i.e., polyether block amide polymers, and the mixtures of these copolymers with the preceding polyamides. Polymers with polyamide blocks and polyether blocks result from the copolycondensation of polyamide sequences comprising reactive ends with polyether sequences comprising reactive ends, such as, inter alia:

a) polyamide sequences comprising diamine chain ends with polyoxyalkylene sequences comprising dicarboxylic chain ends, b) polyamide sequences comprising dicarboxylic chain ends with polyoxyalkylene sequences comprising diamine chain ends obtained by cyanoethylation and hydrogenation of α'Ω-dihydroxylated aliphatic polyoxyalkylene sequences, known as polyetherdiols, c) polyamide sequences comprising dicarboxylic chain ends with polyetherdiols, the products obtained being, in this specific case, polyetheresteramides.

These polymers with polyamide blocks and polyether blocks, whether they originate from the copolycondensation of polyamide and polyether sequences prepared beforehand or from a one-stage reaction, exhibit, for example, Shore D hardnesses which can be from 20 to 95 and advantageously between 25 and 85, more preferably 30 to 80, and even more preferably 35 to 78 and an intrinsic viscosity between 0.8 and 2.5, measured in meta-cresol at 25° C.

Whether the polyester blocks derive from polyethylene glycol, polyoxypropylene glycol or polyoxytetramethylene glycol, they are either used as is and copolycondensed with polyamide blocks comprising carboxylic ends or they are aminated, in order to be converted into polyetherdiamines, and condensed with polyamide blocks comprising carboxylic ends. They can also be mixed with polyamide precursors and a chain-limiting agent in order to form polymers with polyamide blocks and polyether blocks having statistically distributed units. Polymers with polyamide and polyether blocks are disclosed in U.S. Pat. Nos. 4,331,786, 4,115,475, 4,195,015, 4,839,441, 4,864,014, 4,230,838 and 4,332,920, the entire disclosures of which are hereby incorporated herein by reference. The polyether can be, for example, a polyethylene glycol (PEG), a polypropylene glycol (PPG) or a polytetramethylene glycol (PTMG). The latter is also known as polytetrahydrofuran (PTHF).

Blends of polyamides also may be used in accordance with this invention. For example, a blend of transparent polyamides or a blend of transparent and non-transparent polyamides may be used in accordance with this invention. In particular, a blend of transparent polyamide and a thermoplastic polyamide elastomer (typically a copolymer of polyamide and polyester/polyether) may be used. The polyamide elastomer may be transparent or non-transparent. Many polyamide elastomers comprise a hard polyamide segment (for example, nylon 6, nylon 6,6; nylon 11, nylon 12 and the like) and a polyether or polyester as a soft segment. Suitable polyamide elastomers that can be used to form the compositions of this invention include, for example. polyether-amide block copolymers, available from Arkema, Inc. (Columbs, France) as Pebax® resins. In general, these block copolymers have thermoplastic properties (softens when exposed to heat and returns to original condition when cooled) properties and elastomeric properties (can be stretched and then returns to a near original condition when released) properties. The ratio of hard to soft segments and the length, sequence, and like of the segments are significant factors in determining the properties of the resulting block copolymer.

One advantageous property of the transparent polyamides used to form the compositions of the present invention is that they exhibit a relatively high glass transition temperature. The transparent polyamides are relatively easy to process and can be molded to form different golf ball layers. In general, the glass-liquid transition refers to the reversible transition in amorphous materials (or in the amorphous regions within semi-crystalline materials) from a hard and relatively brittle state into a molten or state. The glass transition temperature ($T_g$) as reported herein is measured according to Test Method ISO 11357 and reported in degrees celsius. As the temperature of a polymer drops below $T_g$, it behaves in an increasingly brittle manner. As the temperature rises above the $T_g$, the polymer becomes more rubber-like. Thus, knowledge of $T_g$ is an important factor in the selection of materials for golf ball layer applications. In general, values of $T_g$ well below room temperature define the domain of elastomers and values above room temperature define rigid, structural polymers. It has been found that preferred transparent polyamides exhibit a $T_g$ in a range of about 30 to about 170° C., and has a lower range of about 35° C. or 40° C. or 50° C. or 60 C and an upper range of about 70° C. or 80° C. or 90° C. or 120° C. or 140° C. or 150° C. In one preferred version, the $T_g$ may be about 65° C., 75° C., 85° C., 91° C., 95° C. or 105° C.

It is important to note that these preferred transparent polyamides may also have a second $T_g$ that is observed at below ambient temperatures (less than 25° C.). It is believed that this sub-ambient $T_g$ is associated with a relatively soft polyether segment; whereas, the higher temperature $T_g$ is associated with a polyamide segment. Therefore, in one embodiment, a transparent polyamide having a reported $T_g$ of 90° C. may or may not also exhibit a $T_g$ at −65° C., and the like. In one embodiment, the transparent polyamide has a glass transition temperature in the range of about 75° to about 160° C., more preferably in the range of about 80° to about 95° C.

As used herein, the term, "semi-crystalline" covers (co) polyamides which have both a glass transition temperature $T_g$ and a melting point as determined by DSC. The term, "amorphous" covers polyamides that do not have a melting point detected by DSC or a melting point with negligible intensity such that it does not affect the essentially amorphous nature of the polymer. The term, "semi-crystalline", as used herein, relates to polymers that have both a melting exotherm and a glass transition as determined by DSC. The term, "amorphous", as used herein, relates to polymers that have a glass transition but do not exhibit a are essentially amorphous and exhibit a glass transition and a small or insignificant melting exotherm ($DH_f \leq =10$ J/g) as determined by DSC. The term, "micro-crystalline", as used herein, refers to semi-crystalline polymers in which melting exotherm as determined by DSC. The term, "quasi-amorphous", as used herein, relates to polymers that the spherulite size is sufficiently small in order to maintain transparency.

The transparent polyamides also have high flexibility, toughness, impact-durability and stress-crack resistance. One advantageous property of the transparent polyamides used to form the compositions of the present invention is their relatively high Charpy impact-resistance. In general, impact testing refers to the energy required to break or deform a material. The Charpy impact test is a standardized high strain-rate test which determines the amount of energy absorbed by a material during fracture. This absorbed energy is a measure of a given material's notch toughness and acts as a tool to study temperature-dependent ductile-brittle transition. The test method standard is ISO 179/1eA. Samples are conditioned for 15 days at 23° C. and 50% relative humidity. The test results herein are measured at either 23° C. or −30° C. and results are reported in kilojoules per meter squared. The higher the number, the tougher the material, with a no-break (NB) meaning that the test sample was flexible enough to withstand the impact without fracturing. High Charpy impact values are an important material property to consider when choosing a material for a layer in a golf ball, since a golf ball must withstand very high force impacts, such as those encountered when struck with a golf club. It is believed that the polyamide compositions herein comprising a transparent polyamide, preferably have a Charpy notched impact (at 23° C.) of from at least about 8 to No-Break (NB), and have a lower range of from about 10 or 15 or 20 or 25 or 30 or 35 or 40 kJ/m$^2$ to an upper limit ranging from about 80, 85, 90, or 95 kJ/m$^2$ to no-break. A preferred transparent polyamide composition comprises Rilsan Clear G300 HI, which has a Charpy notched impact value at 23° C. of 94 kJ/m$^2$, and a value at −30° C. of 19 kJ/m$^2$.

The polyamide compositions of this invention may further contain acid anhydride-modified polyolefins. Adding the acid anhydride-modified polyolefin helps improve the toughness and impact durability of the composition. In such materials, the polyolefin polymer is chemically modified with acid anhydride. That is, the polyolefin polymer is functionalized; it contains at least one acid anhydride group. In general, such acid anhydride groups may be grafted onto the polyolefin polymer backbone. Some examples of suitable acid anhydrides that may be used to functionalize the polyolefin include, but are not limited to, fumaric, nadic, itaconic, and clorendic anhydrides, and their substituted derivatives thereof.

Suitable olefin monomeric units that can be used to prepare the polyolefin polymer include, for example, ethylene, propylene, butene, hexene, heptene, octene, decene, and dodecene. Preferably, the monomeric unit contains from 2 to about 20 carbon atoms. The resulting polyolefin chains (polymer backbones) formed from these monomeric units include, for example, polyethylene, high density polyethylene (HDPE), low density polyethylene (LDPE), very low density polyethylene (VLDPE), polypropylene, polybutene, polyhexene, polyoctene, polydecene, and polydodecene, and copolymers and blends thereof. The resulting polyolefin polymer is functionalized with at least one acid anhydride moiety. More particularly, the acid anhydride-modified polyolefin polymers used in this invention include copolymers such as, for example, ethylene-based copolymers, particularly ethylene-propylene (EP); ethylene-butene (EB); ethylene-hexene (EH); ethylene-octene (EO); styrene-ethylene/butylene-styrene (SEBS); ethylene-propylene diene monomer (EPDM); ethylene-vinyl acetate (EVA); and various ethylene-alkyl acrylate and ethylene-alkyl alkyl acrylate copolymers such as, for example, ethylene-methyl acrylate (EMA); ethylene-ethyl acrylate (EEA); ethylene-propyl acrylate (EPA); ethylene n-butyl acrylate (EBA) copolymers; and the like.

Other polyolefin-based copolymers such as polypropylene and polybutene-based copolymers also can be used. These copolymers include random, block, and graft copolymers which have been functionalized with acid anhydride groups. Examples of commercially-available acid anhydride polyolefins that can be used in accordance with this invention, include, but are not limited to, Amplify™ GR functional polymers, available from the Dow Chemical Company; Fusabond® polymers, available from the DuPont Company; Kraton® FG and RP polymers, available from Kraton Polymers LLC; Lotader® polymers available from Arkema, Inc.; Polybond® and Royaltuf® polymers, available from Addivant; and Exxelor polymers available from the ExxonMobil Corp.

Various polyamide compositions may be made in accordance with this invention. The composition may optionally contain an acid anhydride-modified polyolefin, plasticizer, fatty acid salt, fatty acid amide, fatty acid ester, and mixtures thereof. The resulting polyamide composition may be used to prepare a golf ball component (for example, core, casing, or cover layer) having several advantageous properties. As noted above, it is significant that a blend comprising transparent polyamide and acid anhydride-modified polyolefin may be prepared and the resulting composition has excellent properties, particularly suitable for making golf ball layers. For example, a blend of 90% Grivory™ GTR45 transparent polyamide and 10% Fusabond™ N525 acid anhydride-modified polyolefin may be prepared and the resulting composition (solid, transparent sphere) has a COR of 0.784, Atti Compression of 182, and Shore D surface hardness of 81.8. In another example, a blend of 50% Grivory™ GTR45 transparent polyamide and 50% Fusabond™ N525 acid anhydride-modified polyolefin may be prepared and the resulting composition (solid, transparent sphere) has a COR of 0.633, Atti Compression of 105, and Shore D surface hardness of 56.2.

In other embodiments, it is not necessary for the polyamide to be blended with an acid anhydride-modified polyolefin or any other polymer or non-polymer material. That is, the composition may consist entirely of the transparent polyamide (that is, 100% by weight polyamide). In other instances, the composition may consist essentially of the transparent polyamide (for example, 97 to 100% by weight polyamide). Such polyamide compositions may contain other ingredients that do not materially affect the basic and novel characteristics of the composition. For example, mineral fillers may be added as discussed further below. In one particular version, the composition consists essentially of transparent polyether-amide block copolymer such as the above-mentioned Rilsan G300 HI, Pebax Clear 300, or Pebax Clear 400 (Arkema, Inc.).

In one embodiment, the polyamide compositions of the outer core layer further contain a plasticizer. Adding the plasticizers to the composition helps to reduce the glass transition temperature ($T_g$) of the composition. The glass transition in a polymer is a temperature range below which a polymer is relatively brittle and above which it is rubber-like. In addition to lowering the $T_g$, the plasticizer may also reduce the tan δ in the temperature range above the $T_g$. A polymer's $T_g$ is measured by a Differential Scanning calorimeter or a Dynamic Mechanical Analyzer (DMA) and the DMA is used to measure tan δ. The plasticizer may also reduce the hardness and compression of the composition when compared to its non-plasticized condition. Adding the plasticizers to the composition also helps decrease the stiffness of the composition. That is, the plasticizer helps lower the flex modulus of the composition. The flex modulus refers to the ratio of stress to strain within the elastic limit (when measured in the flexural mode) and is similar to tensile modulus. This property is used to indicate the bending stiffness of a material. The flexural modulus, which is a modulus of elasticity, is determined by calculating the slope of the linear portion of the stress-strain curve during the bending test. If the slope of the stress-strain curve is relatively steep, the material has a relatively high flexural modulus meaning the material resists deformation. The material is more rigid. If the slope is relatively flat, the material has a relatively low flexural modulus meaning the material is more easily deformed. The material is more flexible. The flex modulus can be determined in accordance with ASTM D790 standard among other testing procedures.

The polyamide compositions may contain one or more plasticizers. The plasticizers that may be used in the polyamide compositions of this invention include, for example, N-butylbenzenesulfonamide (BBSA); N-ethylbenzenesulfonamide (EBSA); N-propylbenzenesulfonamide (PBSA); N-butyl-N-dodecylbenzenesulfonamide (BDBSA); N,N-dimethylbenzenesulfonamide (DMBSA); p-methylbenzenesulfonamide; o,p-toluene sulfonamide; p-toluene sulfonamide; 2-ethylhexyl-4-hydroxybenzoate; hexadecyl-4-hydroxybenzoate; 1-butyl-4-hydroxybenzoate; dioctyl phthalate; diisodecyl phthalate; di-(2-ethylhexyl) adipate; and tri-(2-ethylhexyl)phosphate.

Other suitable plasticizer compounds include benzene mono-, di-, and tricarboxylic acid esters. Phthalates such as Bis(2-ethylhexyl) phthalate (DEHP), Diisononyl phthalate (DINP), Di-n-butyl phthalate (DnBP, DBP), Butyl benzyl phthalate (BBP), Diisodecyl phthalate (DIDP), Dioctyl phthalate (DnOP), Diisooctyl phthalate (DIOP), Diethyl phthalate (DEP), Diisobutyl phthalate (DIBP), and Di-n-hexyl phthalate are suitable. Iso- and terephthalates such as Dioctyl terephthalate and Dinonyl isophthalate may be used. Also appropriate are trimellitates such as Trimethyl trimellitate (TMTM), Tri-(2-ethylhexyl)trimellitate (TOTM), Tri-(n-octyl,n-decyl)trimellitate, Tri-(heptyl,nonyl)trimellitate, Tri-n-octyl trimellitate; as well as benzoates, including: 2-ethylhexyl-4-hydroxy benzoate, n-octyl benzoate, methyl benzoate, and ethyl benzoate.

Also suitable are alkyl diacid esters commonly based on C4-C12 alkyl dicarboxylic acids such as adipic, sebacic, azelaic, and maleic acids such as: Bis(2-ethylhexyl)adipate (DEHA), Dimethyl adipate (DMAD), Monomethyl adipate (MMAD), Dioctyl adipate (DOA), Dibutyl sebacate (DBS), Dibutyl maleate (DBM), Diisobutyl maleate (DIBM), Dioctyl sebacate (DOS). Also, esters based on glycols, polyglycols and polyhydric alcohols such as poly(ethylene glycol) mono- and di-esters, cyclohexanedimethanol esters, sorbitol derivatives; and triethylene glycol dihexanoate, diethylene glycol di-2-ethylhexanoate, tetraethylene glycol diheptanoate, and ethylene glycol dioleate may be used.

Fatty acids, fatty acid salts, fatty acid amides, and fatty acid esters also may be used in the compositions of this invention. Compounds such as stearic, oleic, ricinoleic, behenic, myristic, linoleic, palmitic, and lauric acid esters, salts, and mono- and bis-amides can be used. Methyl oleate, ethyl oleate, butyl oleat, 2-ethylhexyl oleate, octyl oleate, butyl stearate, methyl acetylricinoleate, zinc oleate, ethylene bis-oleamide, and stearyl erucamide are suitable. Suitable fatty acid salts include, for example, metal stearates, erucates, laurates, oleates, palmitates, pelargonates, and the like. For example, fatty acid salts such as zinc stearate, calcium stearate, magnesium stearate, barium stearate, and the like can be used. Fatty alcohols and acetylated fatty alcohols are also suitable, as are carbonate esters such as propylene carbonate and ethylene carbonate.

Glycerol-based esters such as soy-bean, tung, or linseed oils or their epoxidized derivatives can also be used as plasticizers in the present invention, as can polymeric polyester plasticizers formed from the esterification reaction of diacids and diglycols as well as from the ring-opening polymerization reaction of caprolactones with diacids or diglycols. Citrate esters and acetylated citrate esters are also suitable. Dicarboxylic acid molecules containing both a carboxylic acid ester and a carboxylic acid salt can perform suitably as plasticizers. The magnesium salt of mono-methyl adipate and the zinc salt of mono-octyl glutarate are two such examples for this invention. Tri- and tetra-carboxylic acid esters and salts can also be used.

Also envisioned as suitable plasticizers are organophosphate and organosulfur compounds such as Tricresyl phosphate (TCP), Tributyl phosphate(TBP), alkyl sulfonic acid phenyl esters (ASE); and sulfonamides such as N-ethyl toluene sulfonamide, N-(2-hydroxypropyl)benzene sulfonamide, N-(n-butyl)benzene sulfonamide. Furthermore, thioester and thioether variants of the plasticizer compounds mentioned above are suitable. Non-ester plasticizers such as alcohols, polyhydric alcohols, glycols, polyglycols, and polyethers are suitable materials for plasticization. Materials such as polytetramethylene ether glycol, poly(ethylene glycol), and poly(propylene glycol), oleyl alchohol, and cetyl alcohol can be used. Hydrocarbon compounds, both saturated and unsaturated, linear or cyclic can be used such as mineral oils, microcrystalline waxes, or low-molecular weight polybutadiene. Halogenated hydrocarbon compounds can also be used. Other examples of polyamide plasticizers that may be used in the composition of this invention include butylbenzenesulphonamide (BBSA), ethylhexyl para-hydroxybenzoate (EHPB) and decylhexyl para-hydroxybenzoate (DHPB), as disclosed in Montanari et al., U.S. Pat. No. 6,376,037, the disclosure of which is hereby incorporated by reference.

Esters and alkylamides such as phthalic acid esters including dimethyl phthalate, diethyl phthalate, dibutyl phthalate, diheptyl phthalate, di-2-ethylhexyl phthalate, di-n-octyl phthalate, diisodecyl phthalate, ditridecyl phthalate, dicyclohexyl phthalate, butylbenzyl phthalate, diisononyl phthalate, ethylphthalylethyl glycolate, butylphthalylbutyl glycolate, diundecyl phthalate, di-2-ethylhexyl tetrahydrophthalate as disclosed in Isobe et al., U.S. Pat. No. 6,538,099, the disclosure of which is hereby incorporated by reference, also may be used.

U.S. Pat. No. 7,045,185 to Jacques et al., the entire disclosure of which is hereby incorporated herein by reference, discloses suitable plasticizers: sulphonamides such as N-butylbenzenesulphonamide, ethyltoluene-suiphonamide, N-cyclohexyltoluenesulphonamide, 2-ethylhexyl-para-hydroxybenzoate, 2-decylhexyl-para-hydroxybenzoate, oligoethyleneoxytetrahydrofurfuryl alcohol, or oligoethyleneoxy malonate; esters of hydroxybenzoic acid; esters or ethers of tetrahydrofurfuryl alcohol, and esters of citric acid or hydroxymalonic acid.

Sulfonamides are particularly preferred plasticizers for use in the present invention as described, for example, in U.S. Pat. No. 7,297,737 to Fish, Jr. et al., the entire disclosure of which is hereby incorporated herein by reference.

Examples of such sulfonamides include N-alkyl benzenesulfonamides and toluenesufonamides, particularly N-butylbenzenesulfonamide, N-(2-hydroxypropyl)benzenesulfonamide, N-ethyl-o-toluenesulfonamide, N-ethyl-p-toluenesulfonamide, o-toluenesulfonamide, p-toluenesulfonamide. Such sulfonamide plasticizers also are described in Hochstetter et al., U.S. Pat. App. Publ. No. 2010/0183837, the entire disclosure of which is hereby incorporated herein by reference. The polyamide compositions containing plasticizer, as described in the above patent references, also may be used in this invention.

Tc (4) Plasticized Non-Acid Polymer Compositions

The non-acid polymer is preferably selected from the group consisting of polyolefins, polyamides, polyesters, polyethers, polyurethanes, metallocene-catalyzed polymers, single-site catalyst polymerized polymers, ethylene propylene rubber, ethylene propylene diene rubber, styrenic block copolymer rubbers, alkyl acrylate rubbers, and functionalized derivatives thereof.

Many suitable non-acid polymers, elastomeric and otherwise, are identified hereinabove, for example, in the section concerning outer core layer Highly Neutralized Polymer Compositions Tc (1).

Tc(5) Polyester-Based Thermoplastic Elastomer Compositions

Polyester-based thermoplastic elastomers may be used to form the compositions of this invention. In general, "thermoplastic elastomers" refer to a class of polymers having thermoplastic-like (softens when exposed to heat and returns to original condition when cooled) properties and elastomeric-like (can be stretched and then returns to original condition when released) properties. In thermoplastic elastomer block copolymers, there are some blocks having thermoplastic-like properties and these blocks may be referred to as "hard" segments. Also, there are some blocks having elastomeric-like properties and these blocks may be referred to as "soft" segments. The ratio of hard to soft segments and the composition of the segments are significant factors in determining the properties of the resulting thermoplastic elastomer.

One example of a suitable polyester thermoplastic elastomer that can be used to form the compositions of this invention is polyester-polyether block copolymers. In general, these block copolymers contain hard and soft segments having various lengths and sequences. The hard, crystalline polyester segments are normally derived from reacting an aromatic-containing dicarboxylic acid or diester such as, for example, terephthalic acid, dimethyl terephthalate, and the like with a diol containing about 2 to about 10 carbon atoms. For example, the hard segments may constitute butylene terephthalate, tetramethylene terephthalate, or ethylene terephthalate units. The soft, elastomeric segments are normally derived from long or short-chain poly(alkylene oxide) glycols containing a total of about 3 to about 12 carbon atoms including up to 3 or 4 oxygen atoms with the remaining atoms being hydrocarbon atoms. Useful poly(alkylene oxide)glycols include, for example, poly(oxyethylene)diol, poly(oxypropylene)diol, and poly(oxytetramethylene)diols. More particularly, the polyether polyols have been based on polymers derived from cyclic ethers such as ethylene oxide, 1,2-propylene oxide and tetrahydrofuran. When these cyclic ethers are subjected to ring opening polymerization, they provide the corresponding polyether glycol, for example, polyethylene ether glycol (PEG), poly(1,2-propylene)glycol (PPG), and polytetramethylene ether glycol (PO4G, also referred to as PTMEG).

One preferred polyester thermoplastic elastomer is Riteflex® material, available from Ticona-Celanese Corp. The Riteflex® TPC-ET products include different grades of polyester-polyether block copolymers, and examples of such materials and their respective properties are described in below TABLE VIII. Another preferred polyester-polyether block copolymer is commercially-available under the trademark, Hytrel®, from DuPont. The Hytrel® polyester block copolymers are available in different grades and contain hard (crystalline) segments of polybutylene terephthalate and soft (amorphous) segments based on long-chain polyether glycols. These and other examples of polyester-polyether block copolymers which can be used in accordance with the present invention are disclosed in U.S. Pat. Nos. 2,623,031; 3,651,014; 3,763,109; and 3,896,078, the disclosures of which are hereby incorporated by reference. Different grades of Hytrel® polyester-polyether block copolymers and their respective properties, which may be used in accordance with this invention, are described in the following TABLE IX and X.

TABLE VIII

Properties of Riteflex ® Polyester Block Copolymers

| Property | Test Method | Units | RITEFLEX ® Grade | | | | |
| --- | --- | --- | --- | --- | --- | --- | --- |
| | | | 425 | 440 | 640A | 663 | 677 |
| Hardness, durometer D | ISO 868 | D | 24 | 38 | 40 | 63 | 75 |
| Flexural Modulus | ISO 178 | | | | | | |
| at −40° C. | | MPa | 162 | 270 | 115 | 1900 | 2500 |
| at 23° C. | | | 17 | 45 | 70 | 325 | 650 |
| at 100° C. | | | 8 | 28 | 32 | 150 | 240 |
| Tensile stress at break | ISO 527 | MPa | 10 | 18 | 17 | 38 | 42 |
| Elongation at break | ISO 527 | % | >500 | >500 | >500 | >450 | >300 |
| Izod impact | ISO180 | | | | | | |
| at −40° C. | | kj/m² | no break | no break | no break | 7c | 4.7c |
| at +23° F. | | | no break | no break | no break | 74p | 8.5 |
| Melt flow rate | ISO1133 | g/10 min | 13 | 13 | 10 | 19 | 15 |

TABLE VIII-continued

Properties of Riteflex ® Polyester Block Copolymers

| Property | Test Method | Units | RITEFLEX ® Grade | | | | |
|---|---|---|---|---|---|---|---|
| | | | 425 | 440 | 640A | 663 | 677 |
| Temp ° C. at 2.16 kg load | | | 190 | 220 | 220 | 240 | 240 |
| Melting point | ISO11357 | ° C. | 155 | 195 | 170 | 212 | 218 |
| Vicat softening point | ISO 306 | ° C. | 61 | 127 | 119 | 194 | 213 |
| Specific Gravity | ISO 1183 | g/cm³ | 1.06 | 1.11 | 1.13 | 1.24 | 1.27 |

TABLE IX

Properties of Hytrel ® Polyester-polyether Block Copolymers

| Property | Test Method | Units | HYTREL ® Grade | | | | |
|---|---|---|---|---|---|---|---|
| | | | F3548L | F3548L | F3548L | F3548L | F3548L |
| Hardness, durometer D | D 2240 | D | 35 | 35 | 35 | 35 | 35 |
| Flexural Modulus | D790 | | | | | | |
| at −40° C. | method I | Ksi | 9 | 9 | 9 | 9 | 9 |
| at 73° F. | Proc B | | 4.7 | 4.7 | 4.7 | 4.7 | 4.7 |
| at 212° F. | | | 1 | 1 | 1 | 1 | 1 |
| Tensile stress at break | D 638 | ksi | 1.49 | 1.49 | 1.49 | 1.49 | 1.49 |
| Elongation at break | D638 | % | 200 | 200 | 200 | 200 | 200 |
| Izod impact | D256 | | | | | | |
| at −40° C. | method A | ft lb/in | no break | no break | no break | no break | no break |
| At 73° F. | | | no break | no break | no break | no break | no break |
| Melt flow rate | D1238 | g/10 min | 10 | 10 | 10 | 10 | 10 |
| Temp ° F. at 2.16 kg load | | | 374 | 374 | 374 | 374 | 374 |
| Melting point | D3418 | ° F. | 312 | 312 | 312 | 312 | 312 |
| Vicat softening point | D1526 Rate B | ° F. | 171 | 171 | 171 | 171 | 171 |
| Specific Gravity | D792 | | 1.15 | 1.15 | 1.15 | 1.15 | 1.15 |

TABLE X

Properties of Hytrel ®Polyester-polyether Block Copolymers

| Property | Test Method | Units | HYTREL ® Grade 4556 | Property | Test Method | Units | HYTREL ® Grade 4556 |
|---|---|---|---|---|---|---|---|
| Hardness durometer | D 2240 | D | 45 | Hardness durometer | D 2240 | D | 45 |
| Flexural Modulus | D790 | | | Flexural Modulus | D790 | | |
| at −40° C. | method I | Ksi | 33 | at −40° C. | method I | Ksi | 33 |
| At 73° F. | Proc B | | 14 | At 73° F. | Proc B | | 14 |
| At 212° F. | | | 6.4 | At 212° F. | | | 6.4 |

TABLE X-continued

Properties of Hytrel ®Polyester-polyether Block Copolymers

| Property | Test Method | Units | HYTREL ® Grade 4556 | Property | Method | Units | 4556 |
|---|---|---|---|---|---|---|---|
| Tensile stress at break | D 638 | Ksi | 4.5 | Tensile stress at break | D 638 | Ksi | 4.5 |
| Elongation at break | D638 | % | 600 | Elongation at break | D638 | % | 600 |
| Izod impact | D256 | | | Izod impact | D256 | | |
| at −40° C. | method A | ft lb/in | no break | at −40° C. | method A | ft lb/in | no break |
| At 73° F. | | | no break | At 73° F. | | | no break |
| Melt flow rate | D1238 | g/10 min | 8.5 | Melt flow rate | D1238 | g/10 min | 8.5 |
| Temp ° F. at 2.16 kg load | | | 428 | Temp ° F. at 2.16 kg load | | | 428 |
| Melting point | D3418 | ° F. | 379 | Melting point | D3418 | ° F. | 379 |
| Vicat softening point | D1526 Rate B | ° F. | 171 | Vicat softening point | D1526 Rate B | ° F. | 171 |
| Specific Gravity | D792 | | 1.14 | Specific Gravity | D792 | | 1.14 |

As shown above in TABLES IX and X, the flex modulus of some Hytrel®polyester-polyether block copolymers may fall within the range of about 1,000 to about 150,000 psi (or greater). Such block copolymers may be used to form a low modulus (or high modulus) core layer in accordance with this invention.

Blends of polyesters and blends of polyesters with other polymers may be used in accordance with this invention. For example, the polyester thermoplastic elastomer may be blended with other thermoplastics such as polyamides. Various plasticizers may be used in the polyester-based thermoplastic composition, and these plasticizers are discussed further below. Suitable polyamide elastomers that can be used to form the compositions of this invention include, for example. polyether-amide block copolymers, available from Arkema, Inc. (Columbs, France) as Pebax® resins. Other suitable polyamides include nylon 4, nylon 6, nylon 7, nylon 11, nylon 12, nylon 13, nylon 4,6; nylon 6,6; nylon 6,9, nylon 6,10; nylon 6,12; nylon 12,12; nylon 13,13; and mixtures thereof. More preferred polyamides include nylon 6, nylon 11, nylon 12, nylon 4,6; nylon 6,6; nylon 6,9; nylon 6,10; nylon 6,12; nylon 6/66; and nylon 6/69 and mixtures thereof.

Polyamides having mechanical properties that do not significantly change after the composition has been exposed to moisture are particularly effective. These polyamides can be used in compositions used for the outer core layer. The outer core layer encapsulates the inner core so that fluids do not penetrate therein and protects the inner core from moisture. Because the polyester-polyamide blends are relatively stable, they are particularly effective for making the core or cover layers in accordance with this invention. Transparent polyamides are particularly suitable for use in the blend compositions of this invention. Such transparent polyamides include transparent polyamide copolymers (co-polyamides). Suitable transparent polyamides that may be used in accordance with the present invention are further described in Sullivan et al., US Patent Application Publication 2014/0302947, the disclosure of which is hereby incorporated by reference.

Suitable commercially available transparent polyamides that may be used per this invention include, for example, copolyamides such as Platamid® 8020; semi-aromatic transparent polyamides such as Rilsan® Clear G170; transparent polyamides such as Rilsan® G120 Rnew; Rilsan®G830 Rnew and G830 L Rnew; Rilsan® G850; Rilsan® Clear G350 and G350L; Rilsan® G300 HI; and transparent polyamides that are partly based on bio-based raw materials such as Rilsan® Clear G830, all of which are available from Arkema, Inc. (King of Prussia, Pa.). Other suitable materials include Ultramid® polyamides, available from BASF; and Zytel™ and Dartek™ nylon resins, available from DuPont. EMS-Chemie AG (Domat/EMS, Switzerland) supplies different grades of transparent polyamides under the Grilamid mark, including; Grilamid® TR 30, TR55, TR90, XE 3997, XE 4028 grades, and these polyamides may be used per this invention. Grivory® G and GTR transparent polyamides also are available from EMS-Chemie AG and may be used in the compositions of this invention. Other suitable polyamides include Trogamid® and Vestamid® grades available from Evonik Industries, AG (Essen, Germany); Kopa® grades available from Kolon Plastics, Inc. (Gyeongsanglouk-do, Korea) Durethan® grades available from Lanxess AG (Cologne, Germany); Arlen® grades available from Mitsui Chemicals (Tokyo, Japan); and transparent amorphous nylons such as Ashlene® 726SB, 746, 747, 747, 851, D870 and D870L available from Ashley Polymers (Brooklyn, N.Y.). Still other suitable polyamides include Radici Radilon® CST copolyamides (Chgnolo d'Isola, Italy); Shakespeare Isocor® CN30XT and CN30BT nylon 610 resins (Shakespeare Engineered Nylons owned by Jarden Applied Materials of Columbia, S.C.), Toyobo Glamide® T-714E nylons (Osaka, Japan); TP Composites Elastoblend® PA12 CL nylons (Aston, Pa.); and Aegis® polyamide compositions, available from Honeywell Plastics (Morris Township, N.J.). Transparent polyamides including, but not limited to, polyether-amide, polyester-amide, polyether-ester-amide block copolymers, are particularly suitable for use in the invention herein, and more particularly, the transparent polyamide copolymers, Rilsan Clear G300 HI, Pebax Clear 300, and Pebax Clear 400 available from Arkema, Inc. (King of Prussia, Pa.) are particularly effective.

In another example, the polyester thermoplastic elastomer may be blended with highly-neutralized polymers (HNP) and plasticizers. Various plasticizers may be used in the polyester/HNP—based thermoplastic composition, and these plasticizers are discussed further below.

The polyester compositions of this invention contain a plasticizer. Adding the plasticizers helps to reduce the glass transition temperature (Tg) of the composition. The glass transition in a polymer is a temperature range below which a polymer is relatively brittle and above which it is rubber-like. In addition to lowering the Tg, the plasticizer may also reduce the tan δ in the temperature range above the Tg. The Tg of a polymer is measured by a Differential Scanning calorimeter or a Dynamic Mechanical Analyzer (DMA) and the DMA is used to measure tan δ. The plasticizer may also reduce the hardness and compression of the composition when compared to its non-plasticized condition. The effects of adding a plasticizer to the polyester composition on Tg, flex modulus, hardness, and other physical properties are discussed further below.

The polyester-based compositions may contain one or more plasticizers. The plasticizers that may be used in the polyester compositions of this invention include, for example, N-butylbenzenesulfonamide (BBSA); N-ethylbenzenesulfonamide (EBSA); N-propylbenzenesulfonamide (PBSA); N-butyl-N-dodecylbenzenesulfonamide (BD-BSA); N,N-dimethylbenzenesulfonamide (DMBSA); p-methylbenzenesulfonamide; o,p-toluene sulfonamide; p-toluene sulfonamide; 2-ethylhexyl-4-hydroxybenzoate; hexadecyl-4-hydroxybenzoate; 1-butyl-4-hydroxybenzoate; dioctyl phthalate; diisodecyl phthalate; di-(2-ethylhexyl) adipate; and tri-(2-ethylhexyl)phosphate; and blends thereof.

In one preferred version, the plasticizer is selected from the group of polytetramethylene ether glycol (available from BASF under the tradename, PolyTHF™ 250); propylene carbonate (available from Huntsman Corp., under the tradename, Jeffsol™ PC); and/or dipropyleneglycol dibenzoate (available from Eastman Chemical under the tradename, Benzoflex™ 284). Mixtures of these plasticizers also may be used.

Other suitable plasticizer compounds include benzene mono-, di-, and tricarboxylic acid esters. Phthalates such as Bis(2-ethylhexyl) phthalate (DEHP), Diisononyl phthalate (DINP), Di-n-butyl phthalate (DnBP, DBP), Butyl benzyl phthalate (BBP), Diisodecyl phthalate (DIDP), Dioctyl phthalate (DnOP), Diisooctyl phthalate (DIOP), Diethyl phthalate (DEP), Diisobutyl phthalate (DIBP), and Di-n-hexyl phthalate, and blends thereof are suitable. Iso- and terephthalates such as Dioctyl terephthalate and Dinonyl isophthalate may be used. Also appropriate are trimellitates such as Trimethyl trimellitate (TMTM), Tri-(2-ethylhexyl) trimellitate (TOTM), Tri-(n-octyl,n-decyl)trimellitate, Tri-(heptyl,nonyl)trimellitate, Tri-n-octyl trimellitate; as well as benzoates, including: 2-ethylhexyl-4-hydroxy benzoate, n-octyl benzoate, methyl benzoate, and ethyl benzoate, and blends thereof Also suitable are alkyl diacid esters commonly based on C4-C12 alkyl dicarboxylic acids such as adipic, sebacic, azelaic, and maleic acids such as: Bis(2-ethylhexyl)adipate (DEHA), Dimethyl adipate (DMAD), Monomethyl adipate (MMAD), Dioctyl adipate (DOA), Dibutyl sebacate (DBS), Dibutyl maleate (DBM), Diisobutyl maleate (DIBM), Dioctyl sebacate (DOS), and blends thereof. Also, esters based on glycols, polyglycols and polyhydric alcohols such as poly(ethylene glycol) mono- and di-esters, cyclohexanedimethanol esters, sorbitol derivatives; and triethylene glycol dihexanoate, diethylene glycol di-2-ethylhexanoate, tetraethylene glycol diheptanoate, and ethylene glycol dioleate, and blends thereof may be used.

Fatty acids, fatty acid salts, fatty acid amides, and fatty acid esters also may be used in the compositions of this invention. Compounds such as stearic, oleic, ricinoleic, behenic, myristic, linoleic, palmitic, and lauric acid esters, salts, and mono- and bis-amides can be used. Ethyl oleate, butyl stearate, methyl acetylricinoleate, zinc oleate, ethylene bis-oleamide, and stearyl erucamide are suitable. Suitable fatty acid salts include, for example, metal stearates, erucates, laurates, oleates, palmitates, pelargonates, and the like. For example, fatty acid salts such as zinc stearate, calcium stearate, magnesium stearate, barium stearate, and the like can be used. Fatty alcohols and acetylated fatty alcohols are also suitable, as are carbonate esters such as propylene carbonate and ethylene carbonate. Mixtures of any of the plasticizers described herein also may be used in accordance with this invention. In a particularly preferred version, the fatty acid ester is an alkyl oleate selected from the group consisting of methyl, propyl, ethyl, butyl, octyl, and decyl oleates. For example, in one version, ethyl oleate is used as the plasticizer. In another version, butyl oleate or octyl oleate is used in the composition. Suitable commercially-available fatty acids include, for example, SylFat™ FA2 Tall Fatty Acid, available from Arizona Chemical. The fatty acid composition includes 2% saturated, 50% oleic, 37% linoleic (non-conjugated), and 7% linoleic (conjugated) fatty acids; and 4% other fatty acids. This fatty acid typically has an acid value in the range of 195 to 205 mg KOH/gm.

Glycerol-based esters such as soy-bean, tung, or linseed oils or their epoxidized derivatives or blends thereof can also be used as plasticizers in the present invention, as can polymeric polyester plasticizers formed from the esterification reaction of diacids and diglycols as well as from the ring-opening polymerization reaction of caprolactones with diacids or diglycols. Citrate esters and acetylated citrate esters are also suitable. Glycerol mono-, di-, and tri-oleates may be used per this invention, and in one preferred embodiment, glycerol trioleate is used as the plasticizer.

Dicarboxylic acid molecules containing both a carboxylic acid ester and a carboxylic acid salt can perform suitably as plasticizers. The magnesium salt of mono-methyl adipate and the zinc salt of mono-octyl glutarate are two such examples for this invention. Tri- and tetra-carboxylic acid esters and salts can also be used.

Also envisioned as suitable plasticizers are organophosphate and organosulfur compounds such as tricresyl phosphate (TCP), tributyl phosphate(TBP), octyldiphenyl phosphate, alkyl sulfonic acid phenyl esters (ASE); and blends thereof; and sulfonamides such as N-ethyl toluene sulfonamide, N-(2-hydroxypropyl)benzene sulfonamide, N-(n-butyl)benzene sulfonamide. Furthermore, thioester and thioether variants of the plasticizer compounds mentioned above are suitable.

Non-ester plasticizers such as alcohols, polyhydric alcohols, glycols, polyglycols, and polyethers also are suitable materials for plasticization. Materials such as polytetramethylene ether glycol, poly(ethylene glycol), and poly(propylene glycol), oleyl alchohol, and cetyl alcohol can be used. Hydrocarbon compounds, both saturated and unsaturated, linear or cyclic can be used such as mineral oils, microcrystalline waxes, or low-molecular weight polybutadiene. Halogenated hydrocarbon compounds can also be used.

Other examples of plasticizers that may be used in the polyester-based compositions of this invention include butylbenzenesulphonamide (BBSA), ethylhexyl para-hydroxybenzoate (EHPB) and decylhexyl para-hydroxybenzoate (DHPB), as disclosed in Montanari et al., U.S. Pat. No. 6,376,037, the disclosure of which is hereby incorporated by reference.

Esters and alkylamides such as phthalic acid esters including dimethyl phthalate, diethyl phthalate, dibutyl phthalate, diheptyl phthalate, di-2-ethylhexyl phthalate, di-n-octyl phthalate, diisodecyl phthalate, ditridecyl phthalate, dicyclohexyl phthalate, butylbenzyl phthalate, diisononyl phthalate, ethylphthalylethyl glycolate, butylphthalylbutyl glycolate, diundecyl phthalate, di-2-ethylhexyl tetrahydrophthalate as disclosed in Isobe et al., U.S. Pat. No. 6,538,099, the disclosure of which is hereby incorporated by reference, also may be used.

Jacques et al., U.S. Pat. No. 7,045,185, the disclosure of which is hereby incorporated by reference, discloses sulphonamides such as N-butylbenzenesulphonamide, ethyl-toluene-suiphonamide, N-cyclohexyltoluenesulphonamide, 2-ethylhexyl-para-hydroxybenzoate, 2-decylhexyl-para-hydroxybenzoate, oligoethyleneoxytetrahydrofurfuryl alcohol, or oligoethyleneoxy malonate; esters of hydroxybenzoic acid; esters or ethers of tetrahydrofurfuryl alcohol, and esters of citric acid or hydroxymalonic acid; and these plasticizers also may be used.

Sulfonamides also may be used in the present invention, and these materials are described in Fish, Jr. et al., U.S. Pat. No. 7,297,737, the disclosure of which is hereby incorporated by reference. Examples of such sulfonamides include N-alkyl benzenesulfonamides and toluenesufonamides, particularly N-butylbenzenesulfonamide, N-(2-hydroxypropyl) benzenesulfonamide, N-ethyl-o-toluenesulfonamide, N-ethyl-p-toluenesulfonamide, o-toluenesulfonamide, p-toluenesulfonamide. Such sulfonamide plasticizers also are described in Hochstetter et al., US Patent Application Publication 2010/0183837, the disclosure of which is hereby incorporated by reference.

As noted above, the fatty acid esters are particularly preferred plasticizers in the present invention. It has been found that the fatty acid esters perform well as plasticizers in the polyester-based composition. The fatty acid esters have several advantageous properties. For example, the fatty acid esters are compatible with the polyester copolymers and they tend to blend uniformly and completely with the acid copolymer. Also, the fatty acid esters tend to improve the resiliency and/or compression of the composition as discussed further below. The polyester copolymer/plasticizer compositions may contain other ingredients that do not materially affect the basic and novel characteristics of the composition. For example, mineral fillers may be added as discussed above. In one particular version, the composition consists essentially of polyester copolymer as described above and plasticizer, particularly a fatty acid ester.

One method of preparing the fatty acid ester involves reacting the fatty acid or mixture of fatty acids with a corresponding alcohol. The alcohol can be any alcohol including, but not limited to, linear, branched, and cyclic alcohols. The fatty acid ester is commonly a methyl, ethyl, propyl, butyl, octyl, or other alkyl ester of a carboxylic acid that contains from 4 to 30 carbon atoms. In the present invention, ethyl, butyl, octyl, and decyl esters and particularly ethyl oleate, butyl oleate, and octyl oleate are preferred fatty acid esters because of their properties. The carboxylic acid may be saturated or unsaturated. Examples of suitable saturated carboxylic acids, that is, carboxylic acids in which the carbon atoms of the alkyl chain are connected by single bonds, include but are not limited to butyric acid (chain length of $C_4$ and molecular weight of 88.1); capric acid ($C_{10}$ and MW of 172.3); lauric acid ($C_{12}$ and MW of 200.3); myristic acid ($C_{14}$ and MW of 228.4); palmitic acid ($C_{16}$ and MW of 256.4); stearic acid ($C_{18}$ and MW of 284.5); and behenic acid ($C_{22}$ and MW of 340.6). Examples of suitable unsaturated carboxylic acids, that is, a carboxylic acid in which there is one or more double bonds between the carbon atoms in the alkyl chain, include but are not limited to oleic acid (chain length and unsaturation C18:1; and MW of 282.5); linoleic acid (C18:2 and MW of 280.5; linolenic acid (C18:3 and MW of 278.4); and erucic acid (C22:1 and MW of 338.6).

It is believed that the plasticizer should be added in a sufficient amount to the polyester composition so there is a substantial change in the stiffness and/or hardness of the polyester polymer. Thus, although the concentration of plasticizer may be as little as 1% by weight to form some polyester-based compositions per this invention, it is preferred that the concentration be relatively greater. For example, it is preferred that the concentration of the plasticizer be at least 3 weight percent (wt. %). More particularly, it is preferred that the plasticizer be present in an amount within a range having a lower limit of 1% or 3% or 5% or 7% or 8% or 10% or 12% or 15% or 18% and an upper limit of 20% or 22% or 25% or 30% or 35% or 40% or 42% or 50% or 55% or 60% or 66% or 71% or 75% or 80%. In one preferred embodiment, the concentration of plasticizer falls within the range of about 7% to about 75%, preferably about 9% to about 55%, and more preferably about 15% to about 50%. Plasticized thermoplastic compositions of the present invention are not limited by any particular method or any particular equipment for making the compositions.

It is believed that adding the plasticizer to the polyester helps make the composition softer and more rubbery. Adding the plasticizers to the composition helps decrease the stiffness of the composition. That is, the plasticizer helps lower the flex modulus of the composition. The flex modulus refers to the ratio of stress to strain within the elastic limit (when measured in the flexural mode) and is similar to tensile modulus. This property is used to indicate the bending stiffness of a material. The flexural modulus, which is a modulus of elasticity, is determined by calculating the slope of the linear portion of the stress-strain curve during the bending test. If the slope of the stress-strain curve is relatively steep, the material has a relatively high flexural modulus meaning the material resists deformation. The material is more rigid. If the slope is relatively flat, the material has a relatively low flexural modulus meaning the material is more easily deformed. The material is more flexible. The flex modulus can be determined in accordance with ASTM D790 standard among other testing procedures. Thus, in one embodiment, the first polyester (containing polyester only) composition has a first flex modulus value and the second polyester (containing polyester and plasticizer) composition has a second flex modulus value, wherein the second flex modulus value is at least 1% less; or at least 2% less; or at least 4% less; or at least 8% less; or at least 10% less than the first modulus value.

More particularly, in one embodiment, the polyester/plasticizer composition has a flex modulus lower limit of about 500 (or less), 1,000, 1,600, 2,000, 4,200, 7,500, 9,000, 10,000 or 20,000 or 40,000 or 50,000 or 60,000 or 70,000 or 80,000 or 90,000 or 100,000; and a flex modulus upper limit of about 110,000 or 120,000 or 130,000 psi or 140,000 or 160,000 or 180,000 or 200,000 or 300,000 or greater. In general, the properties of flex modulus and hardness are related, whereby flex modulus measures the material's resistance to bending, and hardness measures the material's resistance to indentation. In general, as the flex modulus of the material increases, the hardness of the material also increases. As discussed above, adding the plasticizer to the polyester helps reduce the flex modulus of the composition and it also helps reduce hardness to a certain degree. Thus, in one embodiment, the polyester/plasticizer composition is relatively soft and having a hardness of no greater than 40 Shore D. For example, the Shore D hardness may be within a range having a lower limit of 15 or 18 or 20 or 22 or 24 and an upper limit of 28 or 30 or 32 or 34 or 35 or 38 or 40 Shore D. In other embodiments, the polyester/plasticizer composition is moderately soft having a hardness of no greater than about 60 Shore D. For example, the Shore D hardness may be within a range having a lower limit of 25, 28, 20, 32, 35, 36, 38, or 40, and an upper limit of 42, 45, 48, 50, 54, 56, or 60. In yet other embodiments, the polyester/plasticizer composition is moderately hard having a hardness with a lower limit of about 42, 44, 47, 51, 53, or 58 and an upper limit of about 60, 65, 72, 77, 80, 84, 88, 91, or 95 Shore D.

Further, in one embodiment, the polyester/plasticizer composition (when molded into a solid sphere) has a DCM compression of no greater than 70. For example, the DCM compression may be in the range of about 40 to about 65. In other embodiments, the polyamide/plasticizer composition is relatively soft and the DCM compression is no greater than 100. In yet other embodiments, the polyamide/plasticizer composition is relatively hard and the DCM compression may be greater than 100, for example, the DCM compression may be about 105.

It also is believed that adding the plasticizer to the polyester helps reduce the glass transition temperature (Tg) of the composition in many instances. Thus, in one embodiment, the first polyester (containing polyester only) composition has a first Tg value and the second polyester (containing polyester and plasticizer) composition has a second Tg value, wherein the second Tg value is at least 1 degree (1°) less; or at least 2° less; or at least 4° less; or at least 8°; or at least 10° less than the first Tg value. In another embodiment, the first Tg value and the second Tg value are approximately the same.

In addition, introducing plasticizers into the polyester composition generally helps to reduce the compression and/or increase the COR of the composition (when molded into a solid sphere and tested) versus a non-plasticized composition (when molded into a solid sphere and tested.) Plasticized polyester compositions typically show compression values lower, or at most equal to, non-plasticized compositions while the plasticized compositions display COR values that may be higher, or at the least equal to, non-plasticized compositions. This effect is surprising, because in many conventional compositions, the compression of the composition increases as the COR increases. In some instances plasticization of the composition might produce a slight reduction in the COR while at the same time reducing the compression to a greater extent, thereby providing an overall improvement to the compression/COR relationship over the non-plasticized composition.

Any of the polyester-comprising compositions herein may be blended with any number of additional polymers to form the core or cover layer of the invention herein. Such polymers include, for example, polyurethanes; polyureas; copolymers, blends and hybrids of polyurethane and polyurea; ethylene acid copolymer ionomer resins (for example, Surlyn® ionomer resins and HPF 1000 and HPF 2000, commercially available from DuPont; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; cross-linked trans-polyisoprene and blends thereof; commercially available from DuPont; polyurethane-based thermoplastic elastomers, such as Elastollan®, commercially available from BASF; synthetic or natural vulcanized rubber; and combinations thereof. The polyester block copolymer also may be blended with rubbery elastomers in accordance with this invention. Such elastomers include, but are not limited to, polybutadiene, polyisoprene, ethylene propylene rubber ("EPR"), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, alkyl acrylate rubber, chlorinated isoprene rubber, acrylonitrile chlorinated isoprene rubber, and combinations of two or more thereof.

As shown in TABLE XI below, various polyester/plasticizer compositions may be made in accordance with this invention. It is significant that a blend comprising polyester and plasticizer may be prepared and the resulting composition has several advantageous properties that are particularly suitable for making golf ball components (for example, core, intermediate, and cover layers). For example, as shown in TABLE XI, a blend of 90% Hytrel 3078 (polyester copolymer) and 10% Ethyl Oleate (plasticizer) may be prepared and the resulting composition (solid sphere) has a COR of 0.701, DCM Compression of −27, and Shore D surface hardness of 27.8. The polyester/plasticizer compositions may contain other ingredients that do not materially affect the basic and novel characteristics of the composition. For example, mineral fillers may be added as discussed further below.

More particularly, solid spheres of each composition in TABLE XI were prepared by injection-molding the compositions, and the COR, compression, Shore D hardness, and Shore C hardness of the resulting spheres were measured after two weeks. The surface hardness of a sphere is obtained from the average of a number of measurements taken from opposing hemispheres, taking care to avoid making measurements on the parting line of the sphere or on surface defects, such as holes or protrusions. Hardness measurements are made pursuant to ASTM D-2240"Indentation Hardness of Rubber and Plastic by Means of a Durometer." Because of the curved surface, care must be taken to ensure that the sphere is centered under the durometer indentor before a surface hardness reading is obtained. A calibrated, digital durometer, capable of reading to 0.1 hardness units is used for all hardness measurements and is set to record the maximum hardness reading obtained for each measurement. The digital durometer must be attached to, and its foot made parallel to, the base of an automatic stand. The weight on the durometer and the attack rate conform to ASTM D-2240.

Figure 2:
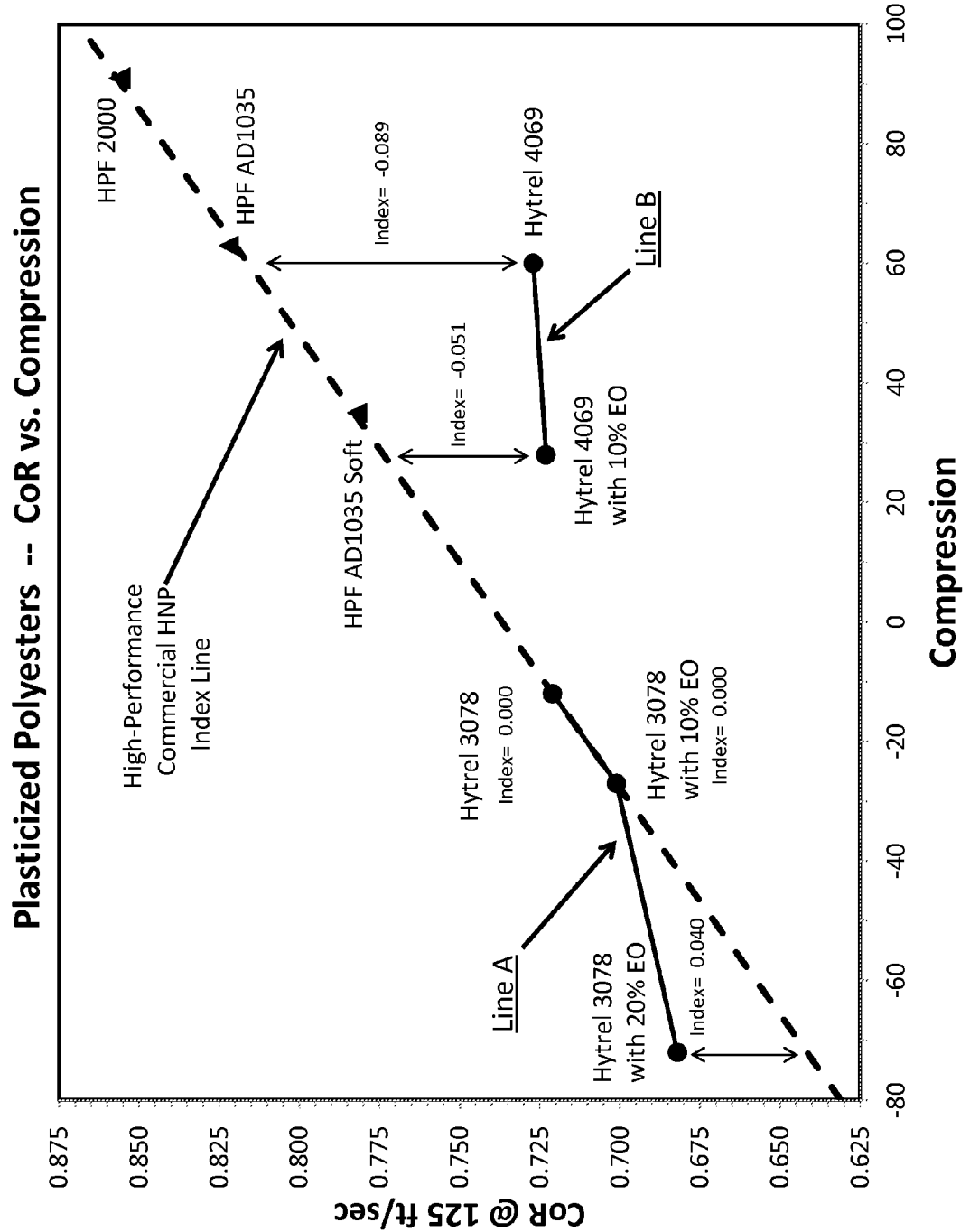
FIG. 2 is a graph showing the Coefficient of Restitution (COR) of commercially-available highly neutralized ethylene acid copolymer (HNP) samples and polyester-ether block copolymer/plasticizer samples of this invention plotted against the DCM Compression (DCM) of the respective samples and includes an Index Line.

Also, in the following TABLE XI, the Soft and Fast Index (SFI) values of sample spheres made from polyester-based compositions are given. These SFI values are calculated by comparing the properties of the polyester-based compositions to commercially-available highly neutralized ethylene acid polymers (HNPs). These HNPs are considered among the most resilient thermoplastic materials at their respective compressions, and serve as high-performance reference points. More particularly, referring to FIG. 2, the Coefficient of Restitution (CoR) of some sample spheres made of polyester-based compositions of this invention are plotted against the DCM Compression (DCM) of the samples. In FIG. 2, the 'High-Performance Commercial HNP Index Line" is constructed from the properties of commercially-available highly neutralized polymers (HNP) with good resilience-to-hardness and resilience-to-compression relationships, e.g., HPF AD1035, HPF AD1035Soft, and HPF2000. These ethylene acid copolymers are highly neutralized (about 90% or greater neutralization levels). In particular, the compositions described in the Index Table (TABLE XI below) were used to construct the Index. In FIG. 2, the plot shows resiliency versus compression only. But, there are also relationships between resiliency and hardness (Shore C and Shore D), and hardness values for various samples are reported in TABLES XI and XII.

As shown in the Index Line of FIG. 2, the CoR of the HPF sample spheres generally decreases as the DCM Compression of the spheres decreases. This relationship between the CoR and Compression in spheres made from conventional highly-neutralized ethylene acid copolymer ionomers (HNPs), as demonstrated by the Index Line, is generally expected. Normally, the resiliency of a sphere decreases as the compression of the sphere decreases. As expected, the resiliency of the polyester/plasticizer composition sample spheres (Hytrel and EO blends) also generally decreases as the compression decreases. However, one plasticized composition of this invention (Hytrel 3078 with 20% EO sample sphere) has a higher absolute CoR versus the HNP Index Line at the given compression, and thus has a positive SFI as shown in Table 4. In another plasticized composition of this invention (Hytrel 3078 with 10% EO sample sphere), the CoR of this sample is the same as the HNP Index Line at the given compression. In yet another instance, a sample sphere made of a plasticized material (Hytrel 4069 with 10% EO) is compared to a sample sphere made of a non-plasticized material (Hytrel 4069), and the CoR difference between sample spheres is only 0.004, while the Compression difference between the two sample spheres is 32 points. This means that there is an increase in CoR index value from −0.089 to −0.051 (+0.038 SFI) between the sample spheres, as shown in FIG. 2 and reported in TABLE XI. Having good resiliency values are advantageous features for golf ball components. In general, a core with high resiliency will reach a higher velocity when struck by a golf club and travel longer distances.

More particularly, there is an Index value calculated for each of the sample points in Line A. The Index value is calculated by subtracting the CoR value of the sample point on Line A from the corresponding point on the Index Line at a given compression. (The Index value can be a positive or negative number.) As shown, the Index value (SFI) generally increases as the CoR and Compression of the samples decrease (i.e., moving from right to left along Line A). For instance the Index value is greater for the Hytrel 3078 with 20% EO sample sphere than the Index values for the Hytrel 3078 with 10% EO sample sphere. The slope of Line A is less than the slope of the Index Line. Thus, the "drop-off" in CoR for a sample sphere as the compression decreases for the samples in Line A is less than the "drop-off" for the sample spheres in the Index Line. There are also Index values calculated for the sample points on Line B. As shown, the Index value increases as the CoR and Compression of the samples decrease (i.e., moving from right to left along Line B). For instance the Index value is greater for the Hytrel 4069 with 10% EO sample sphere than the Index value for the Hytrel 4069 sample sphere. The slope of Line B is less than the slope of the Index Line.

TABLE XI

| | | | | | | | | |
|---|---|---|---|---|---|---|---|---|
| Spheres Made From Polyester/Plasticizer Compositions | | | | | | | | |
| 1$^{st}$ Ingred. | 2$^{nd}$ Ingred. | CoR@125 ft/s | Compr. (DCM) | Shore D Hardness (Surf.) | Shore C (Surf.) | SFI Comp. (DCM) | SFI Sh. D (Surf.) | SFI Sh. C (Surface) |
| Hytrel 3078 (100%) | | 0.721 | −12 | 29.9 | 52.3 | 0.000 | −0.020 | −0.028 |
| Hytrel 3078 (90%) | Ethyl Oleate (10%) | 0.701 | −27 | 27.8 | 44.5 | 0.000 | −0.026 | −0.014 |
| Hytrel 3078 (80%) | Ethyl Oleate (20%) | 0.682 | −72 | 23.1 | 37.1 | 0.040 | −0.012 | −0.001 |
| Hytrel 4069 (100%) | | 0.727 | 60 | 41.4 | 65.0 | −0.089 | −0.095 | −0.077 |
| Hytrel 4069 (90%) | Ethyl Oleate (10%) | 0.723 | 28 | 33.4 | 58.8 | −0.051 | −0.043 | −0.054 |

TABLE XII

Index Table

| Example | Solid Sphere COR | Solid Sphere Compression | Solid Sphere Shore D Hardness | Solid Sphere Shore C Hardness |
|---|---|---|---|---|
| HPF AD1035 | 0.822 | 63 | 41.7 | 70.0 |
| HPF AD1035 Soft | 0.782 | 35 | 35.6 | 59.6 |
| HPF 2000 | 0.856 | 91 | 46.1 | 76.5 |

HPF AD1035 - acid copolymer ionomer resin, available from the DuPont Company.
HPF AD1035 Soft - acid copolymer ionomer resin, available from the DuPont Company.
HPF 2000 - acid copolymer ionomer resin, available from the DuPont Company.

In general, the spheres made from the compositions comprising the polyester/plasticizer compositions have relatively high Coefficient of Restitution (COR) values at given compression and hardness values. In one embodiment, the molded sphere comprising the polyester composition has a COR of at least about 0.650, preferably at least about 0.700; a DCM Compression of no greater than about 70, preferably no greater than about 65; and Shore D surface hardness of no greater than about 50, preferably no greater than about 45. In one embodiment, the molded sphere has a COR of at least about 0.701; a DCM Compression of about 5 to about 65; and a Shore D surface hardness of about 20 to about 50.

It should be understood the golf ball materials, compositions, constructions, products, and methods for making the golf balls described and illustrated herein represent only some embodiments of the invention. Other compositions, constructions, and products can be made in accordance with this invention.

A wide variety of additives and fillers may be included in the final polyester composition. Suitable additives and mineral fillers include, for example, precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates such as calcium carbonate and magnesium carbonate. Suitable metal fillers include titanium, tungsten, aluminum, bismuth, nickel, molybdenum, iron, lead, copper, boron, cobalt, beryllium, zinc, and tin. Suitable metal alloys include steel, brass, bronze, boron carbide whiskers, and tungsten carbide whiskers. Suitable metal oxide fillers include zinc oxide, iron oxide, aluminum oxide, titanium dioxide, magnesium oxide, and zirconium oxide. Suitable particulate carbonaceous fillers include graphite, carbon black, cotton flock, natural bitumen, cellulose flock, and leather fiber. Micro balloon fillers such as glass and ceramic, and fly ash fillers can also be used.

Other additives and fillers include, but are not limited to, chemical blowing and foaming agents, optical brighteners, coloring agents, fluorescent agents, whitening agents, ultraviolet (UV) light absorbers, UV light stabilizers, defoaming agents, processing aids, antioxidants, stabilizers, softening agents, fragrance components, plasticizers, and impact modifiers. In a particular embodiment, the total amount of additive(s) and filler(s) present in the polyester composition is 25 wt. % or less, 20 wt. % or less, 15 wt. % or less, or 12 wt. % or less, or 10 wt. % or less, or 9 wt. % or less, or 6 wt. % or less, or 5 wt. % or less, or 4 wt. % or less, or 3 wt. % or less, based on total weight of the polyester composition. More particularly, the polyester composition may include filler(s) selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. Organic fiber micropulp also may be added. In another version, the polyester compositions may contain carbon fibers or carbon fiber sheets comprising a weave of thin carbon fibers held together in a resin.

Thermoplastic compositions suitable for forming other layers such as intermediate layers and/or cover layers include ionomers; non-ionomeric acid polymers, such as E/Y- and E/X/Y-type copolymers, wherein E is an α-olefin (e.g., ethylene), Y is a carboxylic acid such as acrylic, methacrylic, crotonic, maleic, fumaric, or itaconic acid, and X is a softening comonomer such as vinyl esters of aliphatic carboxylic acids wherein the acid has from 2 to 10 carbons, alkyl ethers wherein the alkyl group has from 1 to 10 carbons, and alkyl alkylacrylates such as alkyl methacrylates wherein the alkyl group has from 1 to 10 carbons; polyurethanes, polyureas, and polyurethane-polyurea hybrids; polyester-based thermoplastic elastomers; polyamides, copolymers of ionomer and polyamide, polyamide-ethers, and polyamide-esters; ethylene-based homopolymers and copolymers; propylene-based homopolymers and copolymers; triblock copolymers based on styrene and ethylene/butylene; derivatives thereof that are compatibilized with at least one grafted or copolymerized functional group; and combinations of any two or more of the above thermoplastic polymers.

Ionomers, including partially neutralized ionomers and highly neutralized ionomers (HNPs), and ionomers formed from blends of two or more partially neutralized ionomers, blends of two or more highly neutralized ionomers, and blends of one or more partially neutralized ionomers with one or more highly neutralized ionomers, are particularly suitable for forming the core layers. For purposes of the present disclosure, "HNP" refers to an acid copolymer after at least 80% of all acid groups present in the composition are neutralized. Preferred ionomers are salts of E/X- and E/X/Y-type acid copolymers, wherein E is an α-olefin (e.g., ethylene), X is a $C_3$-$C_8$ α,β-ethylenically unsaturated carboxylic acid, and Y is a softening monomer. X is preferably selected from methacrylic acid, acrylic acid, ethacrylic acid, crotonic acid, and itaconic acid. Methacrylic acid and acrylic acid are particularly preferred. Y is preferably selected from (meth)acrylate and alkyl(meth)acrylates wherein the alkyl groups have from 1 to 8 carbon atoms, including, but not limited to, n-butyl(meth)acrylate, isobutyl(meth)acrylate, methyl(meth)acrylate, and ethyl(meth)acrylate. Particularly preferred E/X/Y-type copolymers are ethylene/(meth)acrylic acid/n-butyl(meth)acrylate, ethylene/(meth)acrylic acid/isobutyl(meth)acrylate, ethylene/(meth)acrylic acid/methyl (meth)acrylate, and ethylene/(meth)acrylic acid/ethyl(meth) acrylate. As used herein, "(meth)acrylic acid" means methacrylic acid and/or acrylic acid. Likewise, "(meth) acrylate" means methacrylate and/or acrylate. The α-olefin is typically present in the acid copolymer in an amount of 15 wt % or greater, or 25 wt % or greater, or 40 wt % or greater, or 60 wt % or greater, based on the total weight of the acid copolymer. The acid is typically present in the acid copolymer in an amount of 6 wt % or greater, or 9 wt % or greater, or 10 wt % or greater, or 11 wt % or greater, or 15 wt % or greater, or 16 wt % or greater, or in an amount within a range having a lower limit of 1 or 4 or 5 or 6 or 8 or 10 or 11 or 12 or 15 wt % and an upper limit of 15 or 16 or 17 or 19 or 20 or 20.5 or 21 or 25 or 30 or 35 or 40 wt %, based on the total weight of the acid copolymer. The optional softening monomer is typically present in the acid copolymer in an amount within a range having a lower limit of 0 or 1 or 3 or 5 or 11 or 15 or 20 wt % and an upper limit of 23 or 25 or 30 or 35 or 50 wt %, based on the total weight of the acid copolymer.

The acid copolymer is at least partially neutralized with a cation source, optionally in the presence of a high molecular weight organic acid, such as those disclosed in U.S. Pat. No. 6,756,436, the entire disclosure of which is hereby incorporated herein by reference. The acid copolymer can be reacted with the optional high molecular weight organic acid and the cation source simultaneously, or prior to the addition of the cation source. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals.

Suitable ionomers are further disclosed, for example, in U.S. Patent Application Publication Nos. 2005/0049367, 2005/0148725, 2005/0020741, 2004/0220343, and 2003/0130434, and U.S. Pat. Nos. 5,587,430, 5,691,418, 5,866,658, 6,100,321, 6,562,906, 6,653,382, 6,756,436, 6,777,472, 6,762,246, 6,815,480, 6,894,098, 6,919,393, 6,953,820, 6,994,638, 7,375,151, and 7,652,086, the entire disclosures of which are hereby incorporated herein by reference.

Thermoplastic compositions of the present invention optionally include additive(s) and/or filler(s) in an amount of 50 wt % or less, or 30 wt % or less, or 20 wt % or less, or 15 wt % or less, based on the total weight of the thermoplastic composition. Suitable additives and fillers include, but are not limited to, chemical blowing and foaming agents, optical brighteners, coloring agents, fluorescent agents, whitening agents, UV absorbers, light stabilizers, defoaming agents, processing aids, antioxidants, stabilizers, softening agents, fragrance components, plasticizers, impact modifiers, $TiO_2$, acid copolymer wax, surfactants, performance additives (e.g., A-C® performance additives, particularly A-C® low molecular weight ionomers and copolymers, A-C® oxidized polyethylenes, and A-C® ethylene vinyl acetate waxes, commercially available from Honeywell International Inc.), fatty acid amides (e.g., ethylene bis-stearamide and ethylene bis-oleamide), fatty acids and salts thereof (e.g., stearic acid, oleic acid, zinc stearate, magnesium stearate, zinc oleate, and magnesium oleate), and fillers, such as zinc oxide, tin oxide, barium sulfate, zinc sulfate, calcium oxide, calcium carbonate, zinc carbonate, barium carbonate, tungsten, tungsten carbide, silica, lead silicate, clay, mica, talc, nano-fillers, carbon black, glass flake, milled glass, flock, fibers, and mixtures thereof. Suitable additives are more fully described in, for example, U.S. Patent Application Publication No. 2003/0225197, the entire disclosure of which is hereby incorporated herein by reference. In a particular embodiment, the total amount of additive(s) and filler(s) present in the thermoplastic composition is 20 wt % or less, or 15 wt % or less, or 12 wt % or less, or 10 wt % or less, or 9 wt % or less, or 6 wt % or less, or 5 wt % or less, or 4 wt % or less, or 3 wt % or less, or within a range having a lower limit of 0 or 2 or 3 or 5 wt %, based on the total weight of the thermoplastic composition, and an upper limit of 9 or 10 or 12 or 15 or 20 wt %, based on the total weight of the thermoplastic composition. In a particular aspect of this embodiment, the thermoplastic composition includes filler(s) selected from carbon black, micro- and nano-scale clays and organoclays, including (e.g., Cloisite® and Nanofil® nanoclays, commercially available from Southern Clay Products, Inc.; Nanomax® and Nanomer® nanoclays, commercially available from Nanocor, Inc., and Perkalite® nanoclays, commercially available from Akzo Nobel Polymer Chemicals), micro- and nano-scale talcs (e.g., Luzenac HAR® high aspect ratio talcs, commercially available from Luzenac America, Inc.), glass (e.g., glass flake, milled glass, microglass, and glass fibers), micro- and nano-scale mica and mica-based pigments (e.g., Iriodin® pearl luster pigments, commercially available from The Merck Group), and combinations thereof. Particularly suitable combinations of fillers include, but are not limited to, micro-scale filler(s) combined with nano-scale filler(s), and organic filler(s) with inorganic filler(s).

Examples of commercially available thermoplastics suitable for forming the inner core layer include, but are not limited to, Surlyn® ionomer resins, Hytrel® thermoplastic polyester elastomers, ionomeric materials sold under the trade names DuPont® HPF 1000 and HPF 2000, Nucrel® acid copolymer resins, Fusabond® metallocene-catalyzed polyethylenes, Fusabond® functionalized ethylene acrylate copolymers, Fusabond® functionalized ethylene vinyl acetate copolymers, Fusabond® anhydride modified HDPEs, Fusabond® random ethylene copolymers, Fusabond® chemically modified ethylene elastomers, and Fusabond® functionalized polypropylenes, all of which are commercially available from E. I. du Pont de Nemours and Company; Iotek® ionomers, commercially available from ExxonMobil Chemical Company; Amplify® IO ionomers of ethylene acrylic acid copolymers, commercially available from The Dow Chemical Company; Clarix® ionomer resins, commercially available from A. Schulman Inc.; Elastollan® polyurethane-based thermoplastic elastomers, commercially available from BASF; Pebax® thermoplastic polyether and polyester amides, Lotader® ethylene/acrylic ester/maleic anhydride random terpolymers and Lotader® ethylene/ethyl acrylate/maleic anhydride random terpolymers, all of which are commercially available from Arkema Inc.; Kraton® linear triblock copolymers based on styrene and ethylene/butylene, commercially available from Kraton Performance Polymers Inc.; and Riteflex® polyester elastomers, commercially available from Ticona.

The inner and outer core layers are formulated to have different properties as discussed herein. The optional intermediate layer(s) are not limited by a particular composition for forming the layer(s), and can be formed from any suitable golf ball composition including, but not limited to, natural rubber; polybutadiene; polyisoprene; ethylene propylene rubber; ethylene-propylene-diene rubber; styrene-butadiene rubber; butyl rubber; halobutyl rubber; thermoset polyurethane; thermoset polyurea; acrylonitrile butadiene rubber; polychloroprene; alkyl acrylate rubber; chlorinated isoprene rubber; acrylonitrile chlorinated isoprene rubber; polyalkenamer rubber; polyester; polyacrylate; partially- and fully-neutralized ionomer; graft copolymer of ionomer and polyamide; polyester, particularly polyesters modified with a compatibilizing group such as sulfonate or phosphonate, including modified poly(ethylene terephthalate), modified poly(butylene terephthalate), modified poly(propylene terephthalate), modified poly(trimethylene terephthalate), modified poly(ethylene naphthenate), including, but not limited to, those disclosed in U.S. Pat. Nos. 6,353,050, 6,274,298, and 6,001,930, the entire disclosures of which are hereby incorporated herein by reference; polyamides, polyamide-ethers, and polyamide-esters, including, but not limited to, those disclosed in U.S. Pat. Nos. 6,187,864, 6,001, 930, and 5,981,654, the entire disclosures of which are hereby incorporated herein by reference; polyurethanes, polyureas, and polyurethane-polyurea hybrids, including, but not limited to, those disclosed in U.S. Pat. Nos. 5,334, 673, 5,484,870, 6,506,851, 6,756,436, 6,835,794, 6,867,279, 6,960,630, and 7,105,623, U.S. Patent Application Publication No. 2007/0117923, and U.S. Patent Application Ser. No. 60/401,047 and Ser. No. 13/613,095, the entire disclosures of which are hereby incorporated herein by reference; fluoropolymers, including, but not limited to, those disclosed in U.S. Pat. Nos. 5,691,066, 6,747,110 and 7,009,002, the entire disclosures of which are hereby incorporated herein by reference; non-ionomeric acid polymers, i.e., E/X- and E/X/Y-type copolymers, including, but not limited to, those disclosed in U.S. Pat. No. 6,872,774, the entire disclosure of which is hereby incorporated herein by reference; metallocene-catalyzed polymers, including, but not limited to, those disclosed in U.S. Pat. Nos. 6,274,669, 5,919,862, 5,981,654, and 5,703,166, the entire disclosures of which are hereby incorporated herein by reference; polystyrenes, such as poly(styrene-co-maleic anhydride), acrylonitrile-butadiene-styrene, poly(styrene sulfonate), polyethylene styrene; polypropylenes, polyethylenes, propylene elastomers, ethylene elastomers, and copolymers of propylene and ethylene; polyvinyl chlorides; polyvinyl acetates, preferably having less than about 9% of vinyl acetate by weight; polycarbonates, blends of polycarbonate/acrylonitrile-butadiene-styrene, blends of polycarbonate/polyurethane, and blends of polycarbonate/polyester; polyvinyl alcohols; polyethers, such as polyarylene ethers, polyphenylene oxides, and block copolymers of alkenyl aromatics with vinyl aromatics and poly(amic ester)s; polyimides, polyetherketones, and polyamideimides; polycarbonate/polyester copolymers; and combinations of two or more thereof.

In a particular embodiment, the core includes an intermediate layer formed from a rubber composition. In another particular embodiment, the core includes an intermediate layer formed from an HNP composition.

Thermoplastic core compositions are optionally treated or admixed with a thermoset diene composition to reduce or prevent flow upon overmolding. Optional treatments may also include the addition of peroxide to the material prior to molding, or a post-molding treatment with, for example, a crosslinking solution, electron beam, gamma radiation, isocyanate or amine solution treatment, or the like. Such treatments may prevent the intermediate layer from melting and flowing or "leaking" out at the mold equator, as thermoset layers are molded thereon at a temperature necessary to crosslink the thermoset layer, which is typically from 280° F. to 360° F. for a period of about 5 to 30 minutes.

The multi-layer core is enclosed with a cover, which may be a single-, dual-, or multi-layer cover, preferably having an overall thickness within a range having a lower limit of 0.010 or 0.020 or 0.025 or 0.030 or 0.040 or 0.045 inches and an upper limit of 0.050 or 0.060 or 0.070 or 0.075 or 0.080 or 0.090 or 0.100 or 0.150 or 0.200 or 0.300 or 0.500 inches. In a particular embodiment, the cover is a single layer having a thickness of from 0.010 or 0.020 or 0.025 inches to 0.035 or 0.040 or 0.050 inches. In another particular embodiment, the cover consists of an inner cover layer having a thickness of from 0.010 or 0.020 or 0.025 inches to 0.035 or 0.050 inches and an outer cover layer having a thickness of from 0.010 or 0.020 or 0.025 inches to 0.035 or 0.040 inches.

Suitable cover materials include, but are not limited to, polyurethanes, polyureas, and hybrids of polyurethane and polyurea; ionomer resins and blends thereof (e.g., Surlyn® ionomer resins and DuPont® HPF 1000 and HPF 2000, commercially available from E. I. du Pont de Nemours and Company; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyisoprene; polyoctenamer, such as Vestenamer® polyoctenamer, commercially available from Evonik Industries; polyethylene, including, for example, low density polyethylene, linear low density polyethylene, and high density polyethylene; polypropylene; rubber-toughened olefin polymers; non-ionomeric acid copolymers, e.g., (meth)acrylic acid, which do not become part of an ionomeric copolymer; plastomers; flexomers; styrene/butadiene/styrene block copolymers; styrene/ethylene-butylene/styrene block copolymers; polybutadiene; styrene butadiene rubber; ethylene propylene rubber; ethylene propylene diene rubber; dynamically vulcanized elastomers; ethylene vinyl acetates; ethylene(meth)acrylates; polyvinyl chloride resins; polyamides, amide-ester elastomers, and copolymers of ionomer and polyamide, including, for example, Pebax® thermoplastic polyether and polyester amides, commercially available from Arkema Inc; crosslinked trans-polyisoprene; polyester-based thermoplastic elastomers, such as Hytrel® polyester elastomers, commercially available from E. I. du Pont de Nemours and Company, and Riteflex® polyester elastomers, commercially available from Ticona; polyurethane-based thermoplastic elastomers, such as Elastollan® polyurethanes, commercially available from BASF; synthetic or natural vulcanized rubber; and combinations thereof.

Compositions comprising an ionomer or a blend of two or more ionomers are particularly suitable cover materials. Preferred ionomeric cover compositions include: a composition comprising a "high acid ionomer" (i.e., having an acid content of greater than 16 wt %), such as Surlyn 8150®; a composition comprising a high acid ionomer and a maleic anhydride-grafted non-ionomeric polymer (e.g., Fusabond® functionalized polymers). A particularly preferred blend of high acid ionomer and maleic anhydride-grafted polymer is a 84 wt %/16 wt % blend of Surlyn 8150® and Fusabond®. Blends of high acid ionomers with maleic anhydride-grafted polymers are further disclosed, for example, in U.S. Pat. Nos. 6,992,135 and 6,677,401, the entire disclosures of which are hereby incorporated herein by reference; a composition comprising a 50/45/5 blend of Surlyn® 8940/Surlyn® 9650/Nucrel® 960, preferably having a material hardness of from 80 to 85 Shore C; a composition comprising a 50/25/25 blend of Surlyn® 8940/Surlyn® 9650/Surlyn® 9910, preferably having a material hardness of about 90 Shore C; a composition comprising a 50/50 blend of Surlyn® 8940/Surlyn® 9650, preferably having a material hardness of about 86 Shore C; a composition comprising a blend of Surlyn® 7940/Surlyn® 8940, optionally including a melt flow modifier; a composition comprising a blend of a first high acid ionomer and a second high acid ionomer, wherein the first high acid ionomer is neutralized with a different cation than the second high acid ionomer (e.g., 50/50 blend of Surlyn® 8150 and Surlyn® 9150), optionally including one or more melt flow modifiers such as an ionomer, ethylene-acid copolymer or ester terpolymer; and a composition comprising a blend of a first high acid ionomer and a second high acid ionomer, wherein the first high acid ionomer is neutralized with a different cation than the second high acid ionomer, and from 0 to 10 wt % of an ethylene/acid/ester ionomer wherein the ethylene/acid/ester ionomer is neutralized with the same cation as either the first high acid ionomer or the second high acid ionomer or a different cation than the first and second high acid ionomers (e.g., a blend of 40-50 wt % Surlyn® 8140, 40-50 wt % Surlyn® 9120, and 0-10 wt % Surlyn® 6320).

Surlyn 8150®, Surlyn® 8940, and Surlyn® 8140 are different grades of E/MAA copolymer in which the acid groups have been partially neutralized with sodium ions. Surlyn® 9650, Surlyn® 9910, Surlyn® 9150, and Surlyn® 9120 are different grades of E/MAA copolymer in which the acid groups have been partially neutralized with zinc ions. Surlyn® 7940 is an E/MAA copolymer in which the acid groups have been partially neutralized with lithium ions. Surlyn® 6320 is a very low modulus magnesium ionomer with a medium acid content. Nucrel® 960 is an E/MAA copolymer resin nominally made with 15 wt % methacrylic acid. Surlyn® ionomers, Fusabond® polymers, and Nucrel® copolymers are commercially available from E. I. du Pont de Nemours and Company.

Ionomeric cover compositions can be blended with non-ionic thermoplastic resins, particularly to manipulate product properties. Examples of suitable non-ionic thermoplastic resins include, but are not limited to, polyurethane, polyether-ester, poly-amide-ether, polyether-urea, thermoplastic polyether block amides (e.g., Pebax® block copolymers, commercially available from Arkema Inc.), styrene-butadiene-styrene block copolymers, styrene(ethylene-butylene)-styrene block copolymers, polyamides, polyesters, polyolefins (e.g., polyethylene, polypropylene, ethylene-propylene copolymers, polyethylene-(meth)acrylate, plyethylene-(meth)acrylic acid, functionalized polymers with maleic anhydride grafting, Fusabond® functionalized polymers commercially available from E. I. du Pont de Nemours and Company, functionalized polymers with epoxidation, elastomers (e.g., ethylene propylene diene monomer rubber, metallocene-catalyzed polyolefin) and ground powders of thermoset elastomers.

Ionomer golf ball cover compositions may include a flow modifier, such as, but not limited to, acid copolymer resins (e.g., Nucrel® acid copolymer resins, and particularly Nucrel® 960, commercially available from E. I. du Pont de Nemours and Company), performance additives (e.g., A-C® performance additives, particularly A-C® low molecular weight ionomers and copolymers, A-C® oxidized polyethylenes, and A-C® ethylene vinyl acetate waxes, commercially available from Honeywell International Inc.), fatty acid amides (e.g., ethylene bis-stearamide and ethylene bis-oleamide), fatty acids and salts thereof Suitable ionomeric cover materials are further disclosed, for example, in U.S. Pat. Nos. 6,653,382, 6,756,436, 6,894,098, 6,919,393, and 6,953,820, the entire disclosures of which are hereby incorporated by reference.

Polyurethanes, polyureas, and blends and hybrids of polyurethane/polyurea are also particularly suitable for forming cover layers. Suitable polyurethanes and polyureas are further disclosed, for example, in U.S. Pat. Nos. 5,334,673, 5,484,870, 6,506,851, 6,756,436, 6,835,794, 6,867,279, 6,960,630, and 7,105,623; U.S. Patent Application Publication No. 2009/0011868; and U.S. Patent Application No. 60/401,047, the entire disclosures of which are hereby incorporated herein by reference. Suitable polyurethane-urea cover materials include polyurethane/polyurea blends and copolymers comprising urethane and urea segments, as disclosed in U.S. Patent Application Publication No. 2007/0117923, the entire disclosure of which is hereby incorporated herein by reference.

Cover compositions may include one or more filler(s), such as titanium dioxide, barium sulfate, etc., and/or additive(s), such as coloring agents, fluorescent agents, whitening agents, antioxidants, dispersants, UV absorbers, light stabilizers, plasticizers, surfactants, compatibility agents, foaming agents, reinforcing agents, release agents, and the like. Suitable cover materials and constructions also include, but are not limited to, those disclosed in U.S. Patent Application Publication No. 2005/0164810, U.S. Pat. Nos. 5,919,100, 6,117,025, 6,767,940, and 6,960,630, and PCT Publications WO00/23519 and WO00/29129, the entire disclosures of which are hereby incorporated herein by reference. In a particular embodiment, the cover is a single layer, preferably formed from an ionomeric composition having a material hardness of 60 Shore D or greater or a material hardness of from 60 or 62 or 65 Shore D to 65 or 70 or 72 Shore D, and a thickness of 0.02 inches or greater or 0.03 inches or greater or 0.04 inches or greater or a thickness within a range having a lower limit of 0.010 or 0.015 or 0.020 inches and an upper limit of 0.035 or 0.040 or 0.050 inches. In another particular embodiment, the cover is a single layer having a thickness of from 0.010 or 0.025 inches to 0.035 or 0.040 inches and formed from a thermoplastic composition selected from ionomer-, polyurethane-, and polyurea-based compositions having a material hardness of 62 Shore D or less, or less than 62 Shore D, or 60 Shore D or less, or less than 60 Shore D, or 55 Shore D or less, or less than 55 Shore D.

In another particular embodiment, the cover is a single layer having a thickness of from 0.010 or 0.025 inches to 0.035 or 0.040 inches and formed from a thermosetting polyurethane- or polyurea-based composition having a material hardness of 62 Shore D or less, or less than 62 Shore D, or 60 Shore D or less, or less than 60 Shore D, or 55 Shore D or less, or less than 55 Shore D. In another particular embodiment, the cover comprises an inner cover layer formed from an ionomeric composition and an outer cover layer formed from a thermosetting polyurethane- or polyurea-based composition. The inner cover layer composition preferably has a material hardness of from 60 or 62 or 65 Shore D to 65 or 70 or 72 Shore D. The inner cover layer preferably has a thickness within a range having a lower limit of 0.010 or 0.020 or 0.030 inches and an upper limit of 0.035 or 0.040 or 0.050 inches. The outer cover layer composition preferably has a material hardness of 62 Shore D or less, or less than 62 Shore D, or 60 Shore D or less, or less than 60 Shore D, or 55 Shore D or less, or less than 55 Shore D. The outer cover layer preferably has a thickness within a range having a lower limit of 0.010 or 0.020 or 0.025 inches and an upper limit of 0.035 or 0.040 or 0.050 inches. In another particular embodiment, the cover comprises an inner cover layer formed from an ionomeric composition and an outer cover layer formed from a thermoplastic composition selected from ionomer-, polyurethane-, and polyurea-based compositions. The inner cover layer composition preferably has a material hardness of from 60 or 62 or 65 Shore D to 65 or 70 or 72 Shore D. The inner cover layer preferably has a thickness within a range having a lower limit of 0.010 or 0.020 or 0.030 inches and an upper limit of 0.035 or 0.040 or 0.050 inches. The outer cover layer composition preferably has a material hardness of 62 Shore D or less, or less than 62 Shore D, or 60 Shore D or less, or less than 60 Shore D, or 55 Shore D or less, or less than 55 Shore D. The outer cover layer preferably has a thickness within a range having a lower limit of 0.010 or 0.020 or 0.025 inches and an upper limit of 0.035 or 0.040 or 0.050 inches.

In another particular embodiment, the cover is a dual- or multi-layer cover including an inner or intermediate cover layer formed from an ionomeric composition and an outer cover layer formed from a polyurethane- or polyurea-based composition. The ionomeric layer preferably has a surface hardness of 70 Shore D or less, or 65 Shore D or less, or less than 65 Shore D, or a Shore D hardness of from 50 to 65, or a Shore D hardness of from 57 to 60, or a Shore D hardness of 58, and a thickness within a range having a lower limit of 0.010 or 0.020 or 0.030 inches and an upper limit of 0.045 or 0.080 or 0.120 inches. The outer cover layer is preferably formed from a castable or reaction injection moldable polyurethane, polyurea, or copolymer or hybrid of polyurethane/polyurea. Such cover material is preferably thermosetting, but may be thermoplastic. The outer cover layer composition preferably has a material hardness of 85 Shore C or less, or 45 Shore D or less, or 40 Shore D or less, or from 25 Shore D to 40 Shore D, or from 30 Shore D to 40 Shore D. The outer cover layer preferably has a surface hardness within a range having a lower limit of 20 or 30 or 35 or 40 Shore D and an upper limit of 52 or 58 or 60 or 65 or 70 or 72 or 75 Shore D. The outer cover layer preferably has a thickness within a range having a lower limit of 0.010 or 0.015 or 0.025 inches and an upper limit of 0.035 or 0.040 or 0.045 or 0.050 or 0.055 or 0.075 or 0.080 or 0.115 inches.

A moisture vapor barrier layer is optionally employed between the core and the cover. Moisture vapor barrier layers are further disclosed, for example, in U.S. Pat. Nos. 6,632,147, 6,838,028, 6,932,720, 7,004,854, and 7,182,702, and U.S. Patent Application Publication Nos. 2003/0069082, 2003/0069085, 2003/0130062, 2004/0147344, 2004/0185963, 2006/0068938, 2006/0128505 and 2007/0129172, the entire disclosures of which are hereby incorporated herein by reference.

Thermoplastic layers herein may be treated in such a manner as to create a positive or negative hardness gradient. In golf ball layers of the present invention wherein a thermosetting rubber is used, gradient-producing processes and/or gradient-producing rubber formulation may be employed. Gradient-producing processes and formulations are disclosed more fully, for example, in U.S. patent application Ser. No. 12/048,665, filed on Mar. 14, 2008; Ser. No. 11/829,461, filed on Jul. 27, 2007; Ser. No. 11/772,903, filed Jul. 3, 2007; Ser. No. 11/832,163, filed Aug. 1, 2007; Ser. No. 11/832,197, filed on Aug. 1, 2007; the entire disclosure of each of these references is hereby incorporated herein by reference.

Golf balls of the present invention typically have a coefficient of restitution of 0.700 or greater, preferably 0.750 or greater, and more preferably 0.780 or greater. Golf balls of the present invention typically have a compression of 40 or greater, or a compression within a range having a lower limit of 50 or 60 and an upper limit of 100 or 120. Golf balls of the present invention will typically have dimple coverage of 60% or greater, preferably 65% or greater, and more preferably 75% or greater. The United States Golf Association specifications limit the minimum size of a competition golf ball to 1.680 inches. There is no specification as to the maximum diameter, and golf balls of any size can be used for recreational play. Golf balls of the present invention can have an overall diameter of any size. The preferred diameter of the present golf balls is within a range having a lower limit of 1.680 inches and an upper limit of 1.740 or 1.760 or 1.780 or 1.800 inches. Golf balls of the present invention preferably have a moment of inertia ("MOT") of 70-95 g·cm$^2$, preferably 75-93 g·cm$^2$, and more preferably 76-90 g·cm$^2$. For low MOT embodiments, the golf ball preferably has an MOT of 85 g·cm$^2$ or less, or 83 g·cm$^2$ or less. For high MOT embodiment, the golf ball preferably has an MOT of 86 g·cm$^2$ or greater, or 87 g·cm$^2$ or greater. MOT is measured on a model MOI-005-104 Moment of Inertia Instrument manufactured by Inertia Dynamics of Collinsville, Conn. The instrument is connected to a PC for communication via a COMM port and is driven by MOI Instrument Software version #1.2.

For purposes of the present invention, "compression" refers to Atti compression and is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low compression cores will not cause the spring to deflect by more than 1.25 mm and therefore have a zero or negative compression measurement. The Atti compression tester is designed to measure objects having a diameter of 1.680 inches; thus, smaller objects, such as golf ball cores, must be shimmed to a total height of 1.680 inches to obtain an accurate reading. Conversion from Atti compression to Riehle (cores), Riehle (balls), 100 kg deflection, 130-10 kg deflection or effective modulus can be carried out according to the formulas given in *Compression by Any Other Name, Science and Golf IV, Proceedings of the World Scientific Congress of Golf* (Eric Thain ed., Routledge, 2002).

COR, as used herein, is determined according to a known procedure wherein a sphere is fired from an air cannon at two given velocities and calculated at a velocity of 125 ft/s. Ballistic light screens are located between the air cannon and the steel plate at a fixed distance to measure ball velocity. As the sphere travels toward the steel plate, it activates each light screen, and the time at each light screen is measured. This provides an incoming transit time period inversely proportional to the sphere's incoming velocity. The sphere impacts the steel plate and rebounds through the light screens, which again measures the time period required to transit between the light screens. This provides an outgoing transit time period inversely proportional to the sphere's outgoing velocity. COR is then calculated as the ratio of the outgoing transit time period to the incoming transit time period, $COR=V_{out}/V_{in}=T_{in}/T_{out}$.

The surface hardness of a golf ball layer is obtained from the average of a number of measurements taken from opposing hemispheres, taking care to avoid making measurements on the parting line of the core or on surface defects, such as holes or protrusions. Hardness measurements are made pursuant to ASTM D-2240 using a calibrated, digital durometer, capable of reading to 0.1 hardness units and set to record the maximum hardness reading obtained for each measurement.

The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within ±0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center.

The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer. Hardness points should only be measured once at any particular geometric location. It should be understood that there is a fundamental difference between "material hardness" and "hardness as measured directly on a golf ball." For purposes of the present disclosure, material hardness is measured according to ASTM D2240 and generally involves measuring the hardness of a flat "slab" or "button" formed of the material. Hardness as measured directly on a golf ball (or other spherical surface) typically results in a different hardness value. This difference in hardness values is due to several factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

The prophetic examples below are for illustrative purposes only. In no manner is the present invention limited to the specific disclosures therein.

A soft, low compression inner core layer can be made as follows. A 0.60 inch diameter sphere of polybutadiene and from 0.1 to 2.0 phr peroxide is cured at 305-350° F. for 5-15 minutes. Filler, colorant, antioxidant, and small amounts (i.e., 5 phr or less) of zinc oxide and/or coagent (e.g., zinc diacrylate, zinc dimethacrylate, trimethylpropane triacrylate, etc.) are optionally added, for example, to increase reaction efficiency and to optimize hardness and compression. The resulting inner core layer has a center hardness of about 10 Shore C, and an outer surface hardness of about 20 Shore C, a positive hardness gradient of about 10, a compression of less than 0, and a COR of about 0.600. An outer core layer having an outer diameter of about 1.530 inches and an outer surface hardness of about 90 C is formed thereon from a conventional polybutadiene golf ball composition. The resulting dual core has a compression of about 90 to about 100 and a COR of about 0.810. The dual core is enclosed in an inner cover layer formed from an ionomer and an outer cover layer formed from a polyurethane.

Also illustrative of golf balls of the invention are prophetic golf balls Ex. 1, Ex. 2, Ex. 3, and Ex. 4 set forth in TABLE XVI below and compared therein with one conventional prophetic golf ball Comp. Ex. 1. Each of golf balls Ex. 1, Ex. 2, Ex. 3, Ex. 4 and Comp. Ex. 1 comprises a dual core, a cover, and an intermediate layer disposed between the dual core and the cover.

The dual core in each of inventive prophetic golf balls Ex. 1, Ex. 2, Ex. 3, and Ex. 4 consists of a solid inner core layer consisting of a peroxide cured polybutadiene rubber composition, surrounded by an outer core layer consisting of a thermoplastic composition Tc. Specifically, each inner core of golf balls Ex. 1, Ex. 2, Ex. 3, and Ex. 4 is formed from one of polybutadiene-based rubber compositions R2 or R4 as formulated in TABLE XIII below:

TABLE XIII

| Ingredients | Rubber Compositions | | | |
|---|---|---|---|---|
| (Phr) | R1 | R2 | R3 | R4 |
| Polybutadiene | 100 | 100 | 100 | 100 |
| Zinc Oxide | 5 | 30 | 5 | 30 |
| zinc diacrylate (ZDA) | 35 | — | 31 | 5 |
| Dicumyl Peroxide | 0.5 | 0.4 | — | 0.4 |
| Trigonox ®265[1] | — | — | 1.0 | — |
| Antioxidant | — | — | 0.4 | — |
| Zinc Salt of Pentachlorothiophenol (ZnPCTP) | 0.5 | 0.5 | 0.5 | — |
| Diphenyldisulfide | — | — | — | 0.5 |
| Barium Sulfate | vary | vary | vary | vary |

[1]Trigonox ®265 is an initiating agent available from Akzo Nobel.

As is evident from TABLE XIII, formulations R2 and R4 differ in that R4 incorporates ZDA and Diphenyl disulfide, whereas R2 incorporates ZnPCTP. Meanwhile, each outer core layer of golf balls Ex. 1, Ex. 2, Ex. 3, and Ex. 4 consists of a thermoplastic composition Tc (one of Tc(1A) or Tc(1B)) that is formed from a highly neutralized polymer composition comprising: an acid copolymer of ethylene and an α,β-unsaturated carboxylic acid, optionally including a softening monomer selected from the group consisting of alkyl acrylates and methacrylates; a non-acid polymer selected from the group consisting of polyolefins, polyamides, polyesters, polyethers, polyurethanes, metallocene-catalyzed polymers, single-site catalyst polymerized polymers, ethylene propylene rubber, ethylene propylene diene rubber, styrenic block copolymer rubbers, alkyl acrylate rubbers, and functionalized derivatives thereof; an organic acid or salt thereof; and a cation source present in an amount sufficient to neutralize greater than 80% of all acid groups present in the composition. In particular, the outer core layer of golf balls Ex. 1 and Ex. 4 are formed from thermoplastic composition Tc(1A), and the outer core layer of golf balls Ex. 2 and Ex. 3 are formed from thermoplastic composition Tc(1B), each of which are formulated as set forth in TABLE XIV:

TABLE XIV

| Ingredients | THERMOPLASTIC FORMULATIONS Tc or TP | | | |
|---|---|---|---|---|
| (Phr) | Tc(1A) | Tc(1B) | TP(1) | TP(2) |
| Primacor ®5980I[2] | 33.4 | — | — | — |
| Royaltuf ®498[3] | 22.2 | — | — | — |

TABLE XIV-continued

| Ingredients | THERMOPLASTIC FORMULATIONS Tc or TP | | | |
|---|---|---|---|---|
| (Phr) | Tc(1A) | Tc(1B) | TP(1) | TP(2) |
| HPF ®1000[4] | — | 100 | — | — |
| Oleic Acid | 37.1 | — | — | — |
| Mg(OH)$_2$ | 7.3 | — | — | — |
| Surlyn ®7940[5] | — | — | 50 | — |
| Surlyn ®8940 | — | — | 50 | — |
| Surlyn ®8150 | — | — | — | 45 |
| Surlyn ®9150 | — | — | — | 45 |
| Surlyn ®6320 | — | — | — | 10 |
| Tungsten | vary | — | — | — |
| Barium Sulfate | — | vary | — | vary |

[2]Primacor ®5980I is an ethylene-acrylic acid (EAA) copolymer commercially available from The Dow Chemical Company.
[3]Royaltuf ®498 is a maleic anhydride modified ethylene-propylene-non-conjugated diene (EPDM) terpolymer available from Addivant ™.
[4]HPF ®1000 is an ionomer of ethylene acid acrylate terpolymer, commercially available from E. I. du Pont de Nemours and Company
[5]Surlyn ® ionomers, commercially available from E. I. du Pont de Nemours and Company The intermediate layers of golf balls Ex. 1, Ex. 2, Ex. 3, and Ex. 4 are formed from one of ionomeric materials TP(1A) or TP(1B) of TABLE XIV above, and each cover is formed from one of cover materials C1, C2, or C3 detailed in TABLE XV:

TABLE XV

| Cover Ingredients | COVER MATERIALS | | |
|---|---|---|---|
| (Phr) | C1 | C2 | C3 |
| 6.0% NCO MDI[6]/PTMEG 2000[7] Prepolymer | — | — | 87.3 |
| Ethacure 300[8] | — | — | 12.7 |
| Elastollan 1185AW[9] | 100 | — | — |
| Pellethane ®5863-85A TPU[10] | — | 100 | — |
| Titanium Dioxide | 4 | 4 | 4 |

[6]Methylene diphenyl diisocyanate.
[7]Polytetramethylene ether glycol.
[8]Ethacure 300, dimethylthiotoluene diamine, sold by Albemarle.
[9]Polyurethane-based thermoplastic elastomers, commercially available from BASF.
[10]Aromatic Polyether-based Thermoplastic Polyurethane (TPU), commercially available from Lubrizol Corporation.

In contrast, in comparative golf ball Comp. Ex. 1, both the inner core and the outer core layer are each formed from conventional rubber compositions R3 and R1 of TABLE XIII, respectively. Rubber compositions R3 and R1 differ from each other in that R3 incorporates Trigonox®265 initiating agent and antioxidant, whereas R1 incorporates dicumyl peroxide.

And R3 and R1 differ from inner core materials R4 and R2 of inventive prophetic golf balls Ex. 1, Ex. 2, Ex. 3, and Ex. 4 in that: (i) both R3 and R1 incorporate at least six times more ZDA than rubber-based compositions R4 (5 phr) or R2 (none); and (ii) R4 and R2 incorporate six times more zinc oxide (crosslinking system activator) than rubber compositions R3 and R1.

Golf ball Comp. Ex. 1 does, however, incorporate an intermediate layer formed from the same intermediate layer material TP(1) of inventive prophetic golf balls Ex. 1 and Ex. 4, and also incorporates a cover that is formed from the same cover material C3 of inventive prophetic golf ball Ex. 4.

TABLE XVI below reflects the formulation details of TABLES XIII, XIV and XV and further specifies the construction and certain additional properties for each of golf balls Ex. 1, Ex. 2, Ex. 3, and Ex. 4 and Comp. Ex. 4 as follows:

TABLE XVI

| Golf Ball Construction & Properties | EXAMPLES | | | | |
|---|---|---|---|---|---|
| | Ex. 1 | Ex. 2 | Ex. 3 | Ex. 4 | Comp. Ex. 1 |
| Inner Core Formulation | R2 | R4 | R2 | R4 | R3 |
| Inner Core Diameter(in.) | 0.75 | 0.75 | 0.75 | 0.75 | 1.00 |
| Center Hardness (Shore C) | 17 | 30 | 17 | 30 | 72 |
| Outer Core Formulation | Tc(1A) | Tc(1B) | Tc(2) | Tc(1) | R1 |
| Outer Core Thickness (in.) | 0.405 | 0.400 | 0.415 | 0.400 | 0.275 |
| Outer Core Surface Hardness (Shore C) | 84 | 86 | 86 | 84 | 86 |
| Intermediate Layer Formulation | TP(1) | TP(2) | TP(2) | TP(1) | TP(1) |
| Intermediate Layer Thickness (in.) | 0.040 | 0.035 | 0.035 | 0.035 | 0.035 |
| Intermediate Layer Hardness (Shore D) | 66 | 68 | 68 | 66 | 66 |
| Cover Formulation | C1 | C2 | C1 | C3 | C3 |
| Cover Thickness (in.) | 0.020 | 0.030 | 0.015 | 0.030 | 0.030 |
| Cover Hardness (Shore D) | 60 | 58 | 61 | 59 | 59 |

Referring to golf balls Ex. 1, Ex. 2, Ex. 3, and Ex. 4 of TABLE XVI, each inner core layer consists of a peroxide cured polybutadiene rubber composition and has a diameter of less than 1.25 inch (also, less than 1.10 inches and less than 1.0 inch) and a center Shore C hardness ($H_{center}$) of 50 or less. Additionally, each outer core layer consists of a thermoplastic composition Tc and has a thickness of 0.400 inches or greater and an outer surface Shore C hardness ($H_{outer\ surface}$) of 70 or greater, wherein $H_{outer\ surface} > H_{center}$, and $H_{outer\ surface} - H_{center} \geq 40$. The peroxide cured polybutadiene rubber composition of each inner core comprises a reaction product of polybutadiene and a sufficient amount of peroxide to form the solid inner layer having the center Shore C hardness ($H_{center}$) of 50 or less.

That is, in golf ball Ex. 1, the peroxide cured polybutadiene rubber inner core layer is formed from R2, has a diameter of 0.50 in., and has a center Shore C hardness of 17. The outer core layer meanwhile is formed from thermoplastic composition Tc(1A), has a thickness of 0.405 in., and has an outer surface Shore C hardness of 84. The outer surface hardness of the outer core layer of golf ball Ex. 1 is therefore "at least 40 Shore C points greater than the center hardness of the inner core layer" (namely 67 Shore C points greater than the center hardness). Interestingly, golf ball Ex. 1 also satisfies the embodiment wherein the center Shore C hardness is 40 or less, the outer surface Shore C hardness is 75 or greater, and the outer surface hardness is at least 50 Shore C points greater than the center hardness.

The cores of golf balls Ex. 2, Ex. 3, and Ex. 4 differ from golf ball Ex. 1 at least with regard to the particular peroxide cured polybutadiene rubber material R2/R4 and/or the thermoplastic composition Tc(1). For example, while the inner core of golf balls Ex. 1 and Ex. 3 each incorporate a polybutadiene rubber material R2 inner core, golf ball Ex. 1 has an outer core layer that is formed from Tc(1A), whereas the outer core layer of golf ball Ex. 2 is formed from Tc(1B).

Meanwhile, the core of golf ball Ex. 2 differs from that of golf ball Ex. 1 with regard to both the particular peroxide cured polybutadiene rubber inner core material (R4 versus R2, respectively) and the outer core layer thermoplastic composition Tc (Tc(1B) versus TP(1A), respectively). In turn, golf ball Ex. 4 has a core that differs from that of golf ball Ex. 1 with regard to the particular peroxide cured polybutadiene rubber material (R4 versus R2, respectively) for the inner core, but the outer core formulations are similar (Tc(1A)).

And while the inner core of golf ball Ex. 2 incorporates the same peroxide cured polybutadiene rubber material R4 as does the inner core of golf ball Ex. 4, the outer core layers of these golf balls are different (Tc(1B) and Tc(1A), respectively). Additionally, golf ball Ex. 2 incorporates a different peroxide cured polybutadiene rubber material R4 than the inner core of golf ball Ex. 3 (R2), and a different outer core material Tc(1B) than that of the outer core layer of golf ball Ex. 1 (Tc(1A)). Finally, golf balls Ex. 3 and Ex. 4 have both different inner core materials (R2 versus R4 respectively) and different outer core materials ((Tc(1B) versus Tc(1A) respectively).

Golf balls Ex. 1 and Ex. 3 not only have different outer core layer materials but also have different intermediate layers between the core and cover-namely TP(1) versus TP(2). And Golf balls Ex. 2 and Ex. 4, not only have different outer core layers ((Tc(1B) versus Tc(1A) respectively), but also have different intermediate layers ((TP(2) versus TP(2), respectively), as well as different covers (C2 versus C3). Golf balls Ex. 1 and Ex. 4 not only have different inner cores (R2 versus R4, respectively), but also have different covers C1 versus C3, respectively. This is likewise true for golf balls Ex. 2 and Ex. 3, which have different inner cores (R4 versus R2, respectively), and also different covers C2 versus C1, respectively.

Nevertheless, golf balls Ex. 2, Ex. 3, and Ex. 4 are similar to golf ball Ex. 1 in that each has an outer core layer outer surface hardness that is greater than the center hardness of the inner core layer by "at least 40 Shore C points greater". In particular, golf balls Ex. 2, Ex. 3, and Ex. 4 have an outer core layer outer surface hardnesses that are greater than the center hardness of the inner core layer by 56, 69 and 54 Shore C hardness points, respectively.

Meanwhile, the core of golf ball Comp. Ex. 1 has a center Shore C hardness well above above 50 (namely 72) and a much more shallow Shore C hardness gradient from outer surface to center and well below "at least 40", namely only 14 Shore C points greater (86-72).

Accordingly, each of golf balls Ex. 1, Ex. 2, Ex. 3, and Ex. 4 distinguishably incorporates a core having a steep positive Shore C hardness gradient progressing from a hard core outer surface to a very soft center and can produce a desired spin profile of reduced spin off the driver meanwhile maintaining moderate spin off wedges and irons by coordinating the property differences between inner core layer formulations such as R1 and R2 and outer core layer formulations such as Tc(1A) and Tc(1B) along with various intermediate layer and/or cover layer formulations as discussed hereinabove for example.

Figure 3A:
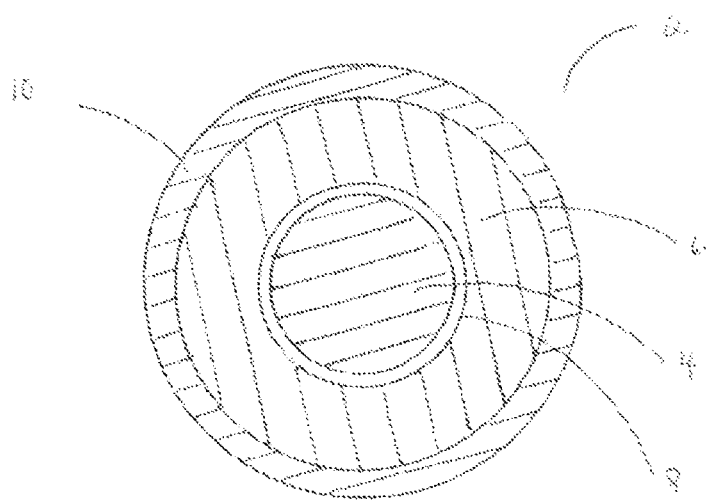
FIG. 3A depicts a side view of a golf ball according to one embodiment of the invention as detailed herein below.
Figure 3B:
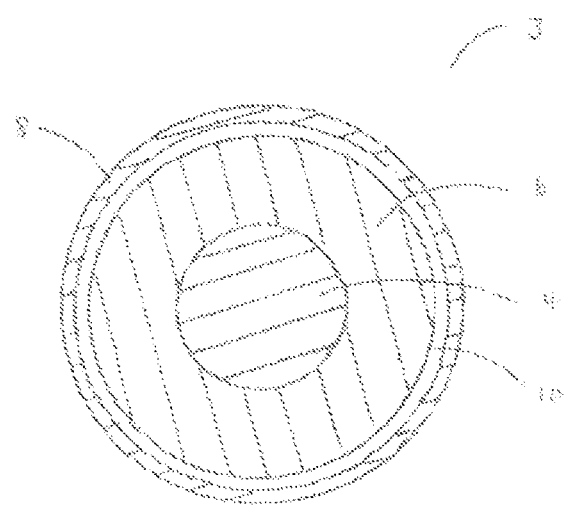
FIG. 3B depicts a side view of a golf ball according to another embodiment of the invention as detailed further herein below.

FIG. 3A illustrates one embodiment of a golf ball of the invention wherein golf ball 2 comprises solid inner core layer 4 consisting of a peroxide cured polybutadiene rubber composition and having a diameter of 1.25 inches or less and having a center Shore C hardness ($H_{center}$) of 50 or less; an outer core layer 6 consisting of a thermoplastic composition Tc and having a thickness of 0.40 inches or greater and an outer surface Shore C hardness ($H_{outer\ surface}$) of 70 or greater; and a cover 8 formed about the core. FIG. 3B, meanwhile, illustrates another embodiment of a golf ball of the invention wherein golf ball 3 comprises solid inner core layer 4 consisting of a peroxide cured polybutadiene rubber composition and having a diameter of 1.25 inches or less and a center Shore C hardness ($H_{center}$) of 50 or less; an outer core layer 6 consisting of a thermoplastic composition Tc and having a thickness of 0.40 inches or greater and an outer surface Shore C hardness ($H_{outer\ surface}$) of 70 or greater; a cover 8, and an intermediate layer 10 disposed between outer core layer 6 and cover 8.

It is contemplated that any combination of numerical lower limits and numerical upper limits set forth herein may be used. The scope of the claims appended hereto shall not be limited to the examples and descriptions set forth herein, but rather extend to and encompass all of the features of patentable novelty which reside in the present invention, including all equivalents. All patents, publications, test procedures, and other references cited herein, including priority documents, are fully incorporated by reference to the extent such disclosure is not inconsistent with this invention and for all jurisdictions in which such incorporation is permitted.

What is claimed is:

1. A golf ball comprising a core and a cover, wherein the core consists of:
   a solid inner core layer consisting of a peroxide cured polybutadiene rubber composition and having a diameter of 1.25 inches or less and a center Shore C hardness ($H_{center}$) of 50 or less; and
   an outer core layer consisting of a thermoplastic composition Tc and having a thickness of 0.400 inches or greater and an outer surface Shore C hardness ($H_{outer\ surface}$) of 70 or greater,
   wherein $H_{outer\ surface} > H_{center}$, and $H_{outer\ surface} - H_{center} \geq 40$.

2. The golf ball of claim 1, wherein the peroxide cured polybutadiene rubber composition comprises a reaction product of polybutadiene and a sufficient amount of peroxide.

3. The golf ball of claim 2, wherein 100 phr polybutadiene and from about 0.05 phr to about 3.0 phr of peroxide are mixed with at least one of 5 phr or less of a metal oxide; 5 phr or less of a metal coagent; or 5 phr or less of a metal carbonate.

4. The golf ball of claim 2, wherein the polybutadiene and peroxide are mixed with at least one filler, antioxidant, processing agent, light stabilizer, colorant, adhesion promotor, or combinations thereof.

5. The golf ball of claim 1, wherein $H_{outer\ surface} - H_{center} \geq 45$.

6. The golf ball of claim 1, wherein $H_{outer\ surface} - H_{center} \geq 50$.

7. The golf ball of claim 1, wherein $H_{outer\ surface} - H_{center} \geq 55$.

8. The golf ball of claim 1, wherein $H_{outer\ surface} - H_{center} \geq 60$.

9. The golf ball of claim 1, wherein the inner core layer has an inner core interface Shore C hardness $H_{inner\ core\ interface}$ such that $-5 \leq H_{inner\ core\ interface} - H_{center} \leq 5$.

10. The golf ball of claim 1, wherein the outer core layer has an outer core interface Shore C hardness $H_{outer\ core\ interface}$ such that $H_{outer\ core\ interface} - H_{inner\ core\ interface} \leq H_{outer\ surface} - H_{center}$.

11. The golf ball of claim 1, wherein the outer core layer has an outer core interface Shore C hardness $H_{outer\ core\ interface}$ such that $H_{outer\ core\ interface} - H_{inner\ core\ interface} > H_{outer\ surface} - H_{center}$.

12. The golf ball of claim 1, wherein Tc is formed from a highly neutralized polymer composition comprising: an acid copolymer of ethylene and an α,β-unsaturated carboxylic acid, optionally including a softening monomer selected from the group consisting of alkyl acrylates and methacrylates; a non-acid polymer selected from the group consisting of polyolefins, polyamides, polyesters, polyethers, polyurethanes, metallocene-catalyzed polymers, single-site catalyst polymerized polymers, ethylene propylene rubber, ethylene propylene diene rubber, styrenic block copolymer rubbers, alkyl acrylate rubbers, and functionalized derivatives thereof; an organic acid or salt thereof; and a cation source present in an amount sufficient to neutralize greater than 80% of all acid groups present in the composition.

13. The golf ball of claim 12, further comprising an intermediate layer disposed between the core and the cover comprising at least one of ionomers; highly neutralized ionomers; non-ionomeric acid polymers; polyurethanes, polyureas, and polyurethane-polyurea hybrids; polyester-based thermoplastic elastomers; polyamides, copolymers of ionomer and polyamide, polyamide-ethers, and polyamide-esters; ethylene-based homopolymers and copolymers; propylene-based homopolymers and copolymers; triblock copolymers based on styrene and ethylene/butylene; derivatives thereof that are compatibilized with at least one grafted or copolymerized functional group; and combinations thereof.

14. The golf ball of claim 12, further comprising an intermediate layer disposed between the core and the cover comprising at least one of natural rubber, polybutadiene, polyisoprene, ethylene propylene rubber (EPR), ethylene-propylene-diene rubber (EPDM), styrene-butadiene rubber, butyl rubber, halobutyl rubber, polyurethane, polyurea, acrylonitrile butadiene rubber, polychloroprene, alkyl acrylate rubber, chlorinated isoprene rubber, acrylonitrile chlorinated isoprene rubber, polyalkenamer, phenol formaldehyde, melamine formaldehyde, polyepoxide, polysiloxane, polyester, alkyd, polyisocyanurate, polycyanurate, polyacrylate, and combinations thereof.

15. The golf ball of claim 12, wherein the solid inner core layer has a center Shore C hardness ($H_{center}$) of 40 or less, the outer core layer has an outer surface Shore C hardness ($H_{outer\ surface}$) of 85 or greater, and wherein $H_{outer\ surface} > H_{center}$, and $H_{outer\ surface} - H_{center} \geq 45$.

16. The golf ball of claim 12, wherein the diameter of the solid inner core layer is 1.10 inches or less.

17. The golf ball of claim 12, wherein the diameter of the solid inner core layer is less than 1.0 inch.

* * * * *